United States Patent
Steiner

(10) Patent No.: US 12,298,389 B2
(45) Date of Patent: May 13, 2025

(54) SENSOR DEVICE HAVING AN ULTRASONIC RECEIVING CIRCUIT

(71) Applicant: Lutron Technology Company LLC, Coopersburg, PA (US)

(72) Inventor: James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 187 days.

(21) Appl. No.: 18/312,985

(22) Filed: May 5, 2023

(65) Prior Publication Data
US 2023/0393269 A1 Dec. 7, 2023

Related U.S. Application Data

(60) Provisional application No. 63/339,211, filed on May 6, 2022.

(51) Int. Cl.
*G08B 13/08* (2006.01)
*G01S 7/52* (2006.01)
(Continued)

(52) U.S. Cl.
CPC .......... *G01S 15/04* (2013.01); *G01S 7/52001* (2013.01); *G01S 7/524* (2013.01); *G01S 7/53* (2013.01); *G01S 15/86* (2020.01); *G01S 7/521* (2013.01)

(58) Field of Classification Search
CPC ...... G01S 15/04; G01S 7/52001; G01S 7/524; G01S 7/53; G01S 15/86; G01S 7/521; H05B 47/115
See application file for complete search history.

(56) References Cited

U.S. PATENT DOCUMENTS 5,986,357 A * 11/1999 Myron ............... G11C 29/38
340/541
RE37,135 E * 4/2001 Elwell ................ H05B 47/115
250/221

(Continued)

OTHER PUBLICATIONS

Lutron Electronics Co., Inc., Dual Technology Ceiling Mount Sensor Specification Submittal, Feb. 7, 2013, 9 pages.
(Continued)

*Primary Examiner* — Toan N Pham
(74) *Attorney, Agent, or Firm* — Philip N. Smith; Glen R. Farbanish; Michael S. Czarnecki

(57) ABSTRACT

A sensor device may include a signal generator circuit configured to generate a supplemental signal that is combined with an ultrasonic reception voltage signal generated by an ultrasonic receiving element in response to received ultrasonic waves. The sensor device may comprise an ultrasonic receiving circuit configured to receive the combination of the ultrasonic reception voltage signal and the supplemental signal, and generate a detection signal that indicates when the space is occupied. The sensor device may also comprise a control circuit configured to receive the detection signal and detect an occupancy condition in the space in response to the detection signal. The combination of the supplemental signal with the ultrasonic reception voltage signal may ensure that the magnitudes of signals processed by the ultrasonic receiving circuit are large enough that the ultrasonic receiving circuit may appropriately generate the detection signal and the control circuit may detect the occupancy condition.

20 Claims, 14 Drawing Sheets

(51) Int. Cl.
*G01S 7/524* (2006.01)
*G01S 7/53* (2006.01)
*G01S 15/04* (2006.01)
*G01S 15/86* (2020.01)
*G01S 7/521* (2006.01)

(56) References Cited

U.S. PATENT DOCUMENTS

| | | | |
|---|---|---|---|
| 6,759,954 B1 * | 7/2004 | Myron | H05B 47/12 |
| | | | 340/555 |
| 7,211,798 B2 * | 5/2007 | Wu | G08B 13/19 |
| | | | 250/353 |
| D561,630 S | 2/2008 | Bandringa et al. | |
| D573,053 S | 7/2008 | Bandringa et al. | |
| D588,484 S | 3/2009 | Bandringa et al. | |
| D597,430 S | 8/2009 | Sloan et al. | |
| D603,284 S | 11/2009 | Sloan et al. | |
| 8,514,075 B1 | 8/2013 | Steiner | |
| 9,157,898 B1 | 10/2015 | Steiner | |
| 10,054,916 B2 | 8/2018 | Steiner et al. | |
| 2023/0126895 A1 * | 4/2023 | Baker | G01S 13/04 |
| | | | 342/146 |

OTHER PUBLICATIONS

Lutron Electronics Co., Inc., Ultrasonic Ceiling Mount Sensor Specification Submittal, Jun. 4, 2014, 7 pages.
Hubbell Control Solutions, Omni Low Voltage Acoustic And Pir Ceiling Sensor Product Specification, Jan. 21, 2020, 4 pages.
Hubbell Control Solutions, Omni® Low Voltage Ultrasonic And Pir Ceiling Sensor Product Specification, Feb. 8, 2021, 4 pages.
Hubbell Control Solutions, Omni® Low Voltage Ultrasonic Ceiling Sensor Product Specification, Mar. 15, 2021, 4 pages.
Acuity Brands Lighting, Inc., nLight rCMS Sensor Ceiling/Surface Mount Sensor Installation Instructions, Apr. 29, 2021, 1 page.

* cited by examiner

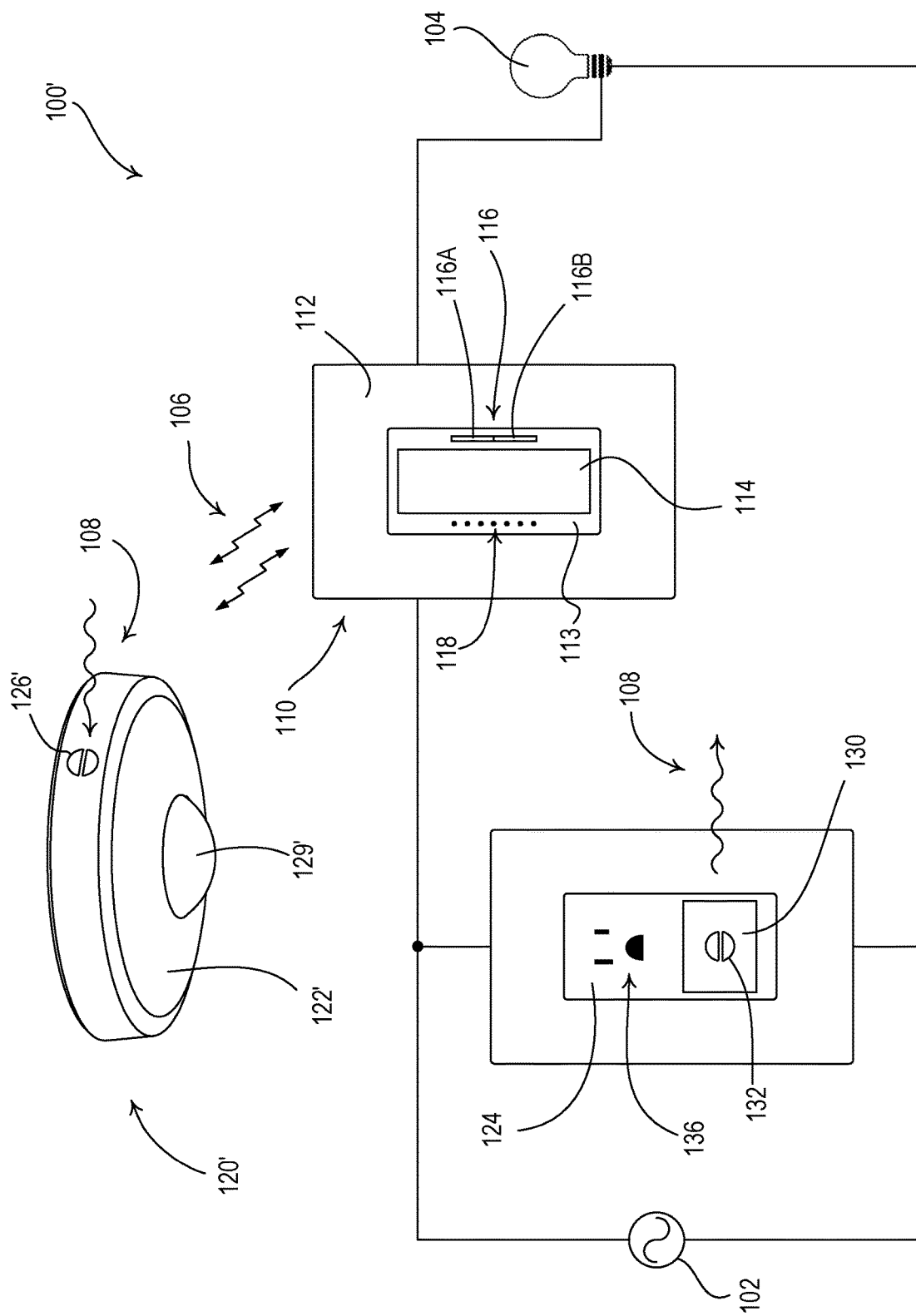

SENSOR DEVICE HAVING AN ULTRASONIC RECEIVING CIRCUIT

CROSS-REFERENCE TO RELATED APPLICATIONS

This application claims priority to U.S. Provisional Patent Application No. 63/339,211, filed on May 6, 2022, the entire disclosure of which is incorporated by reference herein.

BACKGROUND

Occupancy and vacancy sensors are often used to detect occupancy and/or vacancy conditions in a space in order to control an electrical load, such as, for example, a lighting load. An occupancy sensor typically operates to turn on the lighting load when the occupancy sensor detects the presence of a user in the space (e.g., an occupancy condition) and then to turn off the lighting load when the occupancy sensor detects that the user has left the space (e.g., a vacancy condition). A vacancy sensor typically operates to turn off the lighting load when the vacancy sensor detects a vacancy in the space. Therefore, when using a vacancy sensor, the lighting load must be turned on, such as manually (e.g., in response to a manual actuation of a control actuator).

Occupancy and vacancy sensors have been provided in wall-mounted load control devices that are coupled between an alternating-current (AC) power source and an electrical load for control of the amount of power delivered to the electrical load. Other occupancy and vacancy sensors have been provided as part of lighting control systems. These sensors may be coupled via a wired control link to a lighting controller (e.g., a central processor), which then controls the lighting loads accordingly. Other sensors may be battery-powered and may be operable to transmit wireless signals, such as radio-frequency (RF) signals, to a lighting controller or directly to load control devices, such as dimmer switches. The occupancy and vacancy sensors in lighting control systems may be mounted to the ceiling or high on a wall. Therefore, the occupancy and vacancy sensors may be positioned optimally to detect the presence of the user in all areas of the space.

An occupancy and/or vacancy sensor typically comprises an internal detector, such as, for example, a pyroelectric infrared (PIR) detector, and a lens for directing energy to the internal detector for detecting the presence of the user in the space. In addition, some occupancy and vacancy sensors have included ultrasonic receiving circuits for detecting the presence of the user in the space. Such ultrasonic sensors may transmit ultrasonic waves at a predetermined frequency, and analyze received ultrasonic waves to determine if there is an occupant in the space. The received ultrasonic waves that are reflected off moving objects may be characterized by a Doppler shift with respect to the transmitted ultrasonic waves, while the received ultrasonic waves that are produced by reflections off static objects (e.g., the walls, ceiling, floor, and other stationary objects) of the room may not have a Doppler shift. Therefore, ultrasonic sensors are able to determine if there is an occupant in the space if there is a Doppler shift between the frequencies of the transmitted and received ultrasonic waves.

SUMMARY

As described herein, a sensor device may comprise an ultrasonic receiving element that is configured to receive ultrasonic waves and generate an ultrasonic reception voltage signal, and a control circuit configured to control generation of a supplemental signal that is combined with the ultrasonic reception voltage signal. The ultrasonic waves may comprise non-Doppler-shifted ultrasonic waves when the space is vacant and a combination of non-Doppler-shifted ultrasonic waves and Doppler-shifted waves when the space is occupied. The non-Doppler-shifted ultrasonic waves may be characterized by an ultrasonic frequency. The supplemental signal may also be characterized by the same ultrasonic frequency. The sensor device may comprise an ultrasonic receiving circuit configured to receive the combination of the ultrasonic reception voltage signal and the supplemental signal, and generate a detection signal that indicates when the space is occupied. The control circuit may be configured to receive the detection signal and detect an occupancy condition in the space in response to the detection signal. The combination of the supplemental signal with the ultrasonic reception voltage signal may ensure that the magnitudes of signals processed by the ultrasonic receiving circuit are large enough that the ultrasonic receiving circuit may appropriately generate the detection signal and the control circuit may detect the occupancy condition in the space.

In addition, the sensor device may further comprise a signal generator circuit configured to generate the supplemental signal. The control circuit may be configured to generate a signal generation control signal that is received by the signal generator circuit for controlling the generation of the supplemental signal. For example, the control circuit may pulse-width modulate the signal generation control signal at the ultrasonic frequency. The control circuit may control the signal generation control signal to enable and disable the signal generator circuit. The control circuit may enable the signal generator circuit to generate the supplemental signal in a first mode (e.g., a large space mode) and disable the signal generator circuit to cease generation of the supplemental signal in a second mode (e.g., a small space mode). The control circuit may determine to operate in one of the first and second modes in response to an actuation of an actuator and/or in response to a message received via a communication circuit.

Further, the control circuit may be configured to automatically determine to operate in one of the first and second modes, for example, in response to a monitored voltage of the ultrasonic receiving circuit. The monitored voltage may have a magnitude that indicates that the ultrasonic reception signal (e.g., when the signal generator circuit is disabled) or the combination of the ultrasonic reception voltage signal and the supplemental signal (e.g., when the signal generator circuit is enabled) may be properly processed by the ultrasonic receiving circuit to generate the detection signal. For example, the control circuit may be configured to receive the monitored voltage and, while signal generator circuit is disabled, determine to operate in the large space mode when the magnitude of the monitored voltage indicates that the ultrasonic reception signal may not be properly processed by the ultrasonic receiving circuit to generate the detection signal.

The control circuit may also be configured to control a phase of the signal generation control signal to control a phase of the supplemental signal. The control circuit may adjust the phase of the supplemental signal when the control circuit determines that the supplemental signal is out of phase (e.g., approximately 180 degrees out of phase) with the received ultrasonic waves, and adjust the phase of the supplemental signal until the control circuit determines that the supplemental signal is not out of phase (e.g., approximately 180 degrees out of phase) with the received ultrasonic waves. The control circuit may receive the monitored voltage and measure a first magnitude of the monitored voltage of the ultrasonic receiving circuit when the signal generation circuit is disabled, measure when a second magnitude of the monitored voltage of the ultrasonic receiving circuit when the signal generation circuit is enabled, and determine to adjust the phase of the signal generation control signal when the second magnitude of the monitored voltage is less than the first magnitude of the monitored voltage. The control circuit may adjust the phase of the supplemental signal until the second magnitude of the monitored voltage is approximately equal to a magnitude that may be properly processed by the ultrasonic receiving circuit to generate the detection signal (e.g., such as the first magnitude of the monitored voltage).

The signal generator circuit may be configured to generate the supplemental signal as a sinusoidal signal at the ultrasonic frequency in response to the signal generation control signal. The control circuit may be configured to adjust the peak-to-peak magnitude of the supplemental signal in response to a noise floor of the detection signal generated by the ultrasonic receiving circuit. The control circuit may be configured to determine the noise floor of the detection signal in response to a magnitude of the detection signal. The control circuit may be configured to automatically adjust the peak-to-peak magnitude of the supplemental signal in response to the noise floor of the detection signal when the space in vacant. The control circuit may be configured to adjust the peak-to-peak magnitude of the supplemental signal to a first magnitude when a magnitude of the noise floor of the detection signal is less than a threshold, and to a second magnitude when the magnitude of the noise floor of the detection signal is greater than the threshold, wherein the second magnitude is less than the first magnitude. The control circuit may be configured to adjust the peak-to-peak magnitude of the supplemental signal as a function of a magnitude of the noise floor of the detection signal.

In addition, the sensor device may comprise an enclosure for housing the ultrasonic receiving element, the signal generator circuit, the ultrasonic receiving circuit, and the control circuit. The enclosure may comprise an opening in a front surface of the enclosure. The ultrasonic receiving element may be configured to receive the ultrasonic waves through the opening. The opening may have a diameter that is approximately equal to a wavelength of the ultrasonic waves and a depth between the front surface of the enclosure and the ultrasonic receiving element that is approximately equal to one-fourth of the wavelength of the ultrasonic waves.

In some examples, the sensor device may comprise a first and second ultrasonic receiving elements configured to receive ultrasonic waves and generate a respective first and second ultrasonic reception voltage signals, and first and second ultrasonic receiving circuits configured to receive the respective first and second ultrasonic reception voltage signals. The first and second ultrasonic receiving circuits may be configured to generate respective first and second detection signals that both indicate when the space is occupied in response to the respective first and second ultrasonic reception voltage signals. The control circuit may be configured to receive the first and second detection signals. The control circuit may be further configured to detect an occupancy condition in the space in response to both the first and second detection signals, just the first detection signal, or just the second detection signal. For example, the control circuit may be configured to determine to be responsive to both the first and second detection signals, just the first detection signal, or just the second detection signal in response to at least one of an actuation of an actuator of the sensor device or message received by the sensor device.

BRIEF DESCRIPTION OF THE DRAWINGS

FIG. 1B is a diagram of another example load control system having a sensor device with an ultrasonic receiving element and an external ultrasonic transmitting device.

DETAILED DESCRIPTION

Figure 1A:
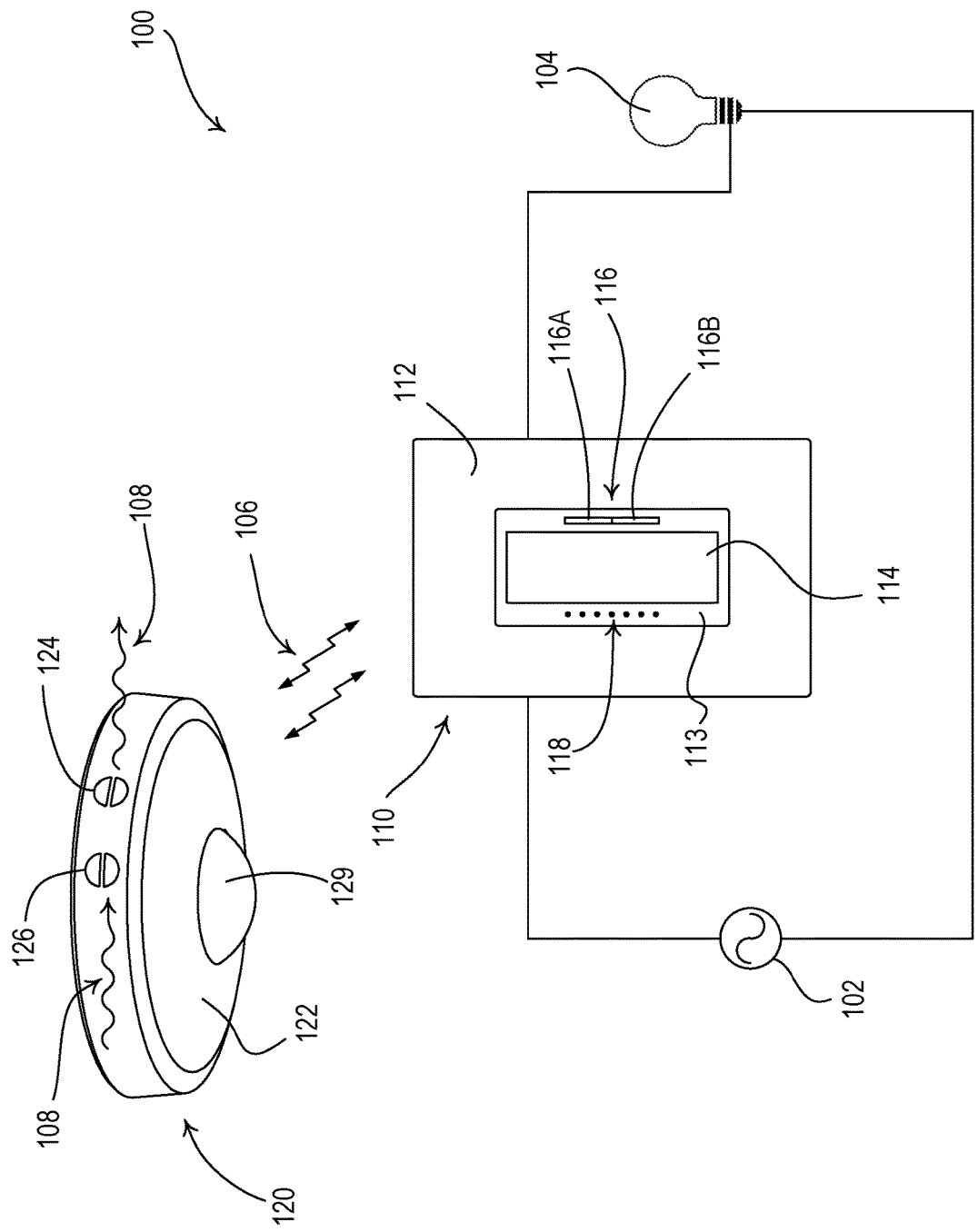
FIG. 1A is a diagram of an example load control system having a sensor device with ultrasonic transmitting and receiving elements.

FIG. 1A is a diagram of an example load control system 100 having a load control device 110 (e.g., a dimmer switch and/or an electronic switch) and a sensor device 120. The load control device 110 may be coupled in series electrical connection between a power source, such as an alternating-current (AC) power source 102, and an electrical load, such as a lighting load 104, for controlling the amount of power delivered to the lighting load 104 and thus an intensity of the lighting load 104. For example, the load control device 110 may be adapted to be mounted in an electrical wallbox, plugged into an electrical receptacle, and/or mounted remotely (e.g., to a junction box above a ceiling and/or inside a wall). The load control device 110 may comprise a faceplate 112 and a bezel 113 received in an opening of the faceplate. The load control device 110 may further comprise a toggle actuator 114 (e.g., a button) and an intensity adjustment actuator 116. Successive actuations of the toggle actuator 114 toggle, e.g., may turn off and on, the lighting load 104. Actuations of an upper portion 116A or a lower portion 116B of the intensity adjustment actuator 116 may respectively increase or decrease the amount of power delivered to the lighting load 104 and thus increase or decrease the intensity of the lighting load 104 from a minimum intensity (e.g., 1%) to a maximum intensity (e.g., 100%). A plurality of visual indicators 118, e.g., light-emitting diodes (LEDs), may be arranged in a linear array on the left side of the bezel 113. The visual indicators 118 may be illuminated to provide feedback of the intensity of the lighting load 104.

The sensor device 120 may be mounted to a ceiling or a wall, for example, in the vicinity of (e.g., a space around) the lighting load 104 controlled by the load control device 110, such that the sensor device 120 may be configured to detect an occupancy condition (e.g., the presence of the occupant) and/or a vacancy condition (e.g., the absence of the occupant) in the vicinity of the lighting load. The load control system 100 may comprise additional sensor devices 120 that are spaced apart so as to detect occupancy and/or vacancy conditions in different areas of the space around the lighting load 104. The sensor device 120 may be configured to generate one or more control signals in response to detecting occupancy conditions and/or vacancy conditions in the space around the lighting load 104. For example, the sensor device 120 may be configured to generate an analog control signal (e.g., via a contact closure output circuit) that may be in one of two states depending upon the detection of an occupancy condition or a vacancy condition. In addition, the sensor device 120 may be configured to transmit a message (e.g., a digital message) to the load control device 110 wirelessly via wireless signals, such as, radio-frequency (RF) signals 106, and/or via a wired communication link (not shown) in response to detecting occupancy conditions and/or vacancy conditions in the space around the lighting load 104. The sensor device 120 may be battery-powered, and/or may be connected to an external power source, such as the AC power source 102 and/or a direct-current (DC) power supply (not shown). The load control device 110 may be configured to turn on the lighting load 104 in response to receiving an indication of an occupancy condition from the sensor device 120 and turn off the lighting load 104 in response to receiving an indication of a vacancy condition from the sensor device 120.

The sensor device 120 may include an occupancy detection circuit, such as an ultrasonic detection circuit comprising an ultrasonic transmitting element and/or an ultrasonic receiving element, which may be housed in an enclosure 122. The enclosure 122 may comprise a first opening 124 for allowing ultrasonic waves 108 to be transmitted from the sensor device 120 by the ultrasonic transmitting element and a second opening 126 for allowing the ultrasonic waves to be received by the ultrasonic receiving element inside the sensor device 120. The sensor device 120 may be configured to determine whether occupancy conditions and/or vacancy conditions are presently occurring in the space in response to the ultrasonic waves 108 received by the ultrasonic receiving element as will be described in greater detail below. For example, the ultrasonic waves 108 may be transmitted by the sensor device 120 at an ultrasonic transmission frequency $f_{US}$ (e.g., approximately 40 kHz).

The ultrasonic waves 108 transmitted by the sensor device 120 may be reflected off objects in the space back towards the sensor device 120. The transmitted ultrasonic waves 108 may be reflected off static objects in the space and moving objects in the space. The ultrasonic waves 108 that are reflected off static objects may be characterized by the ultrasonic transmission frequency $f_{US}$ (e.g., exhibit no change in frequency). The ultrasonic waves 108 that are reflected off moving objects may not be characterized by the ultrasonic transmission frequency $f_{US}$, but may exhibit a change in frequency (e.g., a Doppler shift), which may indicate movement in the space (e.g., may indicate an occupancy condition). For example, the ultrasonic waves 108 that are reflected off moving objects may be characterized by a Doppler-shifted frequency $f_{DS}$ (e.g., such as approximately 40.0-40.5 kHz or 39.5-40.0 kHz). The sensor device 120 may receive the reflected ultrasonic waves 108, which may be a sum of the Doppler-shifted reflected waves (e.g., reflected off moving objects) and the non-Doppler-shifted reflected waves (e.g., reflected off static objects).

While not shown in FIG. 1A, the sensor device 120 may also comprise a second pair of ultrasonic elements (e.g., another ultrasonic transmitting element and another ultrasonic receiving element with corresponding openings) on an opposing side of the sensor device 120. The additional ultrasonic transmitting and receiving elements may allow the sensor device 120 to have additional occupancy and/or vacancy detection coverage. The sensor device 120 may be configured to use both pairs of ultrasonic transmitting and receiving elements, just the first pair of ultrasonic transmitting and receiving elements, or just the second pair of ultrasonic transmitting and receiving elements to detection occupancy and/or vacancy conditions (e.g., both of the ultrasonic detection signals, just the first ultrasonic detection signal, or just the second ultrasonic detection signal). In addition, the sensor device 120 could include a third pair or fourth pair of ultrasonic transmitting and receiving elements and corresponding openings.

Since the sensor device 120 may be located closer to objects in the space when the sensor device 120 is installed in a small space, the received ultrasonic waves 108 may be relatively large in magnitude as compared to when the sensor device 120 is installed in a large space. The sensor device 120 may be configured to operate in a small space mode (e.g., a large-signal mode) and a large space mode (e.g., a small-signal mode). While in the small space mode, the sensor device 120 may be configured to receive and process ultrasonic waves 108 having a relatively large magnitude (e.g., when the sensor device 120 is installed in small space). While in the large space mode, the sensor device 120 may be configured to receive and process ultrasonic waves 108 having a relatively small magnitude (e.g., when the sensor device 120 is installed in a large space).

In some examples, the sensor device 120 may also comprise an additional sensing circuit for detecting an occupancy and/or vacancy condition in the space (e.g., an additional occupant detection circuit). Such a sensor device may be referred to as a "dual-technology" sensor device. For example, the sensor device 120 may comprise an internal passive infrared (PIR) detection circuit having a pyroelectric detector, which may be configured to receive infrared energy from an occupant in the space via a lens 129 located on the enclosure 122. The sensor device 120 may be configured to detect occupancy and/or vacancy conditions in the space around the lighting load 104 in response to one of or both of the ultrasonic detection circuit and the PIR detection circuit. Since the PIR detection circuit may use different technology than the ultrasonic detection circuit, the dual-technology occupancy sensor may provide for an increased ability to detect the presence of an occupant in the space surrounding the sensor device 120. In addition, the additional sensing circuit of the sensor device 120 may also comprise, for example, a microwave detection circuit, a mm-wave radar, or any suitable detector or combination of detectors. An example of a sensor device having a PIR detection circuit is described in greater detail in U.S. Pat. No. 7,940,167, issued May 20, 2011, entitled BATTERY-POWERED OCCUPANCY SENSOR, the entire disclosure of which is hereby incorporated by reference.

The sensor device 120 may execute a configuration procedure (e.g., a calibration procedure), for example, to configure the operation of the sensor device 120 in the space in which the sensor device 120 is installed. For example, during the configuration procedure, the sensor device 120 may be configured to operate in one of the small space mode and the large space mode during configuration of the sensor device. In addition, the sensor device 120 may be configured to use both pairs of ultrasonic transmitting and receiving elements or either one or the other of the pairs of ultrasonic transmitting and receiving elements during the configuration procedure. For example, the sensor device 120 may be configured to execute the configuration procedure in response to a manual input, e.g., in response to an actuation of a button on the sensor device 120 and/or in response to a received message (e.g., transmitted in response to an actuation of a button on a remote control and/or a soft button on a display of a mobile device, such as a smart phone or tablet). In addition, the sensor device 120 may be configured to automatically execute the configuration procedure (e.g., as will be described in greater detail below). For example, the sensor device 120 may be configured to periodically execute the configuration procedure (e.g., once a month) when the space in which the sensor device is located is vacant (e.g., as determined in response to the ultrasonic detection circuit and/or the PIR detection circuit). The configuration procedure may be an initial configuration procedure executed after installation when the objects in the space are in their intended positions and when the space is vacant. Further, the configuration procedure may be a maintenance (e.g., recalibration) procedure executed (e.g., periodically executed) after the initial execution of the configuration procedure to check for changes in the received ultrasonic waves (e.g., due to changes in the locations of the objects in the space).

FIG. 1B is a diagram of another example load control system 100' having the load control device 110 and a sensor device 120' that only comprises an ultrasonic receiving element. As with the sensor device 120 shown in FIG. 1A, the sensor device 120' may be mounted to a ceiling or a wall, for example, in the vicinity of (e.g., a space around) the lighting load 104 controlled by the load control device 110, such that the sensor device 120' may be configured to detect an occupancy condition (e.g., the presence of the occupant) and/or a vacancy condition (e.g., the absence of the occupant) in the vicinity of the lighting load. In response to detecting occupancy conditions and/or vacancy conditions in the space around the lighting load 104, the sensor device 120' may be configured to generate one or more control signals (e.g., an analog control signal and/or message transmitted via a wired or wireless communication link) to which the load control device 110 may be responsive (e.g., to turn on the lighting load 104 in response to receiving an indication of an occupancy condition and turn off the lighting load 104 in response to receiving an indication of a vacancy condition).

The load control system 100' shown in FIG. 1B may also comprise one or more ultrasonic transmitting devices 130 (e.g., one ultrasonic transmitting device as shown in FIG. 1B). The ultrasonic transmitting device 130 may comprise an ultrasonic transmitting element (not shown) and an enclosure 132 having an opening 134 for allowing ultrasonic waves 108 to be transmitted from the ultrasonic transmitting device 130. The ultrasonic waves 108 may be transmitted by the sensor device 120 at an ultrasonic transmission frequency $f_{US}$ (e.g., approximately 40 kHz). For example, the ultrasonic transmitting device 130 may be configured to be plugged into an electrical receptable 136 that may have one or more electrical outlets 138. The electrical receptable 136 may be electrically coupled to the AC power source 102, such that the ultrasonic transmitting device 130 may be powered through the electrical receptacle 136. While only one ultrasonic transmitting devices 130 is shown in FIG. 1B, the load control system 100' may comprise additional ultrasonic transmitting devices. An example of a load control system having external ultrasonic transmitters is described in greater detail in commonly-assigned U.S. Patent Application Publication No. 2015/0180237, published Jun. 25, 2015, entitled ULTRASONIC SENSING SYSTEM, the entire disclosure of which is hereby incorporated by reference.

The sensor device 120' may include an occupancy detection circuit, such as an ultrasonic detection circuit having an ultrasonic receiving element. The sensor device 120' may comprise an enclosure 122' that has a single opening 126' for allowing the ultrasonic waves 108 that are transmitted by the remote ultrasonic transmitter 130 to be received by the ultrasonic receiving element inside the sensor device 120'. The ultrasonic waves 108 transmitted by the remote ultrasonic transmitter 130 may be reflected off objects (e.g., static objects and/or moving objects) in the space towards the sensor device 120'. The ultrasonic waves 108 that are reflected off static objects may be characterized by the ultrasonic transmission frequency $f_{US}$ (e.g., exhibit no change in frequency), while the ultrasonic waves 108 that are reflected off moving objects may not be characterized by the ultrasonic transmission frequency $f_{US}$, but may exhibit a change in frequency (e.g., a Doppler shift), which may indicate movement in the space (e.g., may indicate an occupancy condition). The sensor device 120' may be configured to determine whether occupancy conditions and/or vacancy conditions are presently occurring in the space in response to the ultrasonic waves 108 received by the ultrasonic receiving element.

While not shown in FIG. 1B, the sensor device 120' may also comprise another ultrasonic receiving element on an opposing side of the sensor device 120'. The additional ultrasonic receiving element may allow the sensor device 120' to have additional occupancy and/or vacancy detection coverage. The sensor device 120' may be configured to use both of the ultrasonic receiving elements, just the first ultrasonic receiving element, or just the second ultrasonic receiving element to detect occupancy and/or vacancy conditions (e.g., both of the ultrasonic detection signals, just the first ultrasonic detection signal, or just the second ultrasonic detection signal). In addition, the sensor device 120' could include a third or fourth ultrasonic receiving element and corresponding openings.

Like the sensor device 120 shown in FIG. 1A, the sensor device 120' may also be configured to operate in a small space mode (e.g., a large-signal mode) and a large space mode (e.g., a small-signal mode). While in the small space mode, the sensor device 120' may be configured to receive and process ultrasonic waves 108 having a relatively large magnitude (e.g., when the sensor device 120' is installed in small space). While in the large space mode, the sensor device 120' may be configured to receive and process ultrasonic waves 108 having a relatively small magnitude (e.g., when the sensor device 120' is installed in a large space).

In some examples, the sensor device 120' may also comprise an additional sensing circuit for detecting an occupancy and/or vacancy condition in the space (e.g., an additional occupant detection circuit). For example, the sensor device 120' may comprise an internal PIR detection circuit having a pyroelectric detector, which may be configured to receive infrared energy from an occupant in the space via a lens 129' located on the enclosure 122'. The sensor device 120' may be configured to detect occupancy and/or vacancy conditions in the space around the lighting load 104 in response to one of or both of the ultrasonic detection circuit and the PIR detection circuit Since the PIR detection circuit may use different technology than the ultrasonic detection circuit, the dual-technology occupancy sensor may provide for an increased ability to detect the presence of an occupant in the space surrounding the sensor device 120'. In addition, the additional sensing circuit of the sensor device 120' may also comprise, for example, a microwave detection circuit, a mm-wave radar, or any suitable detector or combination of detectors.

The sensor device 120' may execute a configuration procedure (e.g., a calibration procedure), for example, to configure the operation of the sensor device 120' in the space in which the sensor device 120' is installed. For example, during the configuration procedure, the sensor device 120' may be configured to operate in one of the small space mode and the large space mode during configuration of the sensor device. In addition, the sensor device 120' may be configured to use both of the ultrasonic receiving elements or either one of the ultrasonic receiving elements during the configuration procedure. For example, the sensor device 120' may be configured to execute the configuration procedure in response to a manual input, e.g., in response to an actuation of a button on the sensor device 120' and/or in response to a received message (e.g., transmitted in response to an actuation of a button on a remote control and/or a soft button on a display of a mobile device, such as a smart phone or tablet). In addition, the sensor device 120' may be configured to automatically execute the configuration procedure (e.g., as will be described in greater detail below). For example, the sensor device 120' may be configured to periodically execute the configuration procedure (e.g., once a month) when the space in which the sensor device is located is vacant (e.g., as determined in response to the ultrasonic detection circuit and/or the PIR detection circuit). The configuration procedure may be an initial configuration procedure executed after installation when the objects in the space are in their intended positions and when the space is vacant. Further, the configuration procedure may be a maintenance (e.g., recalibration) procedure executed (e.g., periodically executed) after the initial execution of the configuration procedure to check for changes in the received ultrasonic waves (e.g., due to changes in the locations of the objects in the space).

Figure 1C:
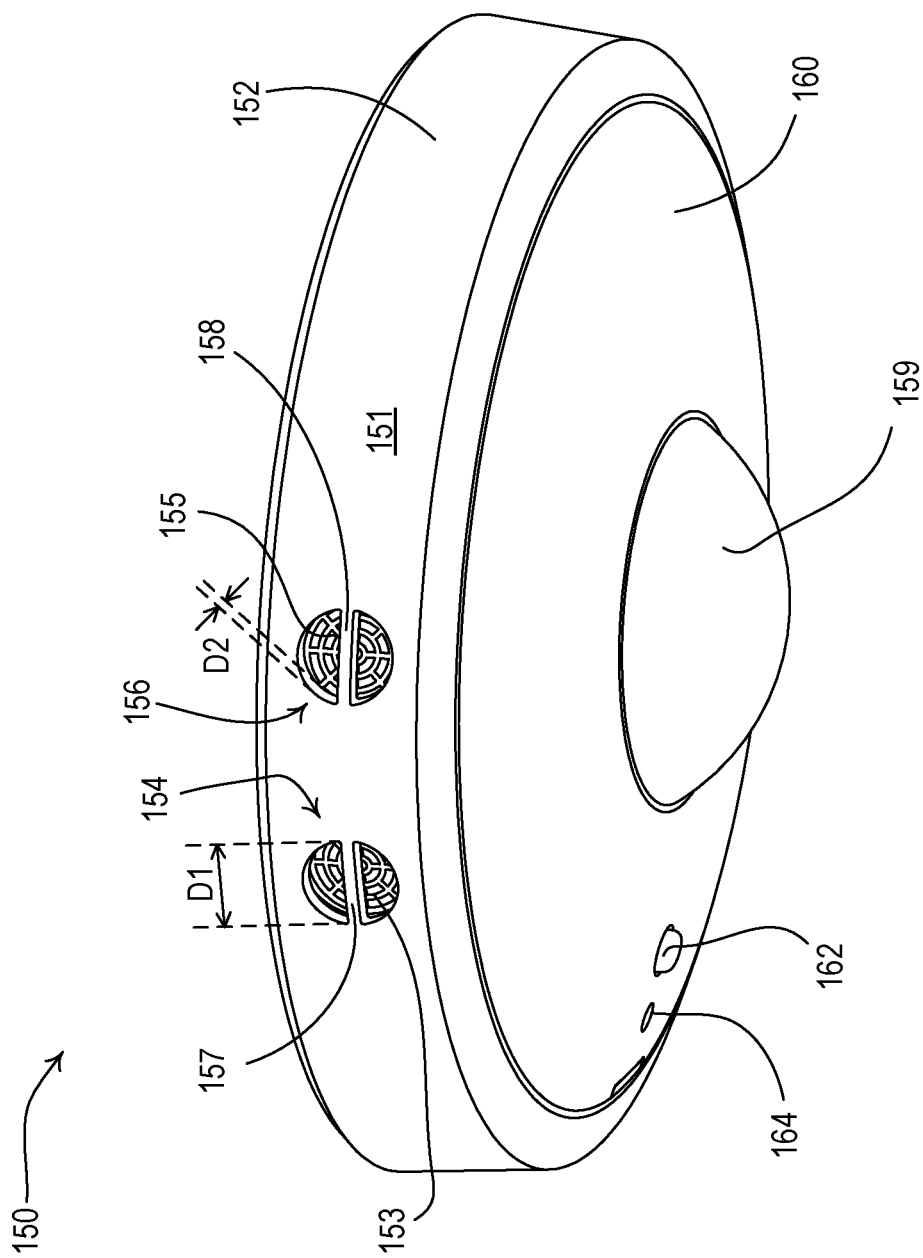
FIG. 1C is a perspective view of an example sensor device, such as the sensor device shown in FIG. 1A.

FIG. 1C is a perspective view of an example sensing device 150 (e.g., the sensor device 120 of the load control 100 shown in FIG. 1A). The sensor device 150 may be configured to detect an occupancy condition (e.g., the presence of the occupant) and/or a vacancy condition (e.g., the absence of the occupant) in the vicinity of a lighting load (e.g., the lighting load 104). The sensor device 150 may be mounted to a ceiling or a wall, for example, in the vicinity of (e.g., a space around) the lighting load, such that the sensor device 150 may be configured to detect the occupancy condition and/or the vacancy condition in the vicinity of the lighting load. The sensor device 150 may be configured to generate one or more control signals in response to detecting occupancy conditions and/or vacancy conditions in the space around the lighting load. For example, the sensor device 150 may be configured to generate an analog control signal (e.g., via a contact closure output circuit) and/or transmit a message (e.g., a digital message), which may be received by a load control device (e.g., the load control device 110) for controlling the lighting load in response to the detected occupancy and/or vacancy condition. The sensor device 150 may be battery-powered, and/or may be connected to an external power source.

The sensor device 150 may comprise an enclosure 152 for housing electrical circuitry of the sensor device 150. The sensor device 150 may include an occupancy detection circuit (e.g., a first occupancy detection circuit), such as an ultrasonic detection circuit comprising a pair of ultrasonic elements, such as an ultrasonic transmitting element 153 and/or an ultrasonic receiving element 155, which may be housed in the enclosure 152. The enclosure 152 may comprise a first opening 154 and a second opening 156 in an outer surface 151 of the enclosure 152. The ultrasonic transmitting element 153 and the ultrasonic receiving element 155 may be positioned behind (e.g., positioned immediately behind) the first opening 154 and the second opening 156, respectively. The first opening 154 may allow ultrasonic waves (e.g., the ultrasonic waves 108) to be transmitted from the sensor device 150 by the ultrasonic transmitting element 153 and the second opening 156 may allow the ultrasonic waves to be received by the ultrasonic receiving element 155 inside the sensor device 150. The ultrasonic waves may be transmitted by the sensor device 150 at an ultrasonic transmission frequency $f_{US}$ (e.g., approximately 40 kHz).

The ultrasonic waves transmitted by the sensor device 150 may be reflected off objects in the space back towards the sensor device 150. The transmitted ultrasonic waves may be reflected off static objects in the space and moving objects in the space. The ultrasonic waves that are reflected off static objects may be characterized by the ultrasonic transmission frequency $f_{US}$ (e.g., exhibit no change in frequency). The ultrasonic waves that are reflected off moving objects may not be characterized by the ultrasonic transmission frequency $f_{US}$, but may exhibit a change in frequency (e.g., a Doppler shift), which may indicate movement in the space (e.g., may indicate an occupancy condition). The sensor device 150 may be configured to determine whether occupancy conditions and/or vacancy conditions are presently occurring in the space in response to the ultrasonic waves received by the ultrasonic receiving element.

The first opening 154 may be sized and the ultrasonic transmitting element 153 may be located with respect to the first opening 154 to maximize the percentage of ultrasonic waves that are emitted by the ultrasonic transmitting element 153 that leave the enclosure 152 (e.g., to maximize the transmit power). In addition, the second opening 156 may be sized and the ultrasonic receiving element 155 may be located with respect to the second opening 156 to maximize the receive power. For example, each of the first and second openings 154, 156 may have a diameter D1 that is equal to approximately a wavelength $\lambda_{US}$ of the ultrasonic waves transmitted and received by the sensor device 150 (e.g., approximately 0.338 inches). In addition, each of the first and second openings 154, 156 may have a depth D2 (e.g., between the outer surface 151 of the enclosure 152 and the ultrasonic transmitting element 153 and the ultrasonic receiving element 155, respectively) that may be equal to approximately one-fourth of the wavelength $\lambda_{US}$ of the ultrasonic waves transmitted and received by the sensor device 150 (e.g., approximately 0.0845 inches). The enclosure 152 of the sensor device 150 may comprise a respective rib 257, 258 (e.g., a single rib) extending across each of the first and second openings 154, 156.

Since the sensor device 150 may be located closer to objects in the space when the sensor device 150 is installed in a small space, the received ultrasonic waves may be relatively large in magnitude as compared to when the sensor device 150 is installed in a large space. When the sensor device 150 is installed in a large space, the magnitude of the received ultrasonic waves may be too small to be processed by the ultrasonic receiving circuit of the sensor device 150. Some prior art sensor devices have relied on crosstalk between the ultrasonic transmitting element 153 and the ultrasonic receiving element 155 to guarantee proper operation in spaces of various sizes. For example, crosstalk between the ultrasonic transmitting element 153 and the ultrasonic receiving element 155 may occur when ultrasonic waves that are transmitted by the ultrasonic transmitting element 153 that are transmitted through the enclosure 152 to the ultrasonic receiving element 155 (e.g., and not out in the space).

Since the first opening 154 is sized and the ultrasonic transmitting element 153 is located with respect to the first opening 154 to maximize the transmit power, the sensor device 120 may be configured to operate in different modes to ensure proper operation of the sensor device 150 in spaces of various sizes. For example, the sensor device 150 may be configured to operate in a small space mode (e.g., a large-signal mode) and a large space mode (e.g., a small-signal mode). While in the small space mode, the sensor device 150 may be configured to receive and process ultrasonic waves having a relatively large magnitude (e.g., when the sensor device 150 is installed in small space). While in the large space mode, the sensor device 150 may be configured to receive and process ultrasonic waves 108 having a relatively small magnitude (e.g., when the sensor device 150 is installed in a large space).

While not shown in FIG. 1C, the sensor device 150 may also comprise a second pair of ultrasonic elements (e.g., another an ultrasonic transmitting element and/or ultrasonic receiving element with corresponding openings) on an opposing side of the sensor device 150. The additional ultrasonic transmitting and receiving elements may allow the sensor device 150 to have additional occupancy and/or vacancy detection coverage. In addition, the sensor device 150 may comprise only the ultrasonic receiving element 155 (e.g., and not the ultrasonic transmitting element 153), for example, when the sensor device 150 is deployed in a load control system having external ultrasonic transmitters (e.g., as with the sensor device 120' shown in FIG. 1B). In addition, the sensor device 150 could include a third pair or fourth pair of ultrasonic transmitting and receiving elements and corresponding openings.

In some examples, the sensor device 150 may also comprise an additional sensing circuit for detecting an occupancy and/or vacancy condition in the space (e.g., an additional occupant detection circuit). For example, the sensor device 150 may comprise an internal PIR detection circuit having a pyroelectric detector, which may be configured to receive infrared energy from an occupant in the space via a lens 159 located on the enclosure 152. The sensor device 150 may be configured to detect occupancy and/or vacancy conditions in the space around the lighting load in response to one of or both of the ultrasonic detection circuit and the PIR detection Since the PIR detection circuit may use different technology than the ultrasonic detection circuit, the dual-technology occupancy sensor may provide for an increased ability to detect the presence of an occupant in the space surrounding the sensor device 150. In addition, the additional sensing circuit of the sensor device 150 may also comprise, for example, a microwave detection circuit, a mm-wave radar, or any suitable detector or combination of detectors.

The sensor device 150 may execute a configuration procedure (e.g., a calibration procedure), for example, to configure the operation of the sensor device 150 in the space in which the sensor device 150 is installed. The sensor device 150 may comprise a cover portion 160 on which a button 162 and a visible indicator 164 may be provided. The sensor device 150 may also comprise additional buttons (not shown) and additional visible indicators (not shown) that may be accessed when the cover portion 160 is removed from the sensor device 150. During the configuration procedure, the button 162 and/or the additional buttons under the cover portion 160 may be actuated by a user, and the visible indicator 164 and/or the additional visible indicators under the cover portion 160 may be illuminated by the sensor device 150 to provide feedback. For example, the sensor device 150 may be configured to execute the configuration procedure in response to an actuation of the button 162 and/or the buttons under the cover portion 160. In addition, the control device 150 may be configured to operate in the small space mode and the large space mode in response to an actuation of the button 162 and/or the buttons under the cover portion 160. Further, the sensor device 150 may be configured to use both pairs of ultrasonic transmitting and receiving elements or either one or the other of the pairs ultrasonic transmitting and receiving elements in response to an actuation of the button 162 and/or the buttons under the cover portion 160. The sensor device 150 may also be configured to execute the configuration procedure and/or configure the operation of the sensor device 150 in response to one or more messages received from a remote programming device (e.g., a remote control and/or a mobile device). For example, the remote programming device may be configured to transmit the messages (e.g., via radio-frequency and/or infrared signals) to the sensor device 150 in response to an actuation of one or more buttons of the remote programming device.

Figure 2A:
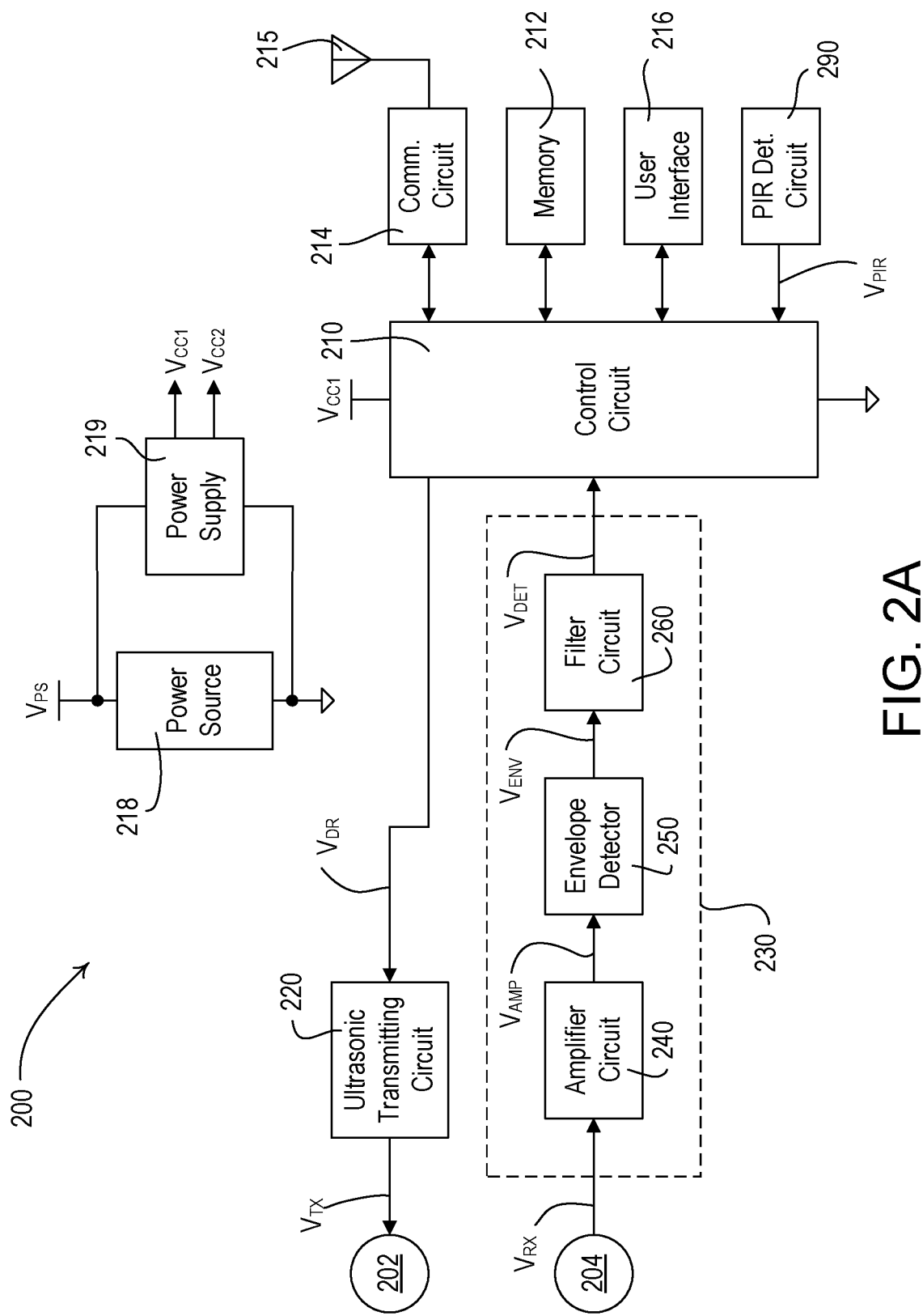
FIG. 2A is a block diagram of an example sensor device.

FIG. 2A is a block diagram of an example sensor device 200, which may be deployed as the sensor device 120 of the lighting control system 100 shown in FIG. 1A, the sensor device 120' of the load control system 100' shown in FIG. 1B, and/or the sensor device 150 shown in FIG. 1C. The sensor device 200 may comprise an ultrasonic transmitting element 202 for transmitting ultrasonic waves (e.g., the ultrasonic waves 108) and an ultrasonic receiving element 204 for receiving ultrasonic waves. For example, the ultrasonic transmitting element 202 may be configured to transmit the ultrasonic waves through an opening of an enclosure of the sensor device 200 (e.g., the first opening 124 of the enclosure 122), and the ultrasonic receiving element 204 may be configured to receive the ultrasonic waves through an opening of the enclosure of the sensor device 200 (e.g., the second opening 126 of the enclosure 122). For example, the ultrasonic transmitting element 202 and the ultrasonic receiving element 204 may both comprise piezoelectric elements.

The sensor device 200 may comprise a control circuit 210 coupled to the ultrasonic transmitting element 202 via an ultrasonic transmitting circuit 220 for driving the ultrasonic transmitting element 202 to transmit the ultrasonic waves. The control circuit 210 may also be coupled to the ultrasonic receiving element 204 via an ultrasonic receiving circuit 230 for receiving the ultrasonic waves to thus detect an occupancy and/or vacancy condition (e.g., the presence and/or absence of an occupant) in a space in which the sensor device 200 is installed. For example, the control circuit 210 may include one or more of a processor (e.g., a microprocessor), a microcontroller, a programmable logic device (PLD), a field programmable gate array (FPGA), an application specific integrated circuit (ASIC), or any suitable controller or processing device.

The sensor device 200 may comprise a memory 212 configured to store operational characteristics (e.g., such as operational settings, control parameters, indications of occupancy and/or vacancy conditions in the space, operating modes of the sensor device, etc.), association information for associations with other devices, and/or instructions for controlling electrical loads. The memory 212 may be implemented as an external integrated circuit (IC) or as an internal circuit of the control circuit 210. The memory 212 may comprise a computer-readable storage media or machine-readable storage media that maintains computer-executable instructions for performing one or more procedure and/or functions as described herein. For example, the memory 212 may comprise computer-executable instructions or machine-readable instructions that when executed by the control circuit configure the control circuit to provide one or more portions of the procedures described herein. The control circuit 210 may access the instructions from memory 212 for being executed to cause the control circuit 210 to operate as described herein, or to operate one or more other devices as described herein. The memory 212 may comprise computer-executable instructions for executing configuration software. For example, the operational characteristics and/or the association information stored in the memory 212 may be configured during a configuration procedure of the sensor device 200.

The sensor device 200 may comprise a communication circuit 214 that may allow the control circuit 210 to communicate (e.g., transmit and/or receive) communication signals, e.g., wired communication signals and/or wireless communication signals, such as radio-frequency (RF) signals. The communication circuit 214 may comprise, for example, an RF transceiver, an RF receiver, an RF transmitter, an infrared (IR) receiver, and/or other suitable wireless communication circuit. For example, the communication circuit 214 may be coupled to an antenna 215 for transmission and/or reception of the RF signals. The sensor device 200 may be configured to communicate messages (e.g., digital messages) with external control devices (e.g., load control devices, such as the load control device 100). For example, the control circuit 210 may be configured to transmit messages to the load control devices via the communication circuit 214 when an occupancy and/or vacancy condition is detected in response to the ultrasonic receiving circuit 230. In addition, the control circuit 210 to execute the configuration procedure and/or adjust the operational characteristics and/or settings of the sensor device 200 in response to messages received via the communication circuit 214 (e.g., received from a remote control and/or a mobile device).

The sensor device 200 may comprise a user interface circuit 216. The user interface circuit 216 may include, for example, one or more actuators (e.g., mechanical tactile switches) that may be actuated by buttons (e.g., the button 162 and/or the buttons under the cover portion 160 of the sensor device 150 shown in FIG. 1C) for receiving user inputs. The user interface circuit 216 may also comprise one or more lights sources (e.g., light-emitting diodes) for illuminating visual indicators (e.g., the visible indicator 164 and/or the visible indicators under the cover portion 160 of the sensor device 150 shown in FIG. 1C) for providing user feedback. The control circuit 210 may be configured to execute the configuration procedure and/or adjust the operational characteristics and/or settings of the sensor device 200 in response to actuations of the actuators of the user interface circuit 216 and/or illuminate the visual indicators of the user interface 216 to provide feedback (e.g., during the configuration procedure of the sensor device 200).

The sensor device 200 may comprise a power source 218 for producing a power source voltage $V_{PS}$ for powering the control circuit 210 and other low-voltage circuitry of the sensor device 200. For example, the power source 218 may comprise one or more batteries and/or a photo-voltaic power source (e.g., a solar cell). In addition, the power source 218 may comprise one or more energy storage elements, such as super capacitors and/or rechargeable batteries. Further, the power source 218 may also be configured to receive power from an external power source, such as an external direct-current (DC) power source or an alternating-current (AC) power source. The sensor device 200 may also comprise a power supply 219 that may be configured to receive the power source voltage $V_{PS}$ and generate one or more DC supply voltages. For example, the power supply 219 may be configured to generate a first supply voltage $V_{CC1}$ (e.g., approximately 3.3 volts) for powering the control circuit 210, the memory 212, the communication circuit 214, and/or the user interface circuit 216. In addition, the power supply 219 may be configured to generate a second supply voltage $V_{CC2}$ (e.g., approximately 10 volts) for powering the ultrasonic transmitting circuit 220 and/or the ultrasonic receiving circuit 230.

The ultrasonic transmitting circuit 220 may be configured to drive the ultrasonic transmitting element 202 to cause the ultrasonic transmitting element 202 to emit ultrasonic waves, which may be transmitted from the sensor device 200. For example, the ultrasonic drive circuit 220 may comprise a drive circuit, such as an H-bridge drive circuit, for energizing the ultrasonic transmitting element 202. The control circuit 210 may generate an ultrasonic drive signal $V_{DR}$, which may be received by the ultrasonic transmitting circuit 220 for causing the ultrasonic transmitting circuit 220 to generate an ultrasonic transmission signal $V_{TX}$. The ultrasonic transmitting circuit 220 may drive the ultrasonic transmitting element 202 with the ultrasonic transmission signal $V_{TX}$ for causing the ultrasonic transmitting element 202 to emit the ultrasonic waves. For example, the ultrasonic transmission signal $V_{TX}$ may comprise a periodic oscillating voltage, such as an alternating-current (AC) voltage, a pulse-width modulated (PWM) voltage, a square-wave voltage, a triangle-wave voltage, and/or a sinusoidal voltage. The ultrasonic drive signal $V_{DR}$ may be characterized by an ultrasonic transmission frequency $f_{US}$ (e.g., approximately kHz) and a duty cycle of approximately 50% (e.g., or another appropriate duty cycle for transmitting the ultrasonic waves). The ultrasonic transmission signal $V_{TX}$ may also be characterized by the ultrasonic transmission frequency $f_{US}$. The control circuit 210 may control a phase $\Phi_{DR}$ of the ultrasonic drive signal $V_{DR}$ to control a phase $\Phi_{TX}$ of the transmitted ultrasonic waves. For example, the control circuit 210 may control the phase $\Phi_{TX}$ of the transmitted ultrasonic waves to be zero.

The transmitted ultrasonic waves emitted by the ultrasonic transmitting element 202 may be reflected off objects (e.g., static objects and moving objects) in the space back towards the sensor device 200. The ultrasonic waves that are reflected off static objects may be characterized by the ultrasonic transmission frequency $f_{US}$, and the ultrasonic waves that are reflected off moving objects may exhibit a change in frequency (e.g., a Doppler shift). For example, the ultrasonic waves that are reflected off moving objects may be characterized by a Doppler-shifted frequency f D s, such as approximately 39.5-40.0 kHz or 40.0-40.5 kHz. The change $\Delta f$ in frequency (e.g., $\Delta f = f_{DS} - f_{US}$) due to the Doppler shift may be, for example, approximately 100-500 Hz. Reception of only non-Doppler-shifted reflected waves by the control device 200 may indicate a vacancy condition in the space, while reception of at least some Doppler-shifted reflected waves may indicate an occupancy condition in the space. Both the non-Doppler-shifted reflected waves and the Doppler-shifted reflected waves may be characterized by a phase delay $\Phi_{PD}$ as compared to the transmitted ultrasonic waves due to the propagation delay of the ultrasound from the reflecting object. For example, the phase delay $\Phi_{PD}$ may be the difference between a phase $\Phi_{RX}$ of the received ultrasonic waves and the phase $\Phi_{TX}$ of the transmitted ultrasonic waves.

The reflected ultrasonic waves may be received by the ultrasonic receiving element 204, which may generate an ultrasonic reception signal $V_{RX}$ (e.g., an ultrasonic reception voltage signal) in response to the received ultrasonic waves. For example, the ultrasonic reception signal $V_{RX}$ may comprise a periodic oscillating signal, e.g., a sinusoidal voltage. The received ultrasonic waves may be a sum of the Doppler-shifted reflected waves (e.g., reflected off moving objects) and the non-Doppler-shifted reflected waves (e.g., reflected off static objects). As a result, the ultrasonic reception signal $V_{RX}$ may be the sum of a non-Doppler-shifted reception signal $V_{NS}$ and a Doppler-shifted reception signal $V_{DS}$. The ultrasonic reception signal $V_{RX}$ may be delayed from the ultrasonic transmission signal $V_{TX}$ by the phase delay $\Phi_{PD}$ (e.g., between the received ultrasonic waves and the transmitted ultrasonic waves).

The ultrasonic receiving circuit 230 may receive the ultrasonic reception signal $V_{RX}$ and generate an ultrasonic detection signal $V_{DET}$, e.g., that may indicate an occupancy or vacancy condition in the space in which the sensor device 200 is located. The ultrasonic receiving circuit 230 may comprise an amplifier circuit 240 that may receive and amplify the ultrasonic reception signal $V_{RX}$ to generate an amplified voltage $V_{AMP}$. The amplifier circuit 240 may be configured to add an offset voltage $V_{OFF}$ (e.g., a DC offset voltage) to the ultrasonic reception signal $V_{RX}$ prior to amplification. The amplifier circuit 240 may be characterized by a gain a (e.g., approximately 10). For example, the amplified voltage $V_{AMP}$ may be a sinusoidal voltage characterized by a DC offset.

The ultrasonic receiving circuit 230 may also comprise an envelope detector circuit 250, which may receive the amplified signal $V_{AMP}$ and generate an envelope signal $V_{ENV}$. The envelope detector circuit 250 may comprise, for example, an amplitude-modulation (AM) demodulator circuit. For example, the envelope detector circuit 250 may be characterized by a gain β (e.g., approximately two). The magnitude of the envelope signal $V_{ENV}$ may follow (e.g., be proportional to) the envelope of the amplified signal $V_{AMP}$. For example, when there is not a Doppler shift in the received ultrasonic waves, the envelope signal $V_{ENV}$ may be a DC voltage having magnitude approximately equal to two times a peak magnitude of the amplified signal $V_{AMP}$. In addition, when there is a Doppler shift in the received ultrasonic waves, the envelope signal $V_{ENV}$ may be a sinusoidal voltage characterized by a DC offset and a frequency $f_{ENV}$ that is approximately equal to the change $\Delta f$ in frequency due to the Doppler shift.

The ultrasonic receiving circuit 230 may further comprise a filter circuit 260, which may receive and filter the envelope signal $V_{ENV}$ to generate the ultrasonic detection signal $V_{DET}$ (e.g., a filtered signal). The ultrasonic detection signal $V_{DET}$ may be received by the control circuit 210, which may be configured to sample the ultrasonic detection signal $V_{DET}$ in order to detect an occupancy and/or vacancy condition in response to the received ultrasonic waves. The filter circuit 260 may comprise, for example, a bandpass filter circuit. For example, the filter circuit 260 may be characterized with a bandwidth of approximately 500 Hz. The filter circuit 260 may also operate as an anti-aliasing filter to restrict the bandwidth of the ultrasonic detection signal $V_{DET}$, such that the ultrasonic detection signal $V_{DET}$ may be appropriately sampled by the control circuit 210. For example, when there is a Doppler shift in the received ultrasonic waves, the ultrasonic detection signal $V_{DET}$ may be a sinusoidal voltage characterized by a frequency $f_{DET}$ that is approximately equal to the change $\Delta f$ in frequency due to the Doppler shift.

The control circuit 210 may be configured to receive the ultrasonic detection signal $V_{DET}$ and detect an occupancy and/or vacancy condition in the space in which the sensor device 200 is installed in response to the ultrasonic detection signal $V_{DET}$. For example, the control circuit 210 may comprise an analog-to-digital converter (ADC) for sampling the ultrasonic detection signal $V_{DET}$. The control circuit 210 may be configured to determine that an occupancy condition exists when there is a Doppler shift in the received ultrasonic waves and the ultrasonic detection signal $V_{DET}$ is a sinusoidal voltage (e.g., having a frequency of approximately 100-500 Hz). The control circuit 210 may be configured to determine that a vacancy condition exists when there is not a Doppler shift in the received ultrasonic waves and the magnitude of the ultrasonic detection signal $V_{DET}$ is substantially small (e.g., approximately zero volts and/or only having magnitude due to noise). For example, the control circuit 210 may be configured to detect the occupancy condition when the magnitude of the ultrasonic detection signal $V_{DET}$ is greater than an upper voltage threshold $V_{TH+}$ (e.g., approximately 50% of a maximum magnitude of the ultrasonic detection signal $V_{DET}$) or less than a lower voltage threshold $V_{TH-}$ (e.g., approximately 25% of the maximum magnitude of the ultrasonic detection signal $V_{DET}$). Since the ultrasonic detection signal $V_{DET}$ has a DC offset, the magnitude of the ultrasonic detection signal $V_{DET}$ may remain between the upper voltage threshold $V_{TH+}$ and the lower voltage threshold $V_{TH-}$ when there is not an occupancy condition in the space. The upper voltage threshold $V_{TH+}$ and the lower voltage threshold $V_{TH-}$ may be predetermined fixed values and/or may be adjustable by the control circuit 210. In addition, the control circuit 210 may be configured to digitally filter the ultrasonic detection signal $V_{DET}$ received from the filter circuit 270 to provide additional filtering before attempting to detect an occupancy and/or vacancy condition.

While not shown in FIG. 2A, the sensor device 200 may also comprise a second pair of ultrasonic elements (e.g., another ultrasonic transmitting element and another ultrasonic receiving element). The control circuit 210 may be configured to generate a second ultrasonic drive signal (e.g., similar to the first ultrasonic drive signal $V_{DR}$), which may be received by a second ultrasonic transmitting circuit (e.g., which may be the same as the ultrasonic transmitting circuit 220) for causing the second ultrasonic transmitting element to emit the ultrasonic waves. For example, the control circuit 210 may be configured to generate (e.g., initially generate) the ultrasonic drive signals out of phase with each other (e.g., approximately 90° or 180° out of phase with each other). The sensor device 200 may comprise a second ultrasonic receiving circuit (e.g., which may be the same as the first ultrasonic receiving circuit 230 shown in FIG. 2A) that may be configured to generate a second ultrasonic detection signal (e.g., similar to the first ultrasonic detection signal $V_{DET}$ generated by the first ultrasonic receiving circuit 230) in response to ultrasonic waves received by the second ultrasonic receiving element.

During the configuration procedure of the sensor device 200, the sensor device 200 may be configured to use both of the ultrasonic receiving circuits (e.g., both the first ultrasonic receiving circuit 230 and the second ultrasonic receiving circuit) or either one of the ultrasonic receiving circuits (e.g., either the first ultrasonic receiving circuit 230 or the second ultrasonic receiving circuit). When the sensor device 200 is configured to use both of the ultrasonic receiving circuits, the control circuit 210 may be configured to detect an occupancy and/or vacancy condition in response to the ultrasonic detection signals generated by both of the ultrasonic receiving circuits of the sensor device 200. When the sensor device 200 is configured to use the first ultrasonic receiving circuit 230, the control circuit 210 may be configured to cease being responsive to the second ultrasonic detection signal generated by the second ultrasonic receiving circuit and detect an occupancy and/or vacancy condition in response to the first ultrasonic detection signal $V_{DET}$ generated by the first ultrasonic receiving circuit 230. When the sensor device 200 is configured to use the second ultrasonic receiving circuit, the control circuit 210 may be configured to cease being responsive to the first ultrasonic detection signal $V_{DET}$ and detect an occupancy and/or vacancy condition in response to the second ultrasonic detection signal generated by the second ultrasonic receiving circuit. When the control circuit is configured to use either both or either of the ultrasonic receiving circuits (e.g., at all times), the control circuit may be configured to generate both ultrasonic drive signals for causing both ultrasonic transmitting elements to emit ultrasonic waves.

In some examples, the sensor device 200 may also comprise an additional occupant detection circuit, such as a passive infrared (PIR) detection circuit 290. The PIR detection circuit 290 may comprise a pyroelectric detector configured to receive infrared energy from an occupant in the space via a lens of the control device 200 (e.g., the lens 129, 129', 159). In response to the infrared energy received by the pyroelectric detector, the PIR detection circuit 290 may be configured to generate a PIR detection signal $V_{PIR}$, which may be received by the control circuit 210 and may indicate an occupancy and/or vacancy condition in the space. The control circuit 210 may be configured to detect occupancy and/or vacancy conditions in the space in response to one of or both of the ultrasonic detection signal $V]_{DET}$ generated by the ultrasonic receiving circuit 230 and PIR detect signal $V_{PIR}$ generated by the PIR detection circuit 290. Since the PIR detection circuit 290 may use different technology than the ultrasonic transmitting circuit 220 and the ultrasonic receiving circuit 230, the dual-technology occupancy sensor may provide for an increased ability to detect the presence of an occupant in the space surrounding the sensor device.

As previously mentioned, the received ultrasonic waves may be relatively large in magnitude when the sensor device 200 is installed in a small space as compared to when the sensor device 200 is installed in a large space. When the sensor device 200 is installed in a small space, the magnitude of the non-Doppler-shifted reception signal $V_{NS}$ and/or the magnitude of the Doppler-shifted reception signal \Tips may be greater than the magnitudes of those signals when the sensor device 120 is installed in a large space. When the sensor device 200 is installed in a small space, the magnitude of the ultrasonic reception signal $V_{RX}$ (e.g., the combination of the non-Doppler-shifted reception signal $V_{NS}$ due to the non-Doppler-shifted reflected waves and/or the magnitude of the Doppler-shifted reception signal $V_{DS}$ due to the Doppler-shifted reflected waves) may be large enough such that the circuitry of the ultrasonic receiving circuit 230 (e.g., the amplifier circuit 240, the envelope detector circuit 250, and/or the filter circuit 260) may properly process the ultrasonic reception signal $V_{RX}$. However, when the sensor device 200 is installed in a large space, the magnitude of the ultrasonic reception signal $V_{RX}$ may be not large enough for the circuitry of the ultrasonic receiving circuit 230 to properly process the ultrasonic reception signal $V_{RX}$.

Figure 2B:
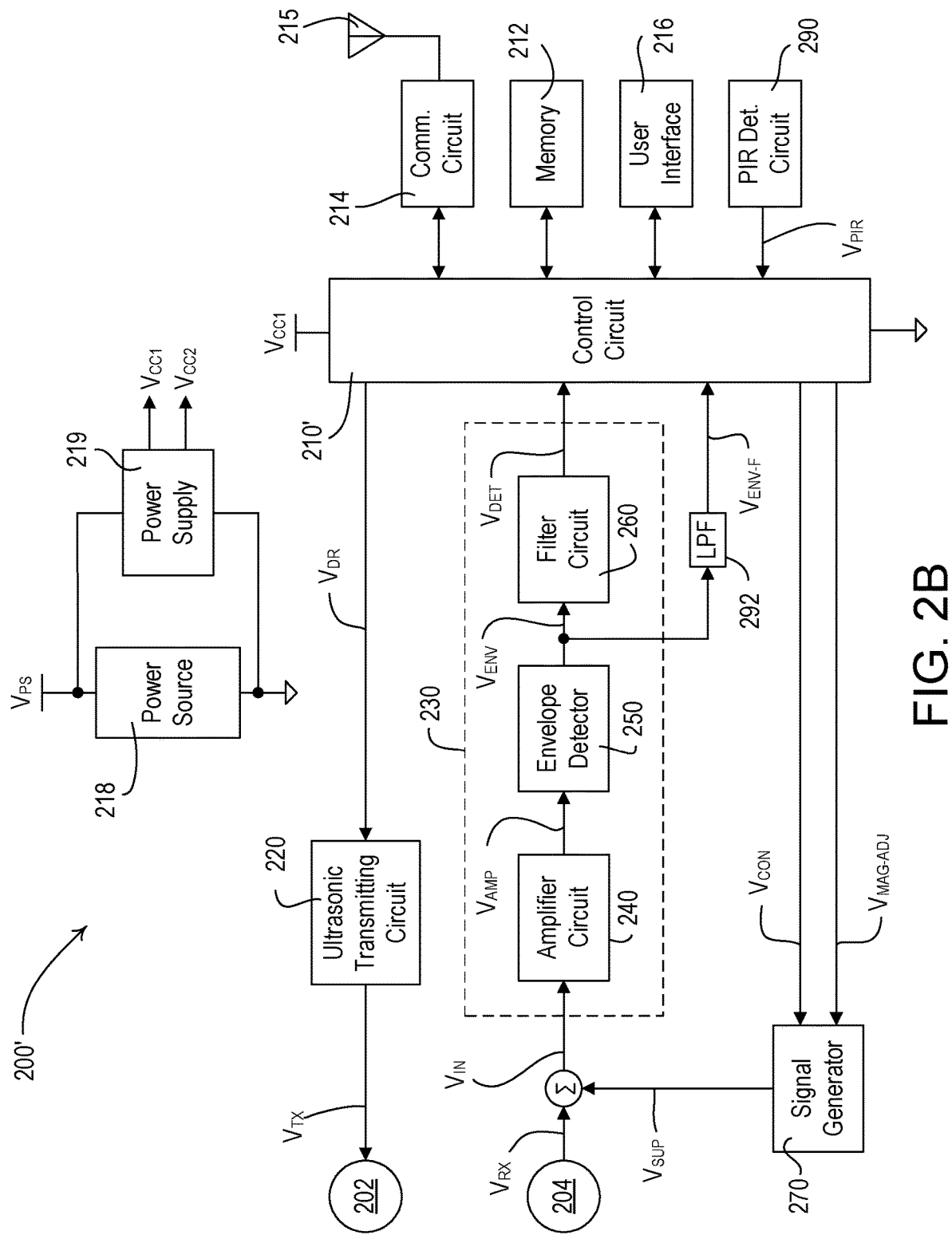
FIG. 2B is a block diagram of an example sensor device that includes a signal generation circuit for generating a supplemental signal.

FIG. 2B is a block diagram of another example sensor device 200', which may be deployed as the sensor device 120 of the lighting control system 100 shown in FIG. 1, the sensor device 120' of the load control system 100' shown in FIG. 1B, and/or the sensor device 150 shown in FIG. 1C. The sensor device 200' may have many of the same functional components as the sensor device 200 shown in FIG. 2A. The sensor device 200' may also comprise a signal generator circuit 270. The signal generator circuit 270 may be configured to generate a supplemental signal $V_{SUP}$, which may be combined with (e.g., added to) the ultrasonic reception signal $V_{RX}$ prior to reception by the amplifier circuit 240 to ensure that the magnitudes of the signals processed by the ultrasonic receiving circuit 230 are large enough to appropriately be processed (e.g., as will be described in greater detail below). For example, the supplemental signal $V_{SUP}$ may comprise a periodic oscillating voltage, such as an AC voltage, a PWM voltage, a square-wave voltage, a triangle-wave voltage, a sinusoidal voltage, and/or an approximate sinusoidal signal). The ultrasonic transmission signal $V_{TX}$ may be characterized by the ultrasonic detection frequency $f_{US}$.

A control circuit 210' of the sensor device 200' may be configured to generate a signal generation control signal $V_{CON}$, which may be received by the signal generator circuit 270 for controlling the generation of the supplemental signal $V_{SUP}$. For example, the control circuit 210' may be configured to pulse-width modulate the signal generation control signal $V_{CON}$ at the ultrasonic detection frequency $f_{US}$ with a duty cycle of approximately 50% (e.g., the signal generator circuit 270 may be configured to receive a pulse-width modulated signal characterized by the ultrasonic detection frequency $f_{US}$ and a duty cycle of approximately 50%). The signal generator circuit 270 may be configured to generate the supplemental signal $V_{SUP}$ as a sinusoidal signal characterized (e.g., an approximate sinusoidal signal) by the ultrasonic detection frequency $f_{US}$ in response to the signal generation control signal $V_{CON}$ (e.g., the pulse-width modulated signal). The supplemental signal $V_{SUP}$ may be characterized by a DC offset and a peak-to-peak magnitude $V_{P-P}$. For example, the signal generator circuit 270 may be configured to filter the signal generation control signal $V_{CON}$ (e.g., using a low-pass or band-pass filter) to remove harmonics and to generate the supplemental signal $V_{SUP}$ as an approximate sinusoidal signal. The supplemental signal $V_{SUP}$ may be added to the ultrasonic reception signal $V_{RX}$ prior to reception by the amplifier circuit 240 (e.g., the input signal $V_{IN}$ may be the sum of the ultrasonic reception signal $V_{RX}$ and the supplemental signal $V_{SUP}$). With the supplemental signal $V_{SUP}$ added to the ultrasonic reception signal $V_{RX}$, the magnitude of the signals processed by the ultrasonic receiving circuit 230 (e.g., the input signal $V_{IN}$, the amplified signal $V_{AMP}$, and/or the envelope signal $V_{ENV}$) may be large enough to be properly processed. For example, the peak-to-peak magnitude $V_{P-P}$ of the supplemental signal $V_{SUP}$ may have a nominal peak-to-peak magnitude of approximately 2 volts.

The control circuit 210' may be configured to control a phase $\Phi_{CON}$ of the signal generation control signal $V_{CON}$. The control circuit 210' may be configured to control the phase $\Phi_{CON}$ of the signal generation control signal $V_{CON}$ to adjust a phase $\Phi_{SUP}$ of the supplemental signal $V_{SUP}$ (e.g., with respect to the ultrasonic drive voltage $V_{DR}$). For example, the control circuit 210' may be configured to pulse-width modulate the signal generation control signal $V_{CON}$ such that the pulse-width modulated signal generated by the control circuit is initially in phase with the ultrasonic drive signal $V_{DR}$ (e.g., the signal generation control signal $V_{CON}$ may be identical to the ultrasonic drive signal $V_{DR}$). For example, the control circuit 210' may control the phase $\Phi_{DR}$ of the ultrasonic drive signal $V_{DR}$ and the phase $\Phi_{CON}$ of the signal generation control signal $V_{CON}$ to both initially be zero (e.g., so that the ultrasonic drive signal $V_{DR}$ and the signal generation control signal $V_{CON}$ are in phase). In addition, the control circuit 210' may be configured to adjust the phase $\Phi_{CON}$ of the signal generation control signal $V_{CON}$ as compared to the phase $\Phi_{DR}$ of the ultrasonic drive signal $V_{DR}$. For example, the control circuit 210' may be configured to adjust the phase $\Phi_{SUP}$ of the supplemental signal $V_{SUP}$ to be approximately equal to the phase $\Phi_{RX}$ of the received ultrasonic waves (e.g., the phase delay (PD)).

The control circuit 210' may be configured to control the signal generator circuit 270 to adjust a magnitude, e.g., the peak-to-peak magnitude $V_{P-P}$, of the supplemental signal $V_{SUP}$. The control circuit 210' may be configured to generate a magnitude-adjustment control signal $V_{MAG-ADJ}$, which may be received by the signal generator circuit 270 for adjusting the peak-to-peak magnitude $V_{P-P}$ of the supplemental signal $V_{SUP}$. The control circuit 210' may be configured to adjust a magnitude of the magnitude-adjustment control signal $V_{MAG-ADJ}$ (e.g., to approximately the first supply voltage $V_{CC1}$ and/or to approximately circuit common) to adjust the peak-to-peak magnitude $V_{P-P}$ of the supplemental signal $V_{SUP}$ to one of two different magnitudes. For example, the control circuit 210' may be configured to adjust the peak-to-peak magnitude $V_{P-P}$ of the supplemental signal $V_{SUP}$ to the nominal peak-to-peak magnitude (e.g., approximately 2 volts) and to a reduced peak-to-peak magnitude (e.g., approximately 0.7 volts). In some examples, the control circuit 210' may be configured to generate multiple magnitude-adjustment control signals for adjusting the peak-to-peak magnitude $V_{P-P}$ of the supplemental signal $V_{SUP}$ to respective magnitudes. In addition, the control circuit 210' may comprise a digital-to-analog converter (DAC) for generating the magnitude-adjustment control signal $V_{MAG-ADJ}$ and may be configured to adjust (e.g., continuously adjust) a DC magnitude of the magnitude-adjustment control signal $V_{MAG-ADJ}$ between two magnitudes (e.g., between the nominal peak-to-peak magnitude and approximately zero volts).

Like the sensor device 200 shown in FIG. 2A, the sensor device 200' may also comprise a second pair of ultrasonic elements (e.g., another ultrasonic transmitting element and another ultrasonic receiving element). The sensor device 200' may comprise a second ultrasonic transmitting circuit (e.g., which may be the same as the ultrasonic transmitting circuit 220) for causing the second ultrasonic transmitting element to emit the ultrasonic waves, and a second ultrasonic receiving circuit (e.g., which may be the same as the ultrasonic receiving circuit 230) for generating a second ultrasonic detection signal. In addition, the sensor device 200' may comprise a second signal generation circuit (e.g., which may be the same as the signal generator circuit 270) for generating a second supplemental signal, which may be added to the second ultrasonic reception signal (e.g., generated by the second ultrasonic receiving element) prior to being processed by the second ultrasonic receiving circuit. The control circuit 210' may be configured to generate a second signal generation control signal $V_{CON}$ for controlling the second signal generation circuit to generate the second supplemental signal. For example, the second signal generation control signal may be the same as, but out of phase with, the first signal generation control signal $V_{CON}$ generated by the first signal generator circuit 270.

The control circuit 210' of the sensor device 200' may be configured to execute a configuration procedure to configure the operational characteristics of the sensor device 210' (e.g., as stored in the memory 212). The control circuit 210' may configured to configure the same operational characteristics of the sensor device 200' as the control circuit 210 is able to configure (e.g., using the configuration procedure of the sensor device 200 described above). In addition, the control circuit 210' may be configured to configure the operation of the signal generation circuit 270. For example, the control circuit 210' may be configured to execute the configuration procedure and/or adjust the operation of the signal generation circuit 270 in response to an actuation of one or more of the actuators of the user interface circuit 216 and/or in response to a message receive via the communication circuit 214 (e.g., transmitted in response to an actuation of a button on a remote control and/or a soft button on a display of a mobile device, such as a smart phone or tablet). In addition, the control circuit 210' may be configured to adjust (e.g., automatically adjust) the operation of the signal generation circuit 270 during the configuration procedure. For example, the sensor device 200' may be configured to periodically execute the configuration procedure (e.g., once a month) when the space in which the sensor device 200' is located is vacant (e.g., as determined in response to the ultrasonic receiving circuit 230 and/or the PIR detection circuit 290).

The control circuit 210' may be configured to adjust a space size setting of the sensor device 200' during the configuration procedure of the sensor device 200'. For example, the sensor device 200' may be configured with one or more space size options for the space size setting that may be selected during the configuration procedure of the sensor device 200'. The one or more space size options may include, for example, a small space option (e.g., a small space mode) and a large space option (e.g., a large space mode). For example, the control circuit 210' may be configured to select one of the space size options in response to actuations of the one or more actuators of the user interface circuit 216 and/or in response to a message received via the communication circuit 214.

In addition, the control circuit 210' may be configured to automatically determine to operate in one of the small space mode and the large space mode. For example, the control circuit 210' may be configured to monitor a magnitude of a voltage of the ultrasonic receiving circuit 230 (e.g., a monitored voltage) that may indicate that one or more signals of the ultrasonic receiving circuit 230 (e.g., the input signal $V_{IN}$ and/or the amplified signal $V_{AMP}$) may be at appropriate magnitudes to be properly processed (e.g., to allow the ultrasonic receiving circuit 230 to generate the ultrasonic detection signal $V_{DET}$). For example, the magnitude of the envelope signal $V_{ENV}$ may indicate that one or more signals of the ultrasonic receiving circuit 230 may be at appropriate magnitudes to be properly processed when the magnitude of the envelope signal $V_{ENV}$ is sufficiently large, and may be at magnitudes that may not be properly processed when the magnitude of the envelope signal $V_{ENV}$ is sufficiently small (e.g., as will be described in greater detail below).

The control circuit 210' may determine to operate in the small space mode in response to the magnitude of the voltage of the monitored voltage (e.g., in response to the magnitude of the envelope signal $V_{ENV}$). For example, the sensor device 200' may comprise a low-pass filter (LPF)

circuit 292 that is configured to receive the envelope signal $V_{ENV}$ and generate a filtered envelope signal $V_{ENV-F}$. The low-pass filter circuit 292 may comprise, for example, a resistor-capacitor (RC) filter circuit. For example, the low-pass filter circuit 292 may be configured to filter the envelope signal $V_{ENV}$, such that a magnitude of the filtered envelope signal $V_{ENV-F}$ indicates the magnitude of the envelope signal $V_{ENV}$ and thus also indicates that one or more signals of the ultrasonic receiving circuit 230 (e.g., the input signal $V_{IN}$ and/or the amplified signal $V_{AMP}$) may be at appropriate magnitudes to be properly processed. The control circuit 210' may comprise an analog-to-digital converter (ADC) for sampling the filtered envelope signal $V_{ENV-F}$. In some examples, the control circuit 210' may be configured to receive the envelope signal $V_{ENV}$ and filter the envelope signal $V_{ENV}$ using a digital filter (e.g., the sensor device 200' may not comprise the low-pass filter circuit 292).

The control circuit 210' may be configured to monitor the magnitude of the filtered envelope signal $V_{ENV-F}$ (e.g., when the space is vacant) and automatically select one of the small space mode and the large space mode in which to operate. For example, the control circuit 210' may determine to operate in the small space mode when the magnitude of the filtered envelope signal $V_{ENV-F}$ indicates that the one or more signals of the ultrasonic receiving circuit 230 may be at appropriate magnitudes to be properly processed, and may determine to operate in the large space mode when the magnitude of the filtered envelope signal $V_{ENV-F}$ indicates that the one or more signals of the ultrasonic receiving circuit 230 may not be at appropriate magnitudes to be properly processed.

When the received ultrasonic waves are approximately 180° out of phase with the transmitted ultrasonic waves (e.g., the phase delay $\Phi_{RD}$ between the received ultrasonic waves and the transmitted ultrasonic waves is approximately 180°) and the magnitudes of the ultrasonic reception signal $V_{RX}$ and the supplemental signal $V_{SUP}$ are approximately equal, the addition of the supplemental signal $V_{SUP}$ to the ultrasonic reception signal $V_{RX}$ may cause the input signal $V_{IN}$ to reduce in magnitude (e.g., approximately zero volts), such that the ultrasonic receiving circuit 230 may not be able to properly process the input signal $V_{IN}$. The control circuit 210' may be configured to adjust (e.g., automatically adjust) the phase $\Phi_{SUP}$ of the supplemental signal $V_{SUP}$ to a value at which the ultrasonic receiving circuit is able to properly process the input signal $V_{IN}$. For example, the control circuit 210' may be configured to monitor the magnitude of the voltage of the ultrasonic receiving circuit 230 (e.g., the envelope signal $V_{ENV}$ and/or the filtered envelope signal $V_{ENV-F}$) that indicates that one or more signals of the ultrasonic receiving circuit 230 may be at appropriate magnitudes to be properly processed. The control circuit 210' may be configured to monitor the magnitude of the filtered envelope signal $V_{ENV-F}$ (e.g., when the space is vacant) and periodically adjust the phase $\Phi_{SUP}$ of the supplemental signal $V_{SUP}$ until the magnitude of the envelope signal $V_{ENV}$ (e.g., as indicated by the magnitude of the filtered envelope signal $V_{ENV-F}$) is at a magnitude that indicates that the signals of the ultrasonic receiving circuit 230 may be properly processed to generate the ultrasonic detection signal $V_{DET}$.

Environmental characteristics of the space in which the sensor device 200' is installed may cause a magnitude of a noise floor of the ultrasonic detection signal $V_{DET}$ to increase. During the configuration procedure, the control circuit 210' may also be configured to adjust (e.g., automatically adjust) the peak-to-peak magnitude $V_{P-P}$ of the supplemental signal $V_{SUP}$ in dependence upon the magnitude of the noise floor of the ultrasonic detection signal $V_{DET}$. For example, the control circuit 210' may be configured to determine the magnitude of the noise floor of the ultrasonic detection signal $V_{DET}$ and adjust the peak-to-peak magnitude $V_{P-P}$ of the supplemental signal $V_{SUP}$ in response to the magnitude of the noise floor of the ultrasonic detection signal $V_{DET}$. For example, the magnitude of the detection signal $V_{DET}$ may indicate the magnitude of the noise floor of the ultrasonic detection signal $V_{DET}$ (e.g., when the space in which the sensor device 210' is installed is vacant). The control circuit 210' may be configured to sample the ultrasonic detection signal $V_{DET}$ (e.g., using the ADC) to determine the magnitude of the noise floor of the ultrasonic detection signal $V_{DET}$). In some examples, the control circuit 210' may determine the magnitude of the noise floor of the ultrasonic detection signal $V_{DET}$ by averaging the samples of the ultrasonic detection signal $V_{DET}$ overtime. The control circuit 210' may be configured to determine the magnitude of the noise floor of the ultrasonic detection signal $V_{DET}$ when the space in which the sensor device 200' is installed is vacant (e.g., as determined in response to the PIR detection circuit 290).

The control circuit 210' may be configured to set the peak-to-peak magnitude $V_{P-P}$ of the supplemental signal $V_{SUP}$ in response to the magnitude of the ultrasonic detection signal $V_{DET}$. For example, the control circuit 210' may be configured to compare the magnitude of the ultrasonic detection signal $V_{DET}$ to a noise floor threshold $V_{TH-NF}$ (e.g., approximately 150-300 millivolts). The control circuit 210' may be configured to set the peak-to-peak magnitude $V_{P-P}$ of the supplemental signal $V_{SUP}$ to a first magnitude (e.g., the nominal peak-to-peak magnitude) when the magnitude of the ultrasonic detection signal $V_{DET}$ is less than the noise floor threshold $V_{TH-NF}$, and to set the peak-to-peak magnitude $V_{P-P}$ of the supplemental signal $V_{SUP}$ to a second magnitude (e.g., the reduced peak-to-peak magnitude) when the magnitude of the ultrasonic detection signal $V_{DET}$ is greater than (e.g., greater than or equal to) the noise floor threshold $V_{TH-NF}$. In some examples, the control circuit 210' may be configured to set the peak-to-peak magnitude $V_{P-P}$ of the supplemental signal $V_{SUP}$ as a function of the magnitude of the ultrasonic detection signal $V_{DET}$.

While the sensor device 200' includes the signal generator circuit 270 as shown in FIG. 2B, the signal generator circuit 270 may be omitted and the control circuit 210 may be configured to generate (e.g., directly generate) the supplemental signal $V_{SUP}$. For example, the control circuit 210' may be comprise a digital-to-analog converter (DAC) for generating signal generation control signal $V_{CON}$ as a sinusoidal signal characterized by the ultrasonic detection frequency $f_{US}$ (e.g., the supplemental signal $V_{SUP}$ may be the same as the signal generation control signal $V_{CON}$ generated by the control circuit 210'). An example of a control circuit configured to generate a sinusoidal signal using a DAC is described in greater detail in commonly-assigned U.S. Pat. No. 9,155,162, issued Oct. 6, 2015, entitled TWO-WIRE DIMMER WITH IMPROVED ZERO-CROSS DETECTION, the entire disclosure of which is hereby incorporated by reference. One skilled in the art will recognize other variations are possible.

Figure 3:
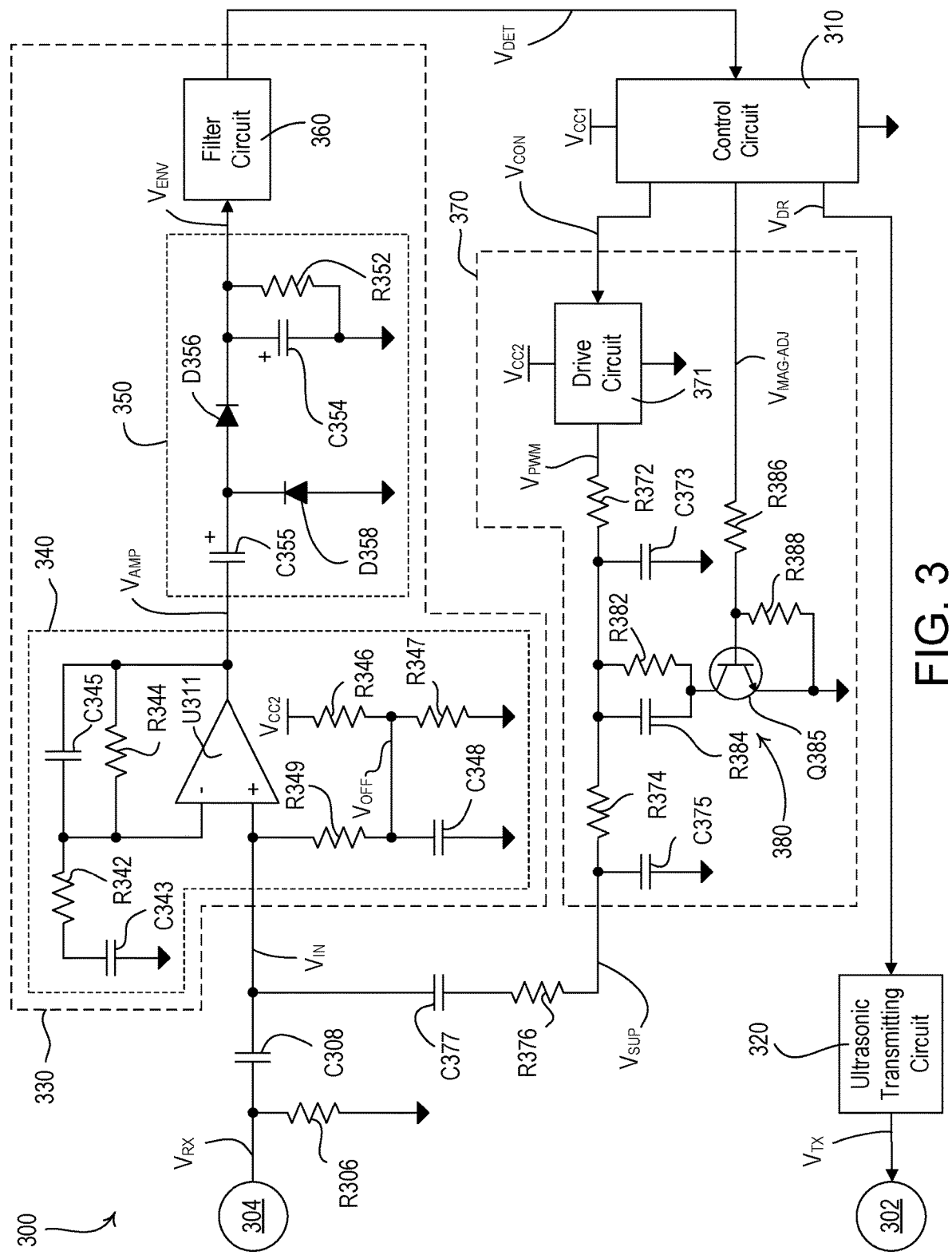
FIG. 3 is a schematic diagram of an example sensor device that includes a signal generation circuit for generating a supplemental signal.

FIG. 3 is a schematic diagram of an example sensor device 300 (e.g., the sensor device 120, 120', 150, 200, 200'). The sensor device 300 may comprise ultrasonic transmitting element 302 (e.g., the ultrasonic transmitting element 202) for transmitting ultrasonic waves (e.g., the ultrasonic waves 108) and an ultrasonic receiving element 302 (e.g., the ultrasonic receiving element 204) for receiving ultrasonic waves. For example, the ultrasonic transmitting element 302 and the ultrasonic receiving element 304 may each comprise a piezoelectric element. The ultrasonic transmitting element 302 may transmit ultrasonic waves in response to an ultrasonic transmission signal $V_{TX}$. The ultrasonic receiving element 304 may generate an ultrasonic reception signal $V_{RX}$ (e.g., a sinusoidal voltage) at an output 305 in response to the received ultrasonic waves (e.g., reflected ultrasonic waves). The output 305 of the ultrasonic receiving element 304 may be coupled to circuit common via a resistor R306. For example, the ultrasonic reception signal $V_{RX}$ may be the sum of a non-Doppler-shifted received signal $V_{NS}$ (e.g., due to non-Doppler-shifted waves reflected off static objects) and a Doppler-shifted reflected signal $V_{DS}$ (e.g., due to Doppler-shifted ultrasonic waves reflected off moving objects). When the sensor device 300 receives Doppler-shifted ultrasonic waves at multiple frequencies, the Doppler-shifted reception signal $V_{DS}$ may be the sum of sinusoidal voltages at multiple frequencies. The ultrasonic reception signal $V_{RX}$ may be characterized by a phase delay $\Phi_{RX}$ as compared to the ultrasonic transmission signal $V_{TX}$. For example, the phase delay $\Phi_{PD}$ may be the difference between a phase $\Phi_{RX}$ of the received ultrasonic waves and a phase $\Phi_{TX}$ of the transmitted ultrasonic waves.

The sensor device 300 may comprise a control circuit 310 (e.g., the control circuits 210, 210'). The control circuit 310 may generate an ultrasonic drive signal $V_{DR}$, which may be received by an ultrasonic transmitting circuit 320 (e.g., the ultrasonic transmitting circuit 220) for causing the ultrasonic transmitting circuit 320 to generate the ultrasonic transmission signal $V_{TX}$ for driving the ultrasonic transmitting element 302. The control circuit 310 may be coupled to the ultrasonic receiving element 304 via an ultrasonic receiving circuit 330 (e.g., the ultrasonic receiving circuit 230) for receiving the ultrasonic waves to thus detect an occupancy and/or vacancy condition in a space in which the sensor device 300 is installed. For example, the control circuit 310 may include one or more of a processor (e.g., a microprocessor), a microcontroller, a programmable logic device (PLD), a field programmable gate array (FPGA), an application specific integrated circuit (ASIC), or any suitable controller or processing device. The control circuit 310 may be powered from a first supply voltage $V_{CC1}$ (e.g., the first supply voltage $V_{CC1}$ generated by the power supply 219, such as approximately 3.3 volts). The control circuit 310 may generate an ultrasonic drive signal (e.g., the ultrasonic drive signal $V_{DR}$ shown in FIGS. 2A and 2B) for controlling the generation of the ultrasonic transmission signal $V_{TX}$ that is received by the ultrasonic transmitting element 202.

The ultrasonic receiving circuit 330 may comprise an amplifier circuit 340 (e.g., the amplifier circuit 240), an envelope detector circuit 350 (e.g., the envelope detector circuit 250), and a filter circuit 360 (e.g., the filter circuit 260). The ultrasonic receiving circuit 330 may receive an input signal $V_{IN}$ (e.g., which may be proportional to the ultrasonic reception signal $V_{RX}$) and generate an ultrasonic detection signal $V_{DET}$. The control circuit 310 may sample the ultrasonic detection signal $V_{DET}$ in order to detect an occupancy and/or vacancy condition in response to the received ultrasonic waves.

The amplifier circuit 340 of the ultrasonic receiving circuit 330 may be configured to receive and amplify the input signal $V_{IN}$ to generate an amplified signal $V_{AMP}$. The amplifier circuit 340 may comprise an operational amplifier U341 having a non-inverting input configured to receive the input signal $V_{IN}$. The operational amplifier U341 may be powered from a second supply voltage $V_{CC2}$ (e.g., the second supply voltage $V_{CC2}$ generated by the power supply 219, such as approximately 10 volts). The ultrasonic receiving element 304 may be coupled to the non-inverting input of the operational amplifier U341 of the amplifier circuit 330 via a capacitor C308 (e.g., having a capacitance of approximately 470 pF).

The amplifier circuit 340 may comprise a first filter circuit including the series combination of a resistor R342 (e.g., having a resistance of approximately 10 kΩ) and a capacitor C343 (e.g., having a capacitance of approximately 2.2 nF). The series combination of the resistor R342 and the capacitor C343 may be coupled between an inverting input of the operational amplifier U341 and circuit common. The amplifier circuit 340 may comprise a second filter circuit including the parallel combination of a resistor R344 (e.g., having a resistance of approximately 90.9 kΩ) and a capacitor C345 (e.g., having a capacitance of approximately 5.6 pF). The parallel combination of the resistor R344 and the capacitor C345 may be coupled between the inverting input and the output of the operational amplifier U341. For example, the amplifier circuit 340 may be characterized by a gain a of approximately 10 (e.g., approximately 20 dB).

The amplifier circuit 340 may be configured to add an offset voltage $V_{OFF}$ (e.g., a DC offset voltage) to the input voltage $V_{IN}$ at the non-inverting input of the operational amplifier U341. The amplifier circuit 340 may comprise a resistive divider circuit including resistors R346, R347 (e.g., each having a resistance of approximately 1 MΩ). The resistive divider circuit may be coupled between the second supply voltage $V_{CC2}$ and circuit common, such that the offset voltage $V_{OFF}$ (e.g., having a magnitude of approximately 5 V) may be produced at the junction of the resistors R346, R347. The amplifier circuit 340 may comprise a capacitor C348 (e.g., having a capacitance of approximately 1 μF), which may be coupled between the junction of the resistors R346, R347 and circuit common. The offset voltage $V_{OFF}$ may be coupled to the non-inverting input of the operational amplifier U341 via a resistor R349 (e.g., having a resistance of approximately 1 MΩ), such that the input voltage $V_{IN}$ may be biased around the offset voltage $V_{OFF}$. For example, the input voltage $V_{IN}$ may be a sinusoidal voltage characterized by a DC offset approximately equal to the offset voltage $V_{OFF}$.

The amplified signal $V_{AMP}$ generated by the amplifier circuit 340 may be a sinusoidal voltage characterized by a DC offset equal to an offset voltage $V_{OFF-A}$ (e.g., approximately 5 V). The magnitude of the amplified signal $V_{AMP}$ may oscillate between a high-side voltage $V_{HI}$ and a low-side voltage $V_{LO}$. For example, the amplified signal $V_{AMP}$ may have a peak-to-peak magnitude of approximately 2 volts. The amplified signal $V_{AMP}$ may be characterized by a high-peak voltage $V_{PK-HI}$, which may be the difference between the high-side voltage $V_{HI}$ and the offset voltage $V_{OFF-A}$ (e.g., $V_{PK-HI}=V_{HI}-V_{OFF-A}$). The amplified signal $V_{AMP}$ may be characterized by a low-peak voltage $V_{PK-LO}$, which may be the difference between the offset voltage $V_{OFF-A}$ and the low-side voltage $V_{LO}$ (e.g., $V_{PK-LO}=V_{OFF-A}-V_{LO}$). For example, the high-peak voltage $V_{PK-HI}$ may be approximately equal to the low-peak voltage $V_{PK-LO}$.

The envelope detector circuit 350 may receive the amplified signal $V_{AMP}$ and generate an envelope signal $V_{ENV}$, which may have a magnitude that follows the envelope of the amplified signal $V_{AMP}$. The envelope detector circuit 350 may comprise, for example, an AM demodulator circuit. For example, the envelope detector circuit 350 may be characterized by a gain β of approximately two (e.g., approximately 6 dB). The envelope signal $V_{ENV}$ may be generated across the parallel combination of a resistor R352 (e.g., having a resistance of approximately 200 kΩ) and a capacitor C354 (e.g., having a capacitance of approximately 2.2 nF). The output of the operational amplifier U341 of the amplifier circuit 330 may be coupled to the parallel combination of the resistor R352 and the capacitor C354 via the series combination of a capacitor C355 (e.g., having a capacitance of approximately 2.2 nF) and a first diode D356. The envelope detector circuit 350 may also comprise a second diode D358 coupled between circuit common and the junction of the capacitor C354 and the first diode D356.

When the magnitude of the amplified signal $V_{AMP}$ is near the low-side voltage $V_{LO}$, the capacitor C355 may be configured to charge through the second diode D358 to a voltage that is approximately equal to the low-peak voltage $V_{PK-LO}$ of the amplified signal $V_{AMP}$ minus the forward voltage drop of the second diode D358. When the magnitude of the amplified signal $V_{AMP}$ is near the high-side voltage $V_{HI}$, the voltage at the output of the operational amplifier U341 plus the voltage across the capacitor C355 may be coupled across the parallel combination of the resistor R352 and the capacitor C354. Accordingly, the capacitor C354 may be configured to charge through the first diode D356 to a voltage that is approximately equal to the high-peak voltage $V_{PK-HI}$ plus the low-peak voltage $V_{PK-LO}$ minus the forward voltage drops of the first and second diodes D356, D358. Since the high-peak voltage $V_{PK-HI}$ may be approximately equal to the low-peak voltage $V_{PK-LO}$, the magnitude of the envelope signal $V_{ENV}$ (e.g., the voltage across the parallel combination of the resistor R352 and the capacitor C354) may be equal to approximately two times the high-peak voltage $V_{PK-HI}$ minus the forward voltage drops of the first and second diodes D356, D358. In some examples, the envelope detector circuit 340 may not comprise the capacitor C355 and the second diode D358, and the capacitor C354 may be configured to charge to the high-peak voltage $V_{PK-HI}$ minus the forward voltage drop of the first diode D356 (e.g., the envelope detector 350 may have a gain of approximately one).

When there is not a Doppler shift in the received ultrasonic waves, the high-peak voltage $V_{PK-HI}$ and the low-peak voltage $V_{PK-LO}$ of the amplified signal $V_{AMP}$ may be substantially constant with respect to time and the envelope signal $V_{ENV}$ may have a substantially constant magnitude. However, when the received ultrasonic waves include some Doppler-shifted reflected waves (e.g., which are added to non-Doppler-shifted ultrasonic waves), there will be some low-frequency ripple in the high-peak voltage $V_{PK-HI}$ and the low-peak voltage $V_{PK-LO}$ of the amplified signal $V_{AMP}$, where the low-frequency ripple is at a frequency approximately equal to the change Δf in frequency due to the Doppler shift. Accordingly, the envelope signal $V_{ENV}$ may be a sinusoidal voltage characterized by a frequency $f_{ENV}$ approximately equal to the change Δf in frequency due to the Doppler shift (e.g., when all of the Doppler-shifted reflected waves are at a single frequency). When the Doppler-shifted reflected waves are at multiple frequencies, the envelope signal $V_{ENV}$ may be not be a sinusoidal voltage, but may still be an AC voltage (e.g., not a DC voltage).

The filter circuit 360 may receive and filter the envelope signal $V_{ENV}$ to generate the ultrasonic detection signal $V_{DET}$ (e.g., a filtered signal). For example, the filter circuit 360 may comprise a bandpass filter circuit that may be characterized with a bandwidth of approximately 500 Hz. The filter circuit 360 may also operate as an anti-aliasing filter to restrict the bandwidth of the ultrasonic detection signal $V_{DET}$, such that the ultrasonic detection signal $V_{DET}$ may be appropriately sampled by the control circuit 310. The filter circuit 360 may be configured to bias the ultrasonic detection signal $V_{DET}$ about a reference voltage $V_{REF}$, which may be equal to, for example, approximately half of the first supply voltage $V_{CC1}$ (e.g., $V_{REF}$ $V_{CC1}/2$). For example, when there is a Doppler shift in the received ultrasonic waves, the magnitude of the ultrasonic detection signal $V_{DET}$ may be approximately equal to the reference voltage $V_{REF}$ and/or may be characterized by noise (e.g., due the ultrasonic receiving circuit 330 and/or the control circuit 310). When there is a Doppler shift in the received ultrasonic waves, the ultrasonic detection signal $V_{DET}$ may be an AC voltage, e.g., a sinusoidal voltage characterized by a frequency $f_{DET}$ approximately equal to the change Δf in frequency due to the Doppler shift.

When the sensor device 300 is installed in a small space, the received ultrasonic waves may be relatively large as compared to when the sensor device 300 is installed in a large space and the magnitude of the ultrasonic reception signal $V_{RX}$ may be large enough that the circuitry of the ultrasonic receiving circuit 330 may properly process the ultrasonic reception signal $V_{RX}$. For example, the magnitude of the amplified signal $V_{AMP}$ (e.g., the high-peak voltage $V_{PK-HI}$ and/or the low-peak voltage $V_{PK-LO}$) may be larger than the forward voltage drops of the diodes D356, D358, such that the envelope signal $V_{ENV}$ may be generated across the capacitor C354. However, when the sensor device 300 is installed in a large space, the magnitude of the amplified signal $V_{AMP}$ may be not exceed the forward voltage drops of the diodes D356, D358, and thus the envelope detector circuit 350 may not be able to generate the envelope signal $V_{ENV}$.

The sensor device 300 may comprise a signal generator circuit 370 (e.g., the signal generator circuit 270), which may be configured to generate a supplemental signal $V_{SUP}$ to be combined with (e.g., added to) the ultrasonic reception signal $V_{RX}$ prior to reception by the amplifier circuit 340. The addition of the supplemental signal $V_{SUP}$ to the ultrasonic reception signal $V_{RX}$ may ensure that the magnitudes of the amplified signal $V_{AMP}$ (e.g., the high-peak voltage $V_{PK-HI}$ and/or the low-peak voltage $V_{PK-LO}$) exceed the forward voltage drops of the diodes D356, D358, such that the envelope detector circuit 350 may appropriately generate the envelope signal $V_{ENV}$ across the capacitor C354. The control circuit 310 may be configured to generate a signal generation control signal $V_{CON}$, which may be received by the signal generator circuit 370 for controlling the generation of the supplemental signal $V_{SUP}$. For example, the control circuit 310 may be configured to pulse-width modulate the signal generation control signal $V_{CON}$ at the ultrasonic detection frequency $f_{US}$ with a duty cycle of approximately 50%. The signal generator circuit 370 may comprise a drive circuit 371 (e.g., a level-translator circuit including one or more transistors). The drive circuit 371 may receive the signal generation control signal $V_{CON}$ (e.g., a pulse-width modulated signal having a magnitude approximately equal to the magnitude of the first supply voltage $V_{CC1}$) and generate a pulse-with modulated signal $V_{PWM}$ having a magnitude approximately equal to the magnitude of the second supply voltage $V_{CC2}$.

The pulse-with modulated signal $V_{PWM}$ generated by the drive circuit 371 may be received by a two-stage resistor-capacitor (RC) circuit (e.g., a filter circuit) for generating the supplemental signal $V_{SUP}$. The signal generator circuit 370 may comprise a first RC circuit having a resistor R372 (e.g., having a resistance of approximately 25 kΩ) and a capacitor C373 (e.g., having a capacitance of approximately 150 pF), and a second RC circuit having a resistor R374 (e.g., having a resistance of approximately 25 kΩ) and a capacitor C375 (e.g., having a capacitance of approximately 150 pF). For example, when the drive circuit 361 drives the magnitude of the pulse-with modulated signal $V_{PWM}$ high towards the second supply voltage $V_{CC2}$, the capacitor C363 may charge through the resistor R372 towards the magnitude of the second supply voltage $V_{CC2}$. When the drive circuit 371 drives the magnitude of the pulse-with modulated signal $V_{PWM}$ low towards circuit common, the capacitor C373 may discharge through the resistor R372 towards approximately zero volts. Similarly, the capacitor C375 may charge and discharge through the resistor R374 in response to the charging and discharging of the capacitor C373 to produce the supplemental voltage $V_{SUP}$ across the capacitor C375. For example, the supplemental signal $V_{SUP}$ may comprise a periodic oscillating voltage (e.g., such as an AC voltage, a triangle-wave voltage, and/or an approximate sinusoidal voltage) characterized by the ultrasonic detection frequency $f_{US}$. The supplemental signal $V_{SUP}$ may be characterized by a DC offset and a peak-to-peak magnitude $V_{P-P}$. For example, the two-stage RC circuit of the signal generator circuit 370 (e.g., including the resistor R372, the capacitor C373, the resistor R374, and the capacitor C375) may be configured to filter the pulse-with modulated signal $V_{PWM}$ to remove harmonics and to generate the supplemental signal $V_{SUP}$ as an approximate sinusoidal signal.

The supplemental signal $V_{SUP}$ may be coupled to the non-inverting input of the operational amplifier U341 of the amplifier circuit 340 via a series combination of a resistor R376 (e.g., having a resistance of approximately 175 kΩ) and a capacitor C377 (e.g., having a capacitance of approximately 470 pF). The supplemental signal $V_{SUP}$ may be combined with (e.g., added to) the ultrasonic reception signal $V_{RX}$ prior to reception by the amplifier circuit 340 (e.g., the input signal $V_{IN}$ at the non-inverting input of the operational amplifier U341 may be the sum of the ultrasonic reception signal $V_{RX}$ and the supplemental signal $V_{SUP}$). With the supplemental signal $V_{SUP}$ added to the ultrasonic reception signal $V_{RX}$, the magnitude of the signals processed by the ultrasonic receiving circuit 330 (e.g., the input signal $V_{IN}$, the amplified signal $V_{AMP}$, and/or the envelope signal $V_{ENV}$) may be large enough to be properly processed. For example, the high-peak voltage $V_{PK-HI}$ and the low-peak voltage $V_{PK-LO}$ of the amplified signal $V_{AMP}$ may each be larger than the forward voltages of the diodes D356, D358 of the envelope detector circuit 350.

The control circuit 310 may be configured to control a phase $\Phi_{CON}$ of the signal generation control signal $V_{CON}$ for adjusting a phase $\Phi_{SUP}$ of the supplemental signal $V_{SUP}$ (e.g., with respect to the ultrasonic drive voltage $V_{DR}$). For example, the control circuit 310 may generate (e.g., initially generate) the signal generation control signal $V_{CON}$ such that the pulse-width modulated signal $V_{PWM}$ initially generated by the drive circuit 371 of the signal generator circuit 370 is in phase with the ultrasonic drive signal $V_{DR}$. For example, the control circuit 310 may control (e.g., initially control) the phase $\Phi_{CON}$ of the signal generation control signal $V_{CON}$ to be zero. The control circuit 310 may be configured to generate (e.g., initially generate) the signal generation control signal $V_{CON}$ in phase with the ultrasonic drive signal $V_{DR}$ (e.g., the rising and falling edges of the signal generation control signal $V_{CON}$ may occur as the same times at the rising and falling edges of the ultrasonic drive signal $V_{DR}$).

When the signal generation control signal $V_{CON}$ is in phase with the ultrasonic drive signal $V_{DR}$, the control circuit may generate the rising and falling edges of the signal generation control signal $V_{CON}$ at the same times as the rising and falling edges of the ultrasonic drive signal $V_{DR}$, respectively. In addition, the control circuit 310 may be configured to adjust the phase $\Phi_{CON}$ of the signal generation control signal $V_{CON}$ as compared to the phase $\Phi_{DR}$ of the ultrasonic drive signal $V_{DR}$. For example, the control circuit 310 may be configured to adjust the phase $\Phi_{SUP}$ of the supplemental signal $V_{SUP}$ to be approximately equal to the phase $\Phi_{RX}$ of the received ultrasonic waves.

The control circuit 310 may be configured to control the signal generator circuit 370 to adjust a magnitude, e.g., the peak-to-peak magnitude $V_{P-P}$, of the supplemental signal $V_{SUP}$. The control circuit 310 may be configured to generate a magnitude-adjustment control signal $V_{MAG-ADJ}$, which may be received by the signal generator circuit 370 for adjusting the peak-to-peak magnitude $V_{P-P}$ of the supplemental signal $V_{SUP}$. For example, the signal generator circuit 370 may comprise a variable attenuator circuit 380 configured to adjust an impedance in the signal generator circuit 370 for adjusting the peak-to-peak magnitude $V_{P-P}$ of the supplemental signal $V_{SUP}$. The variable attenuator circuit 380 may be coupled between a junction of the first and second RC circuits of the signal generator circuit 370 and circuit common for adjusting an equivalent impedance of the second RC circuit (e.g., as seen by the first RC circuit) for adjusting the peak-to-peak magnitude $V_{P-P}$ of the supplemental signal $V_{SUP}$. The variable attenuator circuit 380 may comprise a resistor R382 (e.g., having a resistance of approximately 4.7 kΩ), a capacitor C384 (e.g., having a capacitance of approximately 680 pF), and a transistor Q385 (e.g., an NPN bipolar junction transistor). The resistor R382 may be coupled in parallel with the capacitor C384. The parallel combination of the resistor R382 and the capacitor C384 may be coupled in series with the transistor Q385 between the junction of the first and second RC circuits of the signal generator circuit 370 and circuit common (e.g., between the junction of the resistors R372, R374 and circuit common). The variable attenuator circuit 380 may also comprise a resistor R386 (e.g., having a resistance of approximately 20 kΩ) coupled between the base of the transistor Q385 and the control circuit 310, and a resistor R388 (e.g., having a resistance of approximately 50 kΩ) coupled between the base and the emitter of the transistor Q385.

The base of the transistor Q385 may be configured to receive the magnitude-adjustment control signal $V_{MAG-ADJ}$ from the control circuit 310 via the resistor R386. When the control circuit 310 drives the magnitude of the magnitude-adjustment control signal $V_{MAG-ADJ}$ low (e.g., towards circuit common), the transistor Q385 may be rendered non-conductive. At this time, the first and second RC circuits of the signal generator circuit 370 (e.g., including the resistor R372, the capacitor C373, the resistor R374, and the capacitor C375) may filter the pulse-with modulated signal $V_{PWM}$ to generate the supplemental signal $V_{SUP}$ (e.g., as described above). When the control circuit 310 drives the magnitude of the magnitude-adjustment control signal $V_{MAG-ADJ}$ high (e.g., towards the supply voltage $V_{CC}$), the transistor Q385 may be rendered conductive thus coupling the parallel combination of the resistor R382 and the capacitor C384 in parallel with the capacitor C373 of the first RC circuit of the signal generator circuit 370. The resistor R372 of the first RC circuit and the resistor R382 of the variable attenuator circuit 380 may form a resistor-divider circuit thus reducing the magnitude of the voltage received by the second RC circuit and also reducing the magnitude of the supplemental signal $V_{SUP}$. The capacitor C384 may operate to maintain approximately the same operation (e.g., approximately the same pole) of the signal generator circuit 370 when the transistor Q385 is non-conductive and conductive. For example, the peak-to-peak magnitude $V_{P-P}$ of the supplemental signal $V_{SUP}$ may be approximately 2 volts when the transistor Q385 is non-conductive and 0.7 volts when the transistor Q385 is conductive. In some examples, the signal generator circuit 370 may comprise multiple variable attenuator circuit 370 and may be configured to receive multiple magnitude-adjustment control signals from the control circuit 310 for controlling the peak-to-peak magnitude $V_{P-P}$ of the supplemental signal $V_{SUP}$ to more than two different magnitudes.

Additionally and/or alternatively, the signal generator circuit 370 may comprise an integrated circuit (IC) for generating the pulse-width modulated signal $V_{PWM}$. For example, the integrated circuit may comprise a timer integrated circuit (e.g., a 555 timer IC), an application-specific integrated circuit (IC), a programmable logic device (PLD), a field-programmable gate array (FPGA), or other circuit configured to generate (e.g., continuously generate) the pulse-width modulated signal $V_{PWM}$ (e.g., the timer integrated circuit may replace the drive circuit 371). The control circuit 310 may be configured to generate the signal generation control signal $V_{CON}$ for enabling and disabling the generation of the pulse-width modulated signal $V_{PWM}$ and thus the supplemental signal $V_{SUP}$. For example, the control circuit 310 may be configured to enable and disable the generation of the supplemental signal $V_{SUP}$ by driving the magnitude of the signal generation control signal $V_{CON}$ high and low, respectively.

The sensor device 300 may also comprise a second pair of ultrasonic elements (e.g., another ultrasonic transmitting element and another ultrasonic receiving element). The sensor device 300 may comprise a second ultrasonic transmitting circuit (e.g., which may be the same as the ultrasonic transmitting circuit 320) for causing the second ultrasonic transmitting element to emit the ultrasonic waves, and a second ultrasonic receiving circuit (e.g., which may be the same as the ultrasonic receiving circuit 330) for generating a second ultrasonic detection signal. In addition, the sensor device 300 may comprise a second signal generation circuit (e.g., which may be the same as the signal generator circuit 370) for generating a second supplemental signal, which may be added to the second ultrasonic reception signal (e.g., generated by the second ultrasonic receiving element) prior to being processed by the second ultrasonic receiving circuit. The control circuit 310 may be configured to generate a second signal generation control signal for controlling the second signal generation circuit to generate the second supplemental signal. For example, the second signal generation control signal may be the same as, but out of phase with, the first signal generation control signal $V_{CON}$ generated by the first signal generator circuit 370.

The control circuit 310 of the sensor device 300 may be configured to execute a configuration procedure to configure the operational characteristics of the sensor device 310 (e.g., as stored in the memory 212). The control circuit 310 may be configured to configure the operation of the signal generation circuit 370 during the configuration procedure. For example, the control circuit 310 may be configured to execute the configuration procedure and/or adjust the operation of the signal generation circuit 370 in response to an actuation of one or more of the actuators of the sensor device (e.g., of the user interface circuit 216) and/or in response to a message (e.g., received via the communication circuit 214). In addition, the control circuit 310 may be configured to adjust (e.g., automatically adjust) the operational characteristics of the sensor device 200' during the configuration procedure. For example, the sensor device 300 may be configured to periodically execute the configuration procedure (e.g., once a month) when the space in which the sensor device 300 is located is vacant (e.g., as determined in response to the ultrasonic receiving circuit 230 and/or the PIR detection circuit 290).

The control circuit 310 may be configured to enable and disable the generation of the supplemental signal $V_{SUP}$ by the signal generator circuit 370, for example, by respectively enabling and disabling the pulse-width modulation of the signal generation control signal $V_{CON}$ and/or adjusting the magnitude of the signal generation control signal $V_{CON}$ to otherwise enable and disable the signal generator circuit 370 (e.g., via an enable pin and/or signal). For example, the control circuit 310 may be configured to enable the generation of the supplemental signal $V_{SUP}$ when the sensor device 300 is installed in a large space and the received ultrasonic waves may be relatively small (e.g., as compared to when the sensor device 300 is installed in a small space). The control circuit 310 may be further configured to disable the generation of the supplemental signal $V_{SUP}$ when the sensor device 300 is installed in a small space and the received ultrasonic waves may be relatively large (e.g., as compared to when the sensor device 300 is installed in a large space). For example, the sensor device 300 may be configured with one or more space size options that may be selected during configuration of the sensor device 300.

In addition, the control circuit 310 may be configured to automatically determine to enable and disable the generation of the supplemental signal $V_{SUP}$ by the signal generator circuit 370. For example, the control circuit 310 may be configured to monitor a magnitude of a voltage of the ultrasonic receiving circuit 330 (e.g., a monitored voltage) that may indicate that one or more signals of the ultrasonic receiving circuit 330 (e.g., the input signal $V_{IN}$ and/or the amplified signal $V_{AMP}$) may be at appropriate magnitudes to be properly processed (e.g., to allow the ultrasonic receiving circuit 330 to generate the ultrasonic detection signal $V_{DET}$). For example, the magnitude of the envelope signal $V_{ENV}$ may indicate that one or more signals of the ultrasonic receiving circuit 330 may be at appropriate magnitudes to be properly processed when the magnitude of the envelope signal $V_{ENV}$ is sufficiently large, and may be at magnitudes that may not be properly processed when the magnitude of the envelope signal $V_{ENV}$ is sufficiently small (e.g., as will be described in greater detail below).

The control circuit 310 may be configured to automatically determine to enable and disable the generation of the supplemental signal $V_{SUP}$ by the signal generator circuit 370 in response to the magnitude of the voltage of the monitored voltage (e.g., in response to the magnitude of the envelope signal $V_{ENV}$). For example, the control circuit 310 may be configured to receive a filtered version of the envelope signal $V_{ENV}$ (e.g., the filtered envelope signal $V_{ENV-F}$ generated by the low-pass filter circuit 292), which may have a magnitude that indicates that one or more signals of the ultrasonic receiving circuit 230 (e.g., the input signal $V_{IN}$ and/or the amplified signal $V_{AMP}$) may be at appropriate magnitudes to be properly processed. The control circuit 310 may comprise an analog-to-digital converter (ADC) for sampling the filtered version of the envelope signal $V_{ENV}$. In some examples, the control circuit 310 may be configured to receive the envelope signal $V_{ENV}$ and filter the envelope signal $V_{ENV}$ using a digital filter (e.g., the sensor device 200' may not comprise the low-pass filter circuit 292).

The control circuit 310 may be configured to sample and monitor the magnitude (e.g., the DC magnitude) of the filtered version of the envelope signal $V_{ENV}$ generated by the envelope detector circuit 340 (e.g., when the space is vacant), and automatically determine to enable or disable the generation of the supplemental signal $V_{SUP}$ by the signal generator circuit 370. For example, the control circuit 310 may determine to disable the generation of the supplemental signal $V_{SUP}$ when the magnitude of the envelope signal $V_{ENV}$ (e.g., the filtered version of the envelope signal $V_{ENV}$) indicates that the one or more signals of the ultrasonic receiving circuit 330 may be at appropriate magnitudes to be properly processed, and may determine to enable the generation of the supplemental signal $V_{SUP}$ when the magnitude of the envelope signal $V_{ENV}$ (e.g., the filtered version of the envelope signal $V_{ENV}$) indicates that the one or more signals of the ultrasonic receiving circuit 330 may not be at appropriate magnitudes to be properly processed.

When the supplemental signal $V_{SUP}$ is added to the ultrasonic reception signal $V_{RX}$ and the received ultrasonic waves are approximately 180° out of phase with the transmitted ultrasonic waves and the magnitude of the ultrasonic reception signal $V_{RX}$ and the supplemental signal $V_{SUP}$ are approximately the same, the magnitude of the input signal $V_{IN}$ may be small (e.g., approximately zero volts), such that the ultrasonic receiving circuit 330 may not be able to approximately process the input signal $V_{IN}$. The control circuit 310 may be configured to adjust (e.g., automatically adjust) the phase $\Phi_{SUP}$ of the supplemental signal $V_{SUP}$ to a phase at which the ultrasonic receiving circuit 320 may be able to properly process the input signal $V_{IN}$. The control circuit may be configured to determine whether the phase $\Phi_{SUP}$ of the supplemental signal $V_{SUP}$ should be adjusted in response to the magnitude of the envelope signal $V_{ENV}$ (e.g., the filtered version of the envelope signal $V_{ENV}$). For example, the control circuit 310 may comprise an analog-to-digital converter (ADC) for sampling the envelope detector circuit 350. The control circuit 310 may be configured to measure and store a magnitude of the filtered version of the envelope signal $V_{ENV}$ when the signal generator circuit 370 is disabled (e.g., which may be a voltage that indicates that the signals of the ultrasonic receiving circuit 330 may be properly processed to generate the ultrasonic detection signal $V_{DET}$). The control circuit 310 may also measure a magnitude of the envelope signal $V_{ENV}$ (e.g., the filtered version of the envelope signal $V_{ENV}$) when the signal generator circuit 370 is enabled. If the magnitude of the envelope signal $V_{ENV}$ (e.g., the filtered version of the envelope signal $V_{ENV}$) from when the signal generator circuit 370 was enabled is approximately equal to the magnitude of the envelope signal $V_{ENV}$ (e.g., the filtered version of the envelope signal $V_{ENV}$) from when the signal generator circuit 370 was disabled, the control circuit 310 may determine that the received ultrasonic waves are not approximately 180° out of phase with the transmitted ultrasonic waves and may not adjust the phase $\Phi_{SUP}$ of the supplemental signal $V_{SUP}$.

If the magnitude of the filtered version of the envelope signal $V_{ENV}$ from when the signal generator circuit 370 was enabled is less than the magnitude of the filtered version of the envelope signal $V_{ENV}$ from when the signal generator circuit 360 was disabled, the control circuit 310 may determine that the received ultrasonic waves are approximately 900 out of phase with the transmitted ultrasonic waves and may adjust the phase $\Phi_{SUP}$ of the supplemental signal $V_{SUP}$.

For example, the control circuit 310 may periodically adjust (e.g., increase and/or decrease) the phase $\Phi_{CON}$ of the signal generation control signal $V_{CON}$ (e.g., and thus the phase $\Phi_{SUP}$ of the supplemental signal $V_{SUP}$) by an adjustment amount $\Delta\Phi$, and then measure the magnitude of the filtered version of the envelope signal $V_{ENV}$ to determine if the newly-sampled magnitude of the filtered version of the envelope signal $V_{ENV}$ is approximately equal to the stored magnitude of the filtered version of the envelope signal $V_{ENV}$ from when the signal generator circuit 370 was disabled.

The control circuit may be configured to determine when to stop adjusting the phase $\Phi_{SUP}$ of the supplemental signal $V_{SUP}$ in response to the magnitude of the filtered version of the envelope signal $V_{ENV}$. For example, when the newly-sampled magnitude of the filtered version of the envelope signal $V_{ENV}$ is approximately equal to the stored magnitude of the filtered version of the envelope signal $V_{ENV}$ from when the signal generator circuit 370 was disabled, the control circuit 310 may cease adjusting the phase $\Phi_{CON}$ of the signal generation control signal $V_{CON}$ and use the present phase $\Phi_{CON}$ of the signal generation control signal $V_{CON}$ to generate the supplemental signal $V_{SUP}$ during normal operation. The final phase $\Phi_{CON}$ of the signal generation control signal $V_{CON}$ may be one at which the magnitude of the filtered version of the envelope signal $V_{ENV}$ is at a level that indicates that the signals of the ultrasonic receiving circuit 330 may be properly processed to generate the ultrasonic detection signal $V_{DET}$. For example, the control circuit 310 may store the final phase $\Phi_{CON}$ of the signal generation control signal $V_{CON}$ in memory (e.g., the memory 212) to be used during normal operation.

During the configuration procedure, the control circuit 310 may also be configured to adjust (e.g., automatically adjust) the peak-to-peak magnitude $V_{P-P}$ of the supplemental signal $V_{SUP}$ in dependence upon the magnitude of a noise floor of the ultrasonic detection signal $V_{DET}$. For example, the control circuit 310 may be configured to determine the magnitude of the noise floor of the ultrasonic detection signal $V_{DET}$ and adjust the peak-to-peak magnitude $V_{P-P}$ of the supplemental signal $V_{SUP}$ in response to the magnitude of the noise floor of the ultrasonic detection signal $V_{DET}$. For example, the magnitude of the ultrasonic detection signal $V_{DET}$ may indicate the magnitude of the noise floor of the ultrasonic detection signal $V_{DET}$ (e.g., when the space in which the sensor device 300 is installed is vacant). The control circuit 310 may be configured to sample the ultrasonic detection signal $V_{DET}$ (e.g., using the ADC) to determine the magnitude of the noise floor of the ultrasonic detection signal $V_{DET}$). In some examples, the control circuit 310 may determine the magnitude of the noise floor of the ultrasonic detection signal $V_{DET}$ by averaging the samples of the ultrasonic detection signal $V_{DET}$ over time. The control circuit 310 may be configured to determine the magnitude of the noise floor of the ultrasonic detection signal $V_{DET}$ when the space in which the sensor device 300 is installed is vacant (e.g., as determined in response to the PIR detection circuit 290).

The control circuit 310 may be configured to set the peak-to-peak magnitude $V_{P-P}$ of the supplemental signal $V_{SUP}$ in response to the magnitude of the ultrasonic detection signal $V_{DET}$. For example, the control circuit 310 may be configured to compare the magnitude of the ultrasonic detection signal $V_{DET}$ to a noise floor threshold $V_{TH-NF}$ (e.g., approximately 150-300 millivolts). The control circuit 310 may be configured to set the peak-to-peak magnitude $V_{P-P}$ of the supplemental signal $V_{SUP}$ to a first magnitude (e.g., the nominal peak-to-peak magnitude) when the magnitude of the ultrasonic detection signal $V_{DET}$ is less than the noise floor threshold $V_{TH-NF}$, and to set the peak-to-peak magnitude $V_{P-P}$ of the supplemental signal $V_{SUP}$ to a second magnitude (e.g., the reduced peak-to-peak magnitude) when the magnitude of the ultrasonic detection signal $V_{DET}$ is greater than (e.g., greater than or equal to) the noise floor threshold $V_{TH-NF}$. The control circuit 310 may be configured to control the peak-to-peak magnitude $V_{P-P}$ of the supplemental signal $V_{SUP}$ to the first magnitude (e.g., the nominal peak-to-peak magnitude) by driving the magnitude of the magnitude-adjustment control signal $V_{MAG-ADJ}$ low towards circuit common to render the transistor Q385 non-conductive. The control circuit 310 may be configured to control the peak-to-peak magnitude $V_{P-P}$ of the supplemental signal $V_{SUP}$ to the second magnitude (e.g., the reduced peak-to-peak magnitude) by driving the magnitude of the magnitude-adjustment control signal $V_{MAG-ADJ}$ high towards the first supply voltage $V_{CC1}$ to render the transistor Q385 non-conductive.

Figure 4:
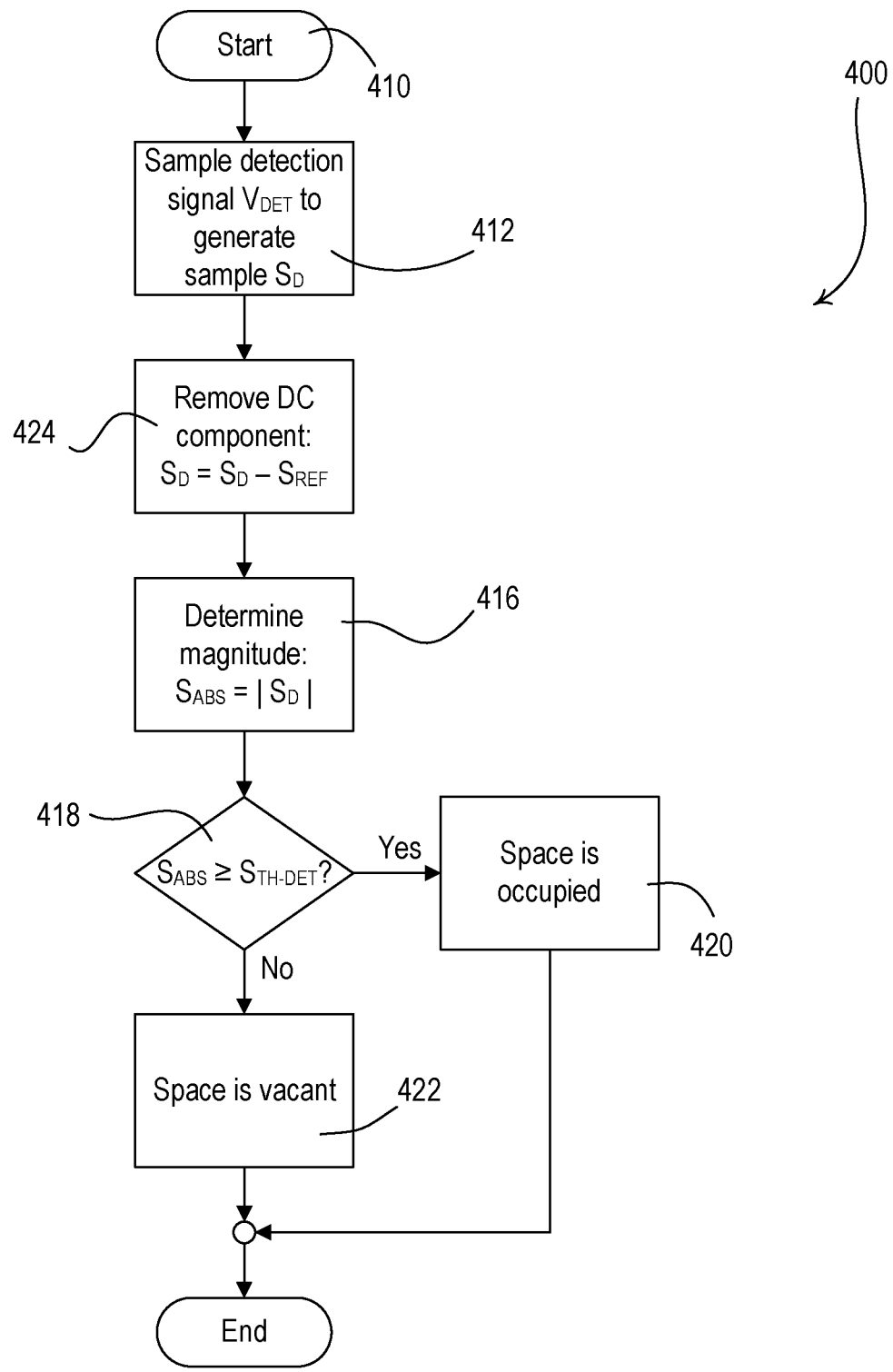
FIG. 4 is a flowchart of an example procedure that may be executed by a sensor device for detecting an occupancy and/or vacancy condition in a space.

FIG. 4 is a flowchart of an example procedure 400 for detecting an occupancy and/or vacancy condition in a space by a sensor device (e.g., the sensor devices 120, 120', 150, 200, 200', 300) is installed. For example, the procedure 400 may be executed by a control circuit of the sensor device (e.g., the control circuits 210, 210', 310). For example, the control procedure may be executed periodically (e.g., approximately every 2 milliseconds) at 410. The control circuit may be configured to receive an ultrasonic detection signal $V_{DET}$ generated by an ultrasonic receiving circuit (e.g., the ultrasonic receiving circuits 230, 330). The ultrasonic receiving circuit may be configured to generate the ultrasonic detection signal $V_{DET}$ in response to ultrasonic waves received by the sensor device, such that the ultrasonic detection signal $V_{DET}$ may indicate the occupancy and/or vacancy condition in the space.

At 412, the control circuit may be configured to sample the ultrasonic detection signal $V_{DET}$ to generate a sample $S_D$. At 414, the control circuit may be configured to remove the DC component from the sample $S_D$. For example, the control circuit may subtract a reference value $S_{REF}$ from the sample $S_D$ at 414. For example, the reference value $S_{REF}$ may be equal to the reference voltage $V_{REF}$ about which the filter circuit 350 biases the ultrasonic detection signal $V_{DET}$ (e.g., approximately equal to half of the first supply voltage $V_{CC1}$). In addition, the control circuit may be configured to measure and store the reference value $S_{REF}$, e.g., during a calibration procedure of the sensor device. At 416, the control circuit may be configured to determine an absolute value $S_{ABS}$ of the sample $S_D$ (e.g., $S_{ABS}|S_D|$). If the absolute value $S_{ABS}$ is greater than or equal to a detection threshold $S_{TH-DET}$ at step 416, the control circuit may determine that the space is occupied (e.g., detect an occupancy condition) at step 418 and the procedure 400 may end. If the absolute value $S_{ABS}$ is less than the detection threshold $S_{TH-DET}$ at step 416, the control circuit may determine that the space is vacant (e.g., detect a vacancy condition) at step 420, before the procedure 400 ends.

Figure 5:
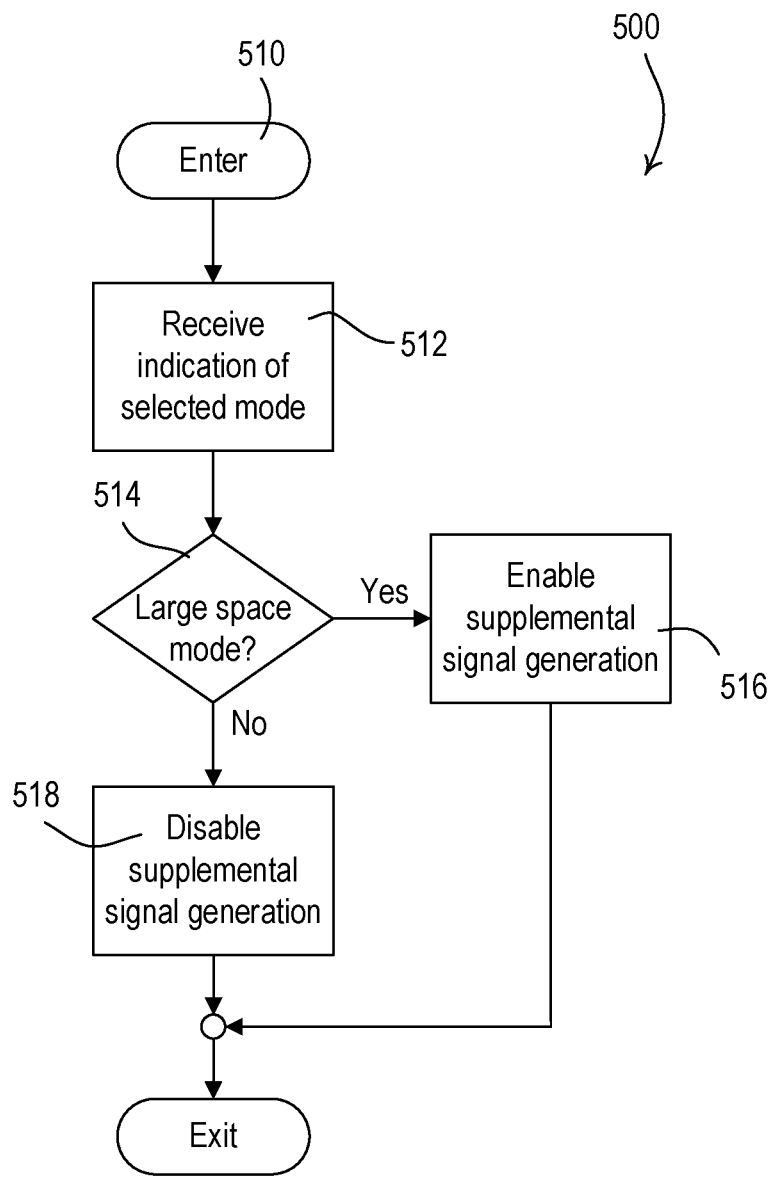
FIGS. 5-11 are flowcharts of example procedures that may be executed to configure a sensor device for detection of an occupancy and/or vacancy condition in a space.

FIG. 5 is a flowchart of an example procedure 500 for configuring a sensor device (e.g., the sensor devices 120, 120', 150, 200, 200', 300) to enable detection of an occupancy and/or vacancy condition in a space. For example, the procedure 500 may be executed by a control circuit of the sensor device (e.g., the control circuits 210', 310). The control circuit may execute the procedure 500 to determine a mode of operation of the sensor device. For example, the sensor device may be configured to operate in a small space mode (e.g., a large-signal mode) and a large space mode (e.g., a small-signal mode). While in the small space mode, the sensor device may be configured to receive and process ultrasonic waves having a relatively large magnitude (e.g., when the sensor device is installed in small space). While in the large space mode, the sensor device may be configured to receive and process ultrasonic waves having a relatively small magnitude (e.g., when the sensor device is installed in large space). For example, the control procedure may be executed periodically, in response to detecting an actuation of an actuator, and/or in response to receiving a message (e.g., via RF signals) at 510.

At 512, the control circuit may receive an indication of a mode of operation of the sensor device. The control circuit may be configured to determine to operate in one of the small space mode and the large space mode in response to actuations of one or more actuators (e.g., the actuators of the user interface circuit 216) and/or in response to a message received by a communication circuit (e.g., the communication circuit 214). When the large-space mode is indicated at 514, the control circuit may enable generation of a supplemental signal $V_{SUP}$ in the sensor device at 516, before the procedure 500 ends. For example, the supplemental signal $V_{SUP}$ may be added to an ultrasonic reception signal $V_{RX}$ generated by an ultrasonic receiving element (e.g., the ultrasonic receiving elements 204, 304) prior to being processed by an ultrasonic receiving circuit (e.g., the ultrasonic receiving circuits 230, 330). Adding the supplemental signal $V_{SUP}$ to the ultrasonic reception signal $V_{RX}$ may ensure that the magnitudes of the signals processed by the ultrasonic receiving circuit are large enough to appropriately be processed when the sensor device is installed in a large space. The control circuit may be configured to generate a signal generation control signal $V_{CON}$, which may be received by a signal generator circuit (e.g., the signal generator circuit 270, 360) for controlling the generation of the supplemental signal $V_{SUP}$. For example, the control circuit may be configured to enable the generation of the supplemental signal $V_{SUP}$ by pulse-width modulating the signal generation control signal $V_{CON}$. When the large-space mode is not indicated (e.g., the small-space mode is indicated) at 514, the control circuit may disable generation of the supplemental signal $V_{SUP}$ at 518 and the procedure 500 may end. For example, the control circuit may be configured to disable the generation of the supplemental signal $V_{SUP}$ by ceasing pulse-width modulation the signal generation control signal $V_{CON}$.

Figure 6:
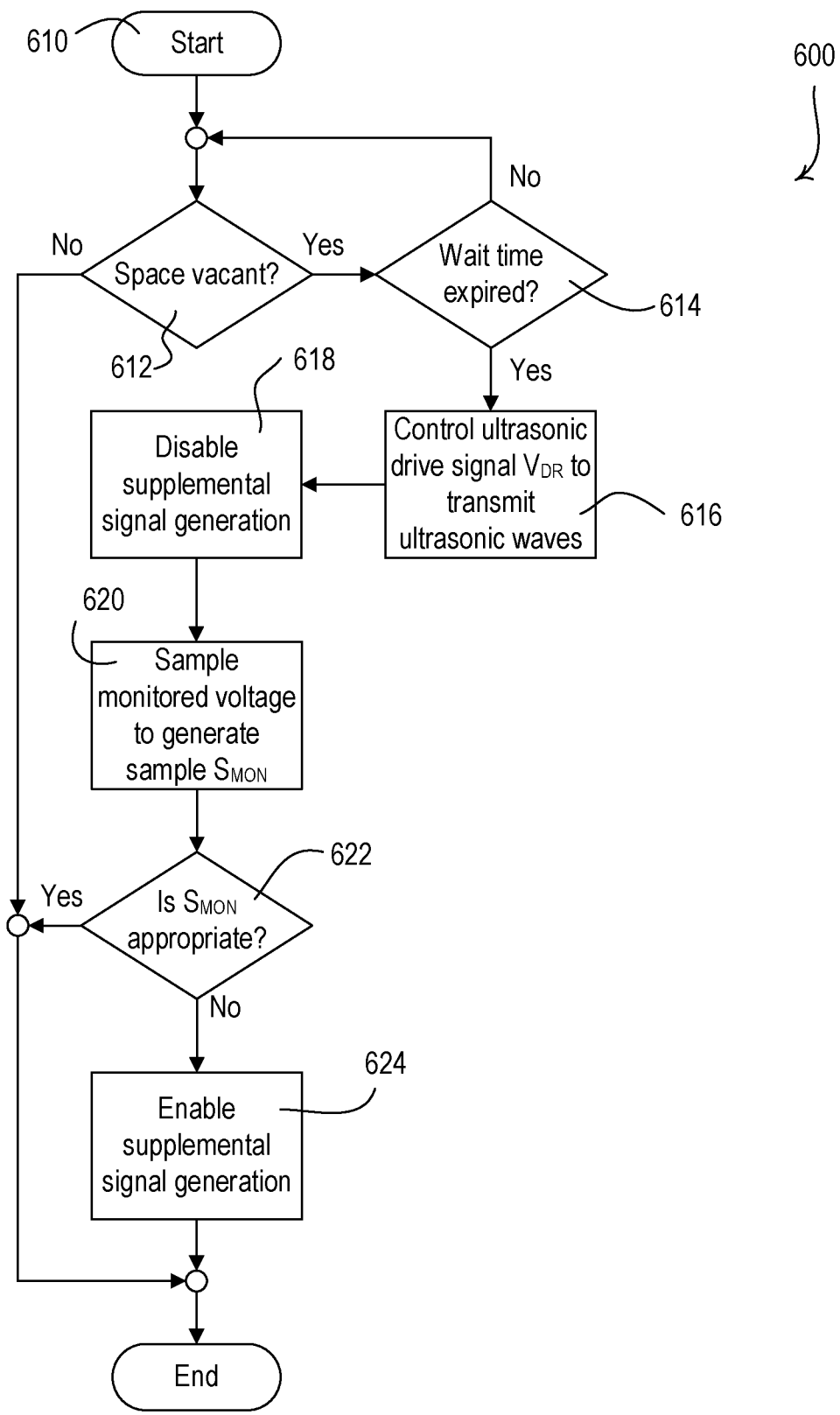

FIG. 6 is a flowchart of an example procedure 600 for configuring a sensor device (e.g., the sensor devices 120, 120', 150, 200, 200', 300) to enable detection of an occupancy and/or vacancy condition in a space. For example, the procedure 600 may be executed by a control circuit of the sensor device (e.g., the control circuits 210', 310). The control circuit may execute the procedure 600 to calibrate the operation of the sensor device. The control circuit may be configured to cause the sensor device to transmit ultrasonic waves and detect the occupancy and/or vacancy condition in the space in response to ultrasonic waves that are reflected off objects in the space and received by the sensor device. The sensor device may control an ultrasonic transmitting circuit (e.g., the ultrasonic transmitting circuit 220, 320) for causing an ultrasonic transmitting element (e.g., the ultrasonic transmitting element 202, 302) to transmit the ultrasonic waves. The sensor device may comprise a signal generator circuit (e.g., the signal generator circuit 270, 370) that may be configured to generate a supplemental signal $V_{SUP}$ that is combined with (e.g., added to) an ultrasonic reception signal $V_{RX}$ generated by an ultrasonic receiving element (e.g., the ultrasonic receiving elements 204, 304) prior to be processed by an ultrasonic receiving circuit (e.g., the ultrasonic receiving circuits 230, 330). The control circuit may be configured to generate (e.g., pulse-width modulate) a signal generation control signal $V_{CON}$, which may be received by the signal generator circuit for controlling the generation of the supplemental signal $V_{SUP}$. The control circuit may execute the procedure 600 to enable and/or disable generation of the supplemental signal $V_{SUP}$ to ensure that the ultrasonic receiving circuit is able to process the ultrasonic reception signal $V_{RX}$ (e.g., the combination of the ultrasonic reception signal $V_{RX}$ and the supplemental signal $V_{SUP}$).

The control circuit may be configured to execute the procedure 600 during an initial configuration procedure of the sensor device and/or during one or more maintenance configuration procedures (e.g., after the initial configuration procedure). For example, the control procedure 600 may be executed periodically (e.g., once a month), in response to detecting an actuation of an actuator, and/or in response to receiving a message (e.g., via RF signals) at 610. For example, when the sensor device has two pairs of ultrasonic transmitting and receiving elements, the control circuit may individually execute the control procedure 600 for each of the respective ultrasonic receiving circuits and respective signal generator circuits. The control circuit may control the ultrasonic transmitting circuits to cause both of the ultrasonic transmitting elements to emit ultrasonic waves during each execution of the control procedure 600 (e.g., for each of the ultrasonic receiving circuits).

The control circuit may be configured to calibrate the operation of the sensor device when the space is vacant. At 612, the control circuit may be configured to determine if the space is vacant, for example, in response to the ultrasonic detection signal $V_{DET}$ generated by the ultrasonic receiving circuit 230, 330 and/or the PIR detect signal $V_{PIR}$ generated by the PIR detection circuit 290. If the space is not vacant (e.g., occupied), the procedure 600 may simply exit. At 614, the control circuit may determine if a wait time $T_{WAIT}$ (e.g., approximately 15 minutes) has expired. For example, the wait time $T_{WAIT}$ may begin when the procedure 600 is executed at 610. If the space is not vacant for the length of the wait time $T_{WAIT}$, the procedure 600 may exit. When the space is vacant for the length of the wait time $T_{WAIT}$, the control circuit may continue on to 616 to configure the operation of the signal generator circuit.

At 616, the control circuit may generate an ultrasonic drive signal $V_{DR}$ to cause the sensor device to transmit ultrasonic waves. The ultrasonic drive signal $V_{DR}$ may be received by the ultrasonic transmitting circuit, which may generate an ultrasonic transmission voltage $V_{TX}$. The ultrasonic transmission voltage $V_{TX}$ may be received by the ultrasonic transmitting element, which may emit the ultrasonic waves. For example, the control circuit may be configured to pulse-width modulate the ultrasonic drive signal $V_{DR}$, such that the ultrasonic drive signal $V_{DR}$ is a PWM voltage characterized by the ultrasonic transmission frequency $f_{US}$ (e.g., approximately 40 kHz) and a duty cycle of approximately 50%. The control circuit may control a phase $\Phi_{DR}$ of the ultrasonic drive signal $V_{DR}$ to control a phase $\Phi_{TX}$ of the transmitted ultrasonic waves. For example, the control circuit may control the phase $\Phi_{TX}$ of the transmitted ultrasonic waves to be zero. If the sensor device does not comprise an ultrasonic transmitting element and an ultrasonic transmitting circuit (e.g., the sensor devices is used in a load control system having external ultrasonic transmitters), generation of the ultrasonic drive signal $V_{DR}$ at 612 of the procedure 600 may be omitted.

At 618, the control circuit may be configured to disable generation of the supplemental signal $V_{SUP}$. For example, the control circuit may be configured to disable the generation of the supplemental signal $V_{SUP}$ at 618 by ceasing pulse-width modulation of the signal generation control signal $V_{CON}$ and/or driving the magnitude of the generation control signal $V_{CON}$ to otherwise disable the signal generator circuit. At 620, the control circuit may be configured to sample the magnitude (e.g., the DC magnitude) of a voltage of the ultrasonic receiving circuit (e.g., a monitored voltage) that may indicate that one or more signals of the ultrasonic receiving circuit may be at appropriate magnitudes to be properly processed (e.g., to allow the ultrasonic receiving circuit to generate the ultrasonic detection signal $V_{DET}$). For example, the monitored voltage may be the envelope signal $V_{ENV}$ and/or the filtered version of the envelope signal $V_{ENV}$ (e.g., the filtered envelope signal $V_{ENV-F}$). The control circuit may be configured to sample and store the magnitude (e.g., the DC magnitude) of the monitored voltage (e.g., the magnitude of the envelope signal $V_{ENV}$ and/or the filtered version of the envelope signal $V_{ENV}$) at 620 to generate a sample $S_{MON}$.

At 622, the control circuit may be configured to determine if the magnitude of the monitored voltage (e.g., the magnitude of the envelope signal $V_{ENV}$ and/or the filtered version of the envelope signal $V_{ENV}$ as indicated by the sample $S_{MON}$) indicates that the one or more signals of the ultrasonic receiving circuit are at appropriate magnitudes to be properly processed. For example, the control circuit may be configured to compare the sample $S_{MON}$ to a threshold $S_{TH-MON}$ and determine that the magnitude of the monitored voltage is at an appropriate level when the magnitude of the sample $S_{MON}$ exceeds the threshold $S_{TH-MON}$. When the control circuit determines that the magnitude of the monitored voltage is at an appropriate level at 622, the procedure 600 may exit (e.g., with the generation of the supplemental signal $V_{SUP}$ disabled).

When the control circuit determines that the magnitude of the monitored voltage is not at an appropriate level at 622, the control circuit may be configured to enable the generation of the supplemental signal $V_{SUP}$ at 624, before the procedure 600 exits. For example, the control circuit may be configured to enable the generation of the supplemental signal $V_{SUP}$ at 620 by pulse-width modulating the signal generation control signal $V_{CON}$ and/or driving the magnitude of the generation control signal $V_{CON}$ to enable the signal generator circuit. The control circuit may retrieve a value for a phase $\Phi_{CON}$ of the signal generation control signal $V_{CON}$ from, for example, memory (e.g., the memory 212) at 624. When the procedure 600 is executed for the first time (e.g., as part of the initial configuration procedure of the sensor device), the control circuit may be configured to initialize the phase $\Phi_{CON}$ of the signal generation control signal $V_{CON}$ to zero (e.g., such that the phase $\Phi_{CON}$ of the signal generation control signal $V_{CON}$ is equal to the phase $\Phi_{DR}$ of the ultrasonic drive signal $V_{DR}$). When the procedure 600 is subsequently executed (e.g., after the initial configuration procedure of the sensor device), the control circuit may be configured to determine the phase $\Phi_{CON}$ of the signal generation control signal $V_{CON}$ to be the zero if the phase $\Phi_{CON}$ was not modified during a previous execution of the procedure 600 or another value if the phase $\Phi_{CON}$ was modified during a previous execution of the procedure 600. When the phase $\Phi_{CON}$ of the signal generation control signal $V_{CON}$ is zero (e.g., the signal generation control signal $V_{CON}$ is in phase with the ultrasonic drive signal $V_{DR}$), the control circuit may generate the rising and falling edges of the signal generation control signal $V_{CON}$ at the same times as the rising and falling edges of the ultrasonic drive signal $V_{DR}$, respectively.

Figure 7:
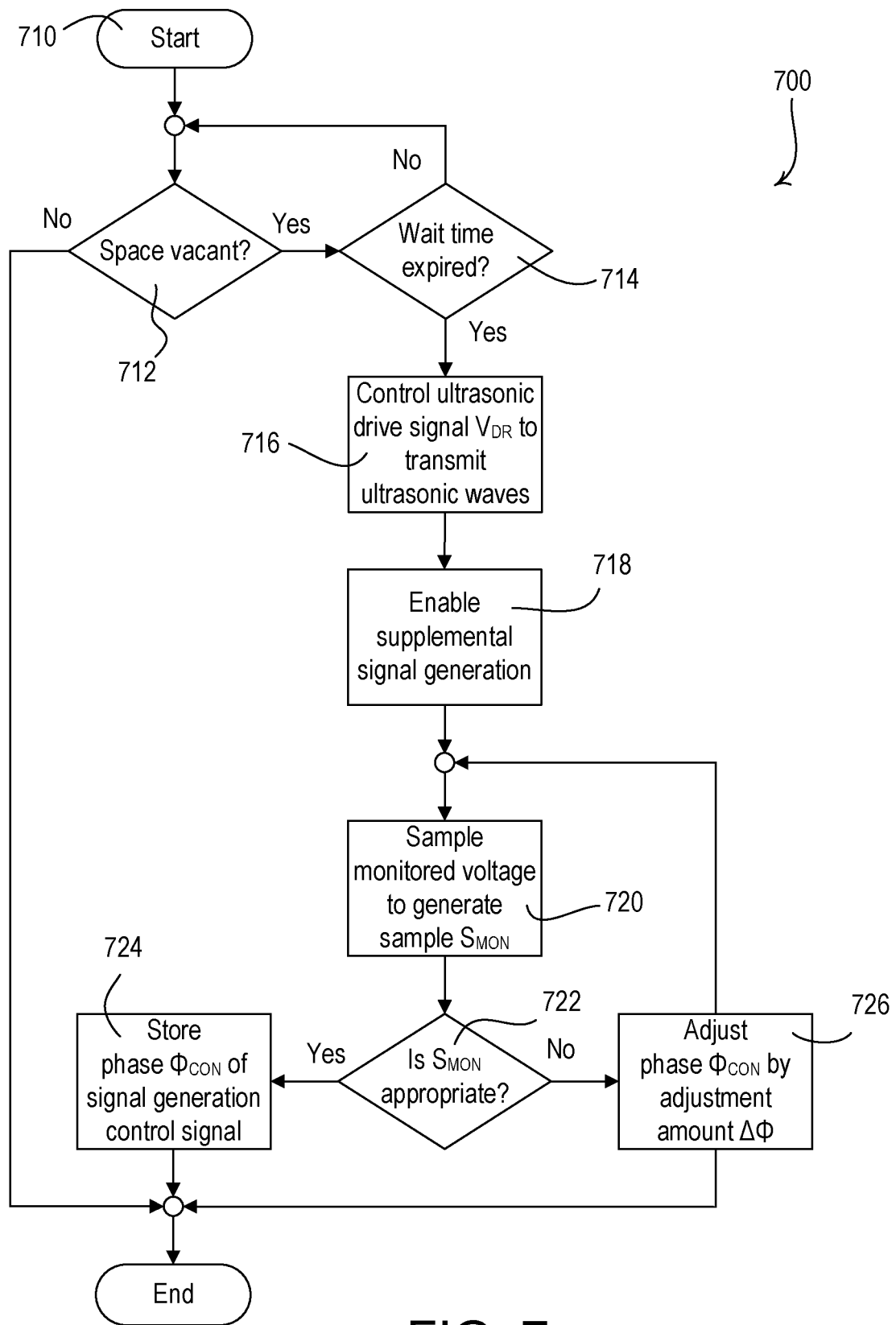

FIG. 7 is a flowchart of an example procedure 700 for configuring a sensor device (e.g., the sensor devices 120, 120', 150, 200, 200', 300) to enable detection of an occupancy and/or vacancy condition in a space. For example, the procedure 700 may be executed by a control circuit of the sensor device (e.g., the control circuits 210', 310). The control circuit may execute the procedure 700 to calibrate the operation of the sensor device. The control circuit may be configured to cause the sensor device to transmit ultrasonic waves and detect the occupancy and/or vacancy condition in the space in response to ultrasonic waves that are reflected off objects in the space and received by the sensor device. The sensor device may control an ultrasonic transmitting circuit (e.g., the ultrasonic transmitting circuit 220, 320) for causing an ultrasonic transmitting element (e.g., the ultrasonic transmitting element 202, 302) to transmit the ultrasonic waves. The sensor device may comprise a signal generator circuit (e.g., the signal generator circuit 270, 370) that may be configured to generate a supplemental signal $V_{SUP}$ that is combined with (e.g., added to) an ultrasonic reception signal $V_{RX}$ generated by an ultrasonic receiving element (e.g., the ultrasonic receiving elements 204, 304) prior to be processed by an ultrasonic receiving circuit (e.g., the ultrasonic receiving circuits 230, 330). The control circuit may be configured to generate (e.g., pulse-width modulate) a signal generation control signal $V_{CON}$, which may be received by the signal generator circuit for controlling the generation of the supplemental signal $V_{SUP}$. For example, the supplemental signal $V_{SUP}$ may be generated (e.g., initially generated) in phase with the transmitted ultrasonic waves. The received ultrasonic waves may be characterized by a phase delay $\Phi_{RX}$ as compared to the transmitted ultrasonic waves. When the received ultrasonic waves are out of phase (e.g., approximately 180° out of phase) with the transmitted ultrasonic waves and the ultrasonic reception signal $V_{RX}$ and the supplemental signal $V_{SUP}$ have approximately the same magnitude, addition of the supplemental signal $V_{SUP}$ to the ultrasonic reception signal $V_{RX}$ may result in a signal having a small magnitude (e.g., approximately zero volts), which the ultrasonic receiving circuit may not be capable of processing. The control circuit may execute the procedure 700 to adjust a phase $\Phi_{SUP}$ of the supplemental signal $V_{SUP}$ to a value at which the ultrasonic receiving circuit is able to process the combination of the ultrasonic reception signal $V_{RX}$ and the supplemental signal $V_{SUP}$.

The control circuit may be configured to execute the procedure 700 during an initial configuration procedure of the sensor device and/or during one or more maintenance configuration procedures (e.g., after the initial configuration procedure). For example, the control procedure 700 may be executed periodically (e.g., once a month), in response to detecting an actuation of an actuator, and/or in response to receiving a message (e.g., via RF signals) at 710. For example, when the sensor device has two pairs of ultrasonic transmitting and receiving elements, the control circuit may individually execute the control procedure 700 for each of the respective ultrasonic receiving circuits and respective signal generator circuits. The control circuit may control the ultrasonic transmitting circuits to cause both of the ultrasonic transmitting elements to emit ultrasonic waves during each execution of the control procedure 700 (e.g., for each of the ultrasonic receiving circuits).

The control circuit may be configured to calibrate the operation of the sensor device when the space is vacant. At 712, the control circuit may be configured to determine if the space is vacant, for example, in response to the ultrasonic detection signal $V_{DET}$ generated by the ultrasonic receiving circuit 230, 330 and/or the PIR detect signal $V_{PIR}$ generated by the PIR detection circuit 290. If the space is not vacant (e.g., occupied), the procedure 700 may simply exit. At 714, the control circuit may determine if a wait time $T_{WAIT}$ (e.g., approximately 15 minutes) has expired. For example, the wait time $T_{WAIT}$ may begin when the procedure 700 is executed at 710. If the space is not vacant for the length of the wait time $T_{WAIT}$, the procedure 700 may exit. When the space is vacant for the length of the wait time $T_{WAIT}$, the control circuit may continue on to 716 to configure the operation of the signal generator circuit.

At 716, the control circuit may generate an ultrasonic drive signal $V_{DR}$ to cause the sensor device to transmit ultrasonic waves. The ultrasonic drive signal $V_{DR}$ may be received by the ultrasonic transmitting circuit, which may generate an ultrasonic transmission voltage $V_{TX}$. The ultrasonic transmission voltage $V_{TX}$ may be received by the ultrasonic transmitting element, which may emit the ultrasonic waves. For example, the control circuit may be configured to pulse-width modulate the ultrasonic drive signal $V_{DR}$, such that the ultrasonic drive signal $V_{DR}$ is a PWM voltage characterized by the ultrasonic transmission frequency $f_{US}$ (e.g., approximately 40 kHz) and a duty cycle of approximately 50%. The control circuit may control a phase $\Phi_{DR}$ of the ultrasonic drive signal $V_{DR}$ to control a phase $\Phi_{TX}$ of the transmitted ultrasonic waves. For example, the control circuit may control the phase $\Phi_{TX}$ of the transmitted ultrasonic waves to be zero. If the sensor device does not comprise an ultrasonic transmitting element and an ultrasonic transmitting circuit (e.g., the sensor devices is used in a load control system having external ultrasonic transmitters), generation of the ultrasonic drive signal $V_{DR}$ at 712 of the procedure 700 may be omitted.

At 718, the control circuit may be configured to enable the generation of the supplemental signal $V_{SUP}$. For example, the control circuit may be configured to enable the generation of the supplemental signal $V_{SUP}$ at 718 by pulse-width modulating the signal generation control signal $V_{CON}$ and/or driving the magnitude of the generation control signal $V_{CON}$ to enable the signal generator circuit. The control circuit may retrieve a value for a phase $\Phi_{ON}$ of the signal generation control signal $V_{CON}$ from, for example, memory (e.g., the memory 212) at 718. When the procedure 700 is executed for the first time (e.g., as part of the initial configuration procedure of the sensor device), the control circuit may be configured to initialize the phase $\Phi_{ON}$ of the signal generation control signal $V_{CON}$ to zero (e.g., such that the phase $\Phi_{CON}$ of the signal generation control signal $V_{CON}$ is equal to the phase $\Phi_{DR}$ of the ultrasonic drive signal $V_{DR}$). When the procedure 700 is subsequently executed (e.g., after the initial configuration procedure of the sensor device), the control circuit may be configured to determine the phase $\Phi_{ON}$ of the signal generation control signal $V_{CON}$ to be the zero if the phase $\Phi_{ON}$ was not modified during a previous execution of the procedure 700 or another value if the phase $\Phi_{ON}$ was modified during a previous execution of the procedure 700. When the phase $\Phi_{ON}$ of the signal generation control signal $V_{CON}$ is zero (e.g., the signal generation control signal $V_{CON}$ is in phase with the ultrasonic drive signal $V_{DR}$), the control circuit may generate the rising and falling edges of the signal generation control signal $V_{CON}$ at the same times as the rising and falling edges of the ultrasonic drive signal $V_{DR}$, respectively.

At 720, the control circuit may be configured to sample the magnitude (e.g., the DC magnitude) of a voltage of the ultrasonic receiving circuit (e.g., a monitored voltage) that may indicate that one or more signals of the ultrasonic receiving circuit may be at appropriate magnitudes to be properly processed (e.g., to allow the ultrasonic receiving circuit to generate the ultrasonic detection signal $V_{DET}$). For example, the monitored voltage may be the envelope signal $V_{ENV}$ and/or the filtered version of the envelope signal $V_{ENV}$ (e.g., the filtered envelope signal $V_{ENV-F}$). For example, the control circuit may be configured to sample and store the magnitude (e.g., the DC magnitude) of the monitored voltage (e.g., the envelope signal $V_{ENV}$ and/or the filtered version of the envelope signal $V_{ENV}$) at 720 to generate a sample $S_{MON}$.

At 722, the control circuit may be configured to determine if the magnitude of the monitored voltage (e.g., as indicated by the sample $S_{MON}$) indicates that the one or more signals of the ultrasonic receiving circuit are at appropriate magnitudes to be properly processed. For example, the control circuit may be configured to compare the sample $S_{MON}$ to a threshold $S_{TH-MON}$ and determine that the magnitude of the monitored voltage is at an appropriate level when the magnitude of the sample $S_{MON}$ exceeds the threshold $S_{TH-MON}$. When the addition of the supplemental signal $V_{SUP}$ to the ultrasonic reception signal $V_{RX}$ is not causing the input signal $V_{IN}$ to have a smaller magnitude (e.g., the sample $S_{MON}$ of the monitored voltage exceeds the threshold $S_{TH-MON}$) at 722, the control circuit may determine that the magnitude of the monitored voltage is at an appropriate level while the supplemental signal $V_{SUP}$ is being generated, and may store the phase $\Phi_{CON}$ of the signal generation control signal $V_{CON}$ at 724, before the procedure 700 ends. For example, the control circuit may store the phase $\Phi_{CON}$ of the signal generation control signal $V_{CON}$ as the initial phase when the sample $S_{MON}$ is at an appropriate level at 724 the first time that the procedure is executed.

When the received ultrasonic waves are out of phase with the transmitted ultrasonic waves and the addition of the supplemental signal $V_{SUP}$ to the ultrasonic reception signal $V_{RX}$ is causing the input signal $V_{IN}$ to have a smaller magnitude (e.g., the sample $S_{MON}$ is less than the threshold $S_{TH-MON}$) at 722, the control circuit may determine that the magnitude of the monitored voltage is not at an appropriate level, and may adjust (e.g., increase and/or decrease) the phase $\Phi_{CON}$ of the signal generation control signal $V_{CON}$ by an adjustment amount $\Delta\Phi$ at 726, sample the magnitude of the monitored voltage at 720 to generate another sample $S_{MON}$, and determine if the sample $S_{MON}$ at an appropriate level at 722. For example, the adjustment amount $\Delta\Phi$ may be a fixed amount, such that the control circuit adjusts the phase $\Phi_{CON}$ of the signal generation control signal $V_{CON}$ by the same amount each time that the control circuits adjust the phase $\Phi_{CON}$ of the signal generation control signal $V_{CON}$ at 726. In addition, the adjustment amount $\Delta\Phi$ may be a variable amount that varies each time that the control circuits adjust the phase $\Phi_{CON}$ of the signal generation control signal $V_{CON}$ at 726. For example, the control circuit may adjust the phase $\Phi_{CON}$ of the signal generation control signal $V_{CON}$ using an interval-halving method (e.g., a binary search method). For example, the control circuit may adjust the phase $\Phi_{CON}$ of the signal generation control signal $V_{CON}$ to approximately 180° (e.g., as compared to the phase $\Phi_R$ of the ultrasonic drive signal $V_{DR}$) the first time that the phase $\Phi_{CON}$ of the signal generation control signal $V_{CON}$ is adjusted at 726, and then adjust the phase $\Phi_{CON}$ of the signal generation control signal $V_{CON}$ to a value that is approximately equal to half of the previous value of the phase $\Phi_{CON}$ each time that the phase $\Phi_{CON}$ of the signal generation control signal $V_{CON}$ is subsequently adjusted at 726 (e.g., approximately 90°, 45°, 22.5°, and so on). The control circuit may continue to adjust the phase $\Phi_{CON}$ of the signal generation control signal $V_{CON}$ by the adjustment amount $\Delta\Phi$ at 726 and sample the magnitude of the monitored voltage at 720 until the sample $S_{MON}$ is at an appropriate level at 722. At 724, the control circuit may then store the phase $\Phi_{CON}$ of the signal generation control signal $V_{CON}$ as the phase last set at 726, before the procedure 700 ends.

Figure 8:
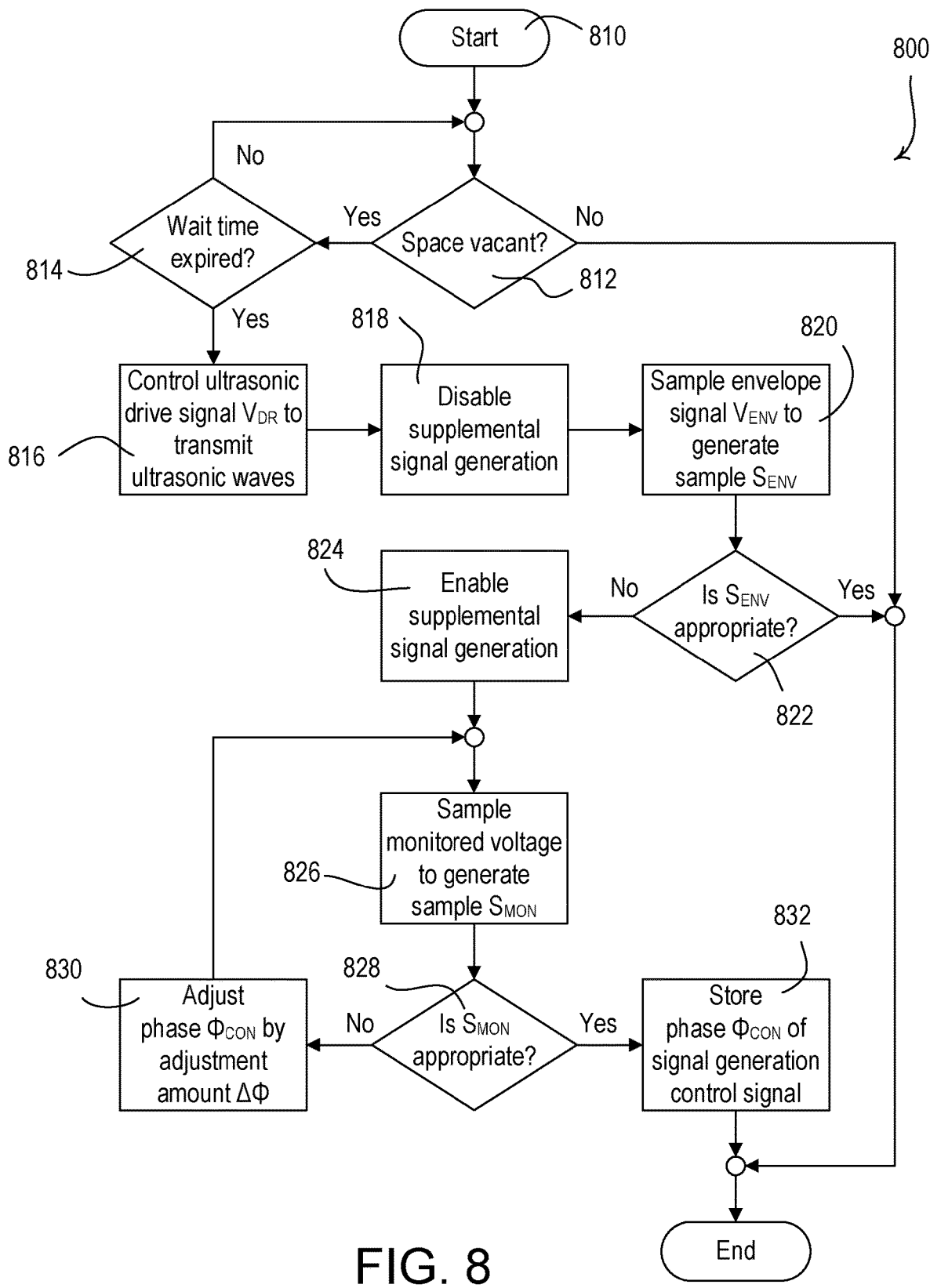

FIG. 8 is a flowchart of an example procedure 800 for configuring a sensor device (e.g., the sensor devices 120, 120', 150, 200, 200', 300) to enable detection of an occupancy and/or vacancy condition in a space. For example, the procedure 800 may be executed by a control circuit of the sensor device (e.g., the control circuits 210', 310). The control circuit may execute the procedure 800 to calibrate the operation of the sensor device. The control circuit may be configured to cause the sensor device to transmit ultrasonic waves and detect the occupancy and/or vacancy condition in the space in response to ultrasonic waves that are reflected off objects in the space and received by the sensor device. The sensor device may control an ultrasonic transmitting circuit (e.g., the ultrasonic transmitting circuit 220, 320) for causing an ultrasonic transmitting element (e.g., the ultrasonic transmitting element 202, 304) to transmit the ultrasonic waves. The sensor device may comprise a signal generator circuit (e.g., the signal generator circuit 270, 370) that may be configured to generate a supplemental signal $V_{SUP}$ that is combined with (e.g., added to) an ultrasonic reception signal $V_{RX}$ generated by an ultrasonic receiving element (e.g., the ultrasonic receiving elements 204, 304) prior to be processed by an ultrasonic receiving circuit (e.g., the ultrasonic receiving circuits 230, 330). The control circuit may be configured to generate (e.g., pulse-width modulate) a signal generation control signal $V_{CON}$, which may be received by the signal generator circuit for controlling the generation of the supplemental signal $V_{SUP}$. For example, the supplemental signal $V_{SUP}$ may be generated (e.g., initially generated) in phase with the transmitted ultrasonic waves. The received ultrasonic waves may be characterized by a phase delay $\Phi_{RX}$ as compared to the transmitted ultrasonic waves. When the received ultrasonic waves are out of phase (e.g., approximately 180° out of phase) with the transmitted ultrasonic waves and the ultrasonic reception signal $V_{RX}$ and the supplemental signal $V_{SUP}$ have approximately the same magnitude, addition of the supplemental signal $V_{SUP}$ to the ultrasonic reception signal $V_{RX}$ may result in a signal having a small magnitude (e.g., approximately zero volts), which the ultrasonic receiving circuit may not be capable of processing. The control circuit may execute the procedure 800 to enable and/or disable generation of the supplemental signal $V_{SUP}$ as well as to adjust a phase $\Phi_{SUP}$ of the supplemental signal $V_{SUP}$ to a value at which the ultrasonic receiving circuit is able to process the combination of the ultrasonic reception signal $V_{RX}$ and the supplemental signal $V_{SUP}$.

The control circuit may be configured to execute the procedure 800 during an initial configuration procedure of the sensor device and/or during one or more maintenance configuration procedures (e.g., after the initial configuration procedure). For example, the control procedure 800 may be executed periodically (e.g., once a month), in response to detecting an actuation of an actuator, and/or in response to receiving a message (e.g., via RF signals) at 810. For example, when the sensor device has two pairs of ultrasonic transmitting and receiving elements, the control circuit may individually execute the control procedure 800 for each of the respective ultrasonic receiving circuits and respective signal generator circuits. The control circuit may control the ultrasonic transmitting circuits to cause both of the ultrasonic transmitting elements to emit ultrasonic waves during each execution of the control procedure 800 (e.g., for each of the ultrasonic receiving circuits).

The control circuit may be configured to calibrate the operation of the sensor device when the space is vacant. At 812, the control circuit may be configured to determine if the space is vacant, for example, in response to the ultrasonic detection signal $V_{DET}$ generated by the ultrasonic receiving circuit 230, 330 and/or the PIR detect signal $V_{PIR}$ generated by the PIR detection circuit 290. If the space is not vacant (e.g., occupied), the procedure 800 may simply exit. At 814, the control circuit may determine if a wait time $T_{WAIT}$ (e.g., approximately 15 minutes) has expired. For example, the wait time $T_{WAIT}$ may begin when the procedure 800 is executed at 810. If the space is not vacant for the length of the wait time $T_{WAIT}$, the procedure 800 may exit. When the space is vacant for the length of the wait time $T_{WAIT}$, the control circuit may continue on to 816 to configure the operation of the signal generator circuit.

At 816, the control circuit may generate an ultrasonic drive signal $V_{DR}$ to cause the sensor device to transmit ultrasonic waves. The ultrasonic drive signal $V_{DR}$ may be received by the ultrasonic transmitting circuit, which may generate an ultrasonic transmission voltage $V_{TX}$. The ultrasonic transmission voltage $V_{TX}$ may be received by the ultrasonic transmitting element, which may emit the ultrasonic waves. For example, the control circuit may be configured to pulse-width modulate the ultrasonic drive signal $V_{DR}$, such that the ultrasonic drive signal $V_{DR}$ is a PWM voltage characterized by the ultrasonic transmission frequency $f_{US}$ (e.g., approximately 40 kHz) and a duty cycle of approximately 50%. The control circuit may control a phase $\Phi_{DR}$ of the ultrasonic drive signal $V_{DR}$ to control a phase $\Phi_{TX}$ of the transmitted ultrasonic waves. For example, the control circuit may control the phase $\Phi_{TX}$ of the transmitted ultrasonic waves to be zero. If the sensor device does not comprise an ultrasonic transmitting element and an ultrasonic transmitting circuit (e.g., the sensor devices is used in a load control system having external ultrasonic transmitters), generation of the ultrasonic drive signal $V_{DR}$ at 812 of the procedure 800 may be omitted.

At 818, the control circuit may be configured to disable generation of the supplemental signal $V_{SUP}$. For example, the control circuit may be configured to disable the generation of the supplemental signal $V_{SUP}$ at 818 by ceasing pulse-width modulation of the signal generation control signal $V_{CON}$ and/or driving the magnitude of the generation control signal $V_{CON}$ to otherwise disable the signal generator circuit. At 820, the control circuit may be configured to sample the magnitude (e.g., the DC magnitude) of a voltage of the ultrasonic receiving circuit (e.g., a monitored voltage) that may indicate that one or more signals of the ultrasonic receiving circuit may be at appropriate magnitudes to be properly processed (e.g., to allow the ultrasonic receiving circuit to generate the ultrasonic detection signal $V_{DET}$). For example, the monitored voltage may be the envelope signal $V_{ENV}$ and/or the filtered version of the envelope signal $V_{ENV}$ (e.g., the filtered envelope signal $V_{ENV-F}$). The control circuit may be configured to sample and store the magnitude (e.g., the DC magnitude) of the monitored voltage (e.g., the envelope signal $V_{ENV}$ and/or the filtered version of the envelope signal $V_{ENV}$) at 820 to generate a sample $S_{MON}$.

At 822, the control circuit may be configured to determine if the magnitude of the monitored voltage (e.g., as indicated by the sample $S_{MON}$) indicates that the one or more signals of the ultrasonic receiving circuit are at appropriate magnitudes to be properly processed. For example, the control circuit may be configured to compare the sample $S_{MON}$ to a threshold $S_{TH-MON}$ and determine that the magnitude of the monitored voltage is at an appropriate level when the magnitude of the sample $S_{MON}$ exceeds the threshold $S_{TH-MON}$. When the control circuit determines that the magnitude of the monitored voltage is at an appropriate level at 822, the procedure 800 may exit (e.g., with the generation of the supplemental signal $V_{SUP}$ disabled).

When the control circuit determines that the magnitude of the monitored voltage is not at an appropriate level at 822, the control circuit may be configured to enable the generation of the supplemental signal $V_{SUP}$ at 824. For example, the control circuit may be configured to enable the generation of the supplemental signal $V_{SUP}$ at 820 by pulse-width modulating the signal generation control signal $V_{CON}$ and/or driving the magnitude of the generation control signal $V_{CON}$ to enable the signal generator circuit. The control circuit may retrieve a value for a phase $\Phi_{CON}$ of the signal generation control signal $V_{CON}$ from, for example, memory (e.g., the memory 212) at 824. When the procedure 800 is executed for the first time (e.g., as part of the initial configuration procedure of the sensor device), the control circuit may be configured to initialize the phase $\Phi_{CON}$ of the signal generation control signal $V_{CON}$ to zero (e.g., such that the phase $\Phi_{CON}$ of the signal generation control signal $V_{CON}$ is equal to the phase $\Phi_{DR}$ of the ultrasonic drive signal $V_{DR}$). When the procedure 800 is subsequently executed (e.g., after the initial configuration procedure of the sensor device), the control circuit may be configured to determine the phase $\Phi_{CON}$ of the signal generation control signal $V_{CON}$ to be the zero if the phase $\Phi_{CON}$ was not modified during a previous execution of the procedure 800 or another value if the phase $\Phi_{CON}$ was modified during a previous execution of the procedure 800. When the phase $\Phi_{CON}$ of the signal generation control signal $V_{CON}$ is zero (e.g., the signal generation control signal $V_{CON}$ is in phase with the ultrasonic drive signal $V_{DR}$), the control circuit may generate the rising and falling edges of the signal generation control signal $V_{CON}$ at the same times as the rising and falling edges of the ultrasonic drive signal $V_{DR}$, respectively.

At 826, the control circuit may be configured to sample the magnitude of the voltage of the ultrasonic receiving circuit (e.g., the magnitude of the monitored voltage that indicates that one or more signals of the ultrasonic receiving circuit may be at magnitudes to be properly processed) to generate a sample $S_{MON}$ with the generation of the supplemental signal $V_{SUP}$ enabled. At 828, the control circuit may be configured to determine if the magnitude of the monitored voltage (e.g., as indicated by the sample $S_{MON}$) indicates that the one or more signals of the ultrasonic receiving circuit are at appropriate magnitudes to be properly processed when the generation of the supplemental signal $V_{SUP}$ is enabled. For example, the control circuit may be configured to compare the sample $S_{MON}$ to the threshold $S_{TH-MON}$ and determine that the magnitude of the monitored voltage is at an appropriate level when the magnitude of the sample $S_{MON}$ exceeds the threshold $S_{TH-MON}$. When the addition of the supplemental signal $V_{SUP}$ to the ultrasonic reception signal $V_{RX}$ is not causing the input signal $V_{IN}$ to have a smaller magnitude (e.g., the sample $S_{MON}$ of the monitored voltage exceeds the threshold $S_{TH-MON}$) at 828, the control circuit may determine that the magnitude of the monitored voltage is at an appropriate level while the supplemental signal $V_{SUP}$ is being generated, and may store the phase $\Phi_{CON}$ of the signal generation control signal $V_{CON}$ at 830, before the procedure 800 ends. For example, the control circuit may store the phase $\Phi_{CON}$ of the signal generation control signal $V_{CON}$ as the initial phase when the sample $S_{MON}$ is at an appropriate level at 828 the first time that the procedure is executed.

When the received ultrasonic waves are out of phase with the transmitted ultrasonic waves and the addition of the supplemental signal $V_{SUP}$ to the ultrasonic reception signal $V_{RX}$ is causing the input signal $V_{IN}$ to have a smaller magnitude (e.g., the sample $S_{MON}$ is less than the threshold $S_{TH-MON}$) at 828, the control circuit may determine that the magnitude of the monitored voltage is not at an appropriate level, and may adjust (e.g., increase and/or decrease) the phase $\Phi_{CON}$ of the signal generation control signal $V_{CON}$ by an adjustment amount $\Delta\Phi$ at 830, sample the magnitude of the monitored voltage at 826 to generate another sample $S_{MON}$, and determine if the sample $S_{MON}$ at an appropriate level at 828. For example, the adjustment amount $\Delta\Phi$ may be a fixed amount, such that the control circuit adjusts the phase $\Phi_{CON}$ of the signal generation control signal $V_{CON}$ by the same amount each time that the control circuit adjusts the phase $\Phi_{CON}$ of the signal generation control signal $V_{CON}$ at 830. In addition, the adjustment amount $\Delta\Phi$ may be a variable amount that varies each time that the control circuit adjusts the phase $\Phi_{CON}$ of the signal generation control signal $V_{CON}$ at 830. For example, the control circuit may adjust the phase $\Phi_{CON}$ of the signal generation control signal $V_{CON}$ using an interval-halving method (e.g., a binary search method). For example, the control circuit may adjust the phase $\Phi_{CON}$ of the signal generation control signal $V_{CON}$ to approximately 180° (e.g., as compared to the phase $\Phi_R$ of the ultrasonic drive signal $V_{DR}$) the first time that the phase $\Phi_{CON}$ of the signal generation control signal $V_{CON}$ is adjusted at 830, and then adjust the phase $\Phi_{CON}$ of the signal generation control signal $V_{CON}$ to a value that is approximately equal to half of the previous value of the phase $\Phi_{CON}$ each time that the phase $\Phi_{CON}$ of the signal generation control signal $V_{CON}$ is subsequently adjusted at 830 (e.g., approximately 90°, 45°, 22.5°, and so on). The control circuit may continue to adjust the phase $\Phi_{CON}$ of the signal generation control signal $V_{CON}$ by the adjustment amount $\Delta\Phi$ at 830 and sample the magnitude of the monitored voltage at 826 until the sample $S_{MON}$ is at an appropriate level at 828. At 832, the control circuit may then store the phase $\Phi_{CON}$ of the signal generation control signal $V_{CON}$ as the phase last set at 830, before the procedure 800 ends.

Figure 9:
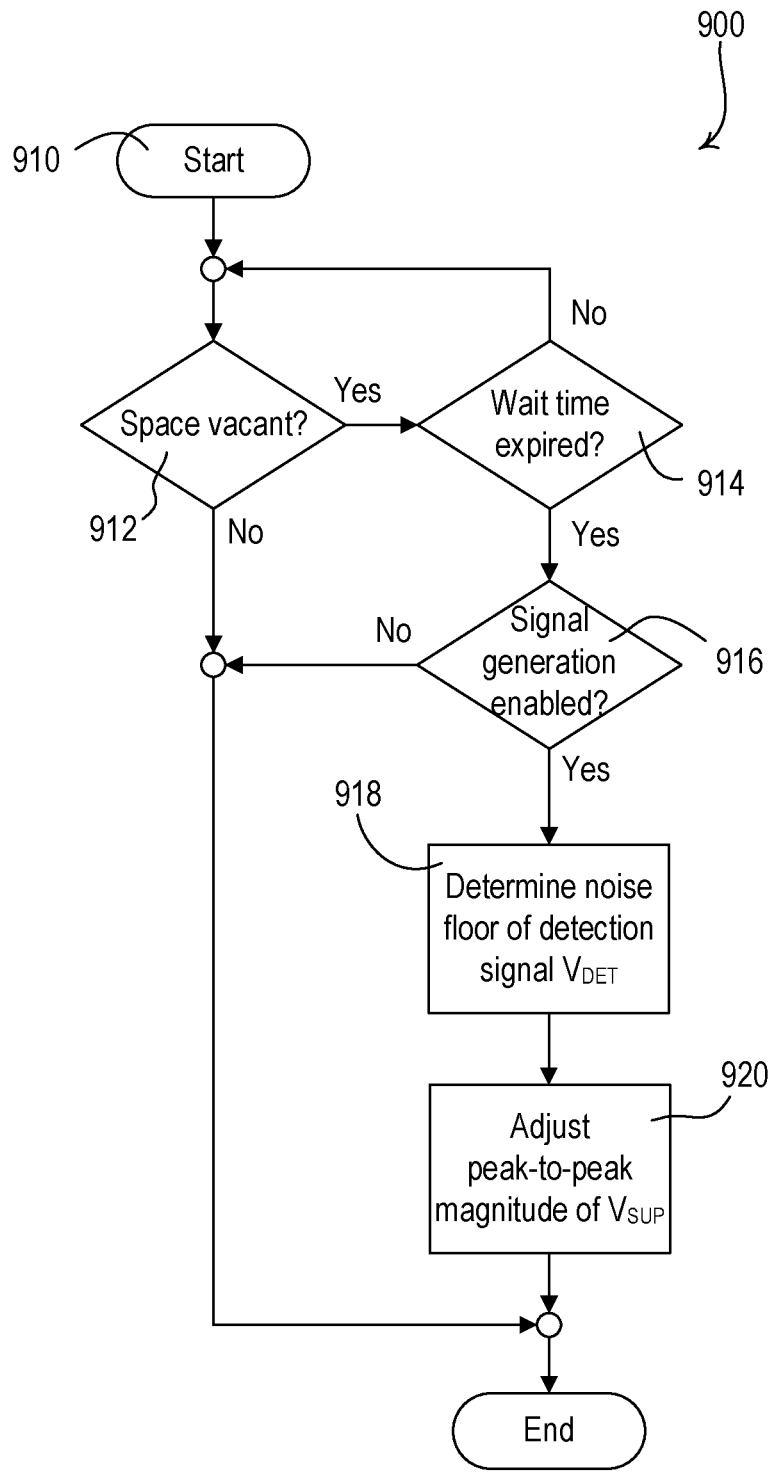

FIG. 9 is a flowchart of an example procedure 900 for configuring a sensor device (e.g., the sensor devices 120, 120', 150, 200, 200', 300) to enable detection of an occupancy and/or vacancy condition in a space. For example, the procedure 900 may be executed by a control circuit of the sensor device (e.g., the control circuits 210', 310). The control circuit may execute the procedure 900 to calibrate the operation of the sensor device. The control circuit may be configured to cause the sensor device to transmit ultrasonic waves and detect the occupancy and/or vacancy condition in the space in response to ultrasonic waves that are reflected off objects in the space and received by the sensor device. The sensor device may control an ultrasonic transmitting circuit (e.g., the ultrasonic transmitting circuit 220, 320) for causing an ultrasonic transmitting element (e.g., the ultrasonic transmitting element 202, 302) to transmit the ultrasonic waves. The sensor device may comprise a signal generator circuit (e.g., the signal generator circuit 270, 370) that may be configured to generate a supplemental signal $V_{SUP}$ that is combined with (e.g., added to) an ultrasonic reception signal $V_{RX}$ generated by an ultrasonic receiving element (e.g., the ultrasonic receiving elements 204, 304) prior to be processed by an ultrasonic receiving circuit (e.g., the ultrasonic receiving circuits 230, 330). The control circuit may be configured to generate a magnitude-adjustment control signal $V_{MAG-ADJ}$, which may be received by the signal generator circuit for adjusting a peak-to-peak magnitude $V_{P-P}$ of the supplemental signal $V_{SUP}$. The control circuit may execute the procedure 900 to adjust the peak-to-peak magnitude $V_{P-P}$ of the supplemental signal $V_{SUP}$ in response to a magnitude of a noise floor of an ultrasonic detection signal $V_{DET}$ received from the ultrasonic receiving circuit.

The control circuit may be configured to execute the procedure 900 during an initial configuration procedure of the sensor device and/or during one or more maintenance configuration procedures (e.g., after the initial configuration procedure). For example, the control procedure 900 may be executed periodically (e.g., once a month), in response to detecting an actuation of an actuator, and/or in response to receiving a message (e.g., via RF signals) at 910. For example, when the sensor device has two pairs of ultrasonic transmitting and receiving elements, the control circuit may individually execute the control procedure 900 for each of the respective ultrasonic receiving circuits and respective signal generator circuits (e.g., for independently adjusting the peak-to-peak magnitudes $V_{P-P}$ of the supplemental signals $V_{SUP}$ of both ultrasonic receiving circuits). The control circuit may control the ultrasonic transmitting circuits to cause both of the ultrasonic transmitting elements to emit ultrasonic waves during each execution of the control procedure 900 (e.g., for each of the ultrasonic receiving circuits).

The control circuit may be configured to calibrate the operation of the sensor device when the space is vacant. At 912, the control circuit may be configured to determine if the space is vacant, for example, in response to the ultrasonic detection signal $V_{DET}$ generated by the ultrasonic receiving circuit 230, 330 and/or the PIR detect signal $V_{PIR}$ generated by the PIR detection circuit 290. If the space is not vacant (e.g., occupied), the procedure 900 may simply exit. At 914, the control circuit may determine if a wait time $T_{WAIT}$ (e.g., approximately 15 minutes) has expired. For example, the wait time $T_{WAIT}$ may begin when the procedure 900 is executed at 910. If the space is not vacant for the length of the wait time $T_{WAIT}$, the procedure 900 may end. When the space is vacant for the length of the wait time $T_{WAIT}$, the control circuit may determine if generation of the supplemental signal $V_{SUP}$ is enabled at 916. If generation of the supplemental signal $V_{SUP}$ is not enabled at 916, the procedure 900 may end. If generation of the supplemental signal $V_{SUP}$ is enabled at 916, the control circuit may continue on to 918 to configure the operation of the signal generator circuit.

At 918, the control circuit may determine the magnitude of the noise floor of the ultrasonic detection signal $V_{DET}$. For example, the magnitude of the ultrasonic detection signal $V_{DET}$ may indicate the magnitude of the noise floor of the ultrasonic detection signal $V_{DET}$ when the space is vacant. The control circuit may be configured to sample the ultrasonic detection signal $V_{DET}$ at 918 to generate a sample $S_{NF}$ (e.g., that may indicate the magnitude of the noise floor of the ultrasonic detection signal $V_{DET}$).

At 920, the control circuit may adjust the peak-to-peak magnitude $V_{P-P}$ of the supplemental signal $V_{SUP}$ based on the sample $S_{NF}$ of the ultrasonic detection signal $V_{DET}$, before the procedure 900 ends. For example, the control circuit may be configured to compare the sample $S_{NF}$ of the ultrasonic detection signal $V_{DET}$ to a threshold $S_{TH-NF}$, and set the peak-to-peak magnitude $V_{P-P}$ of the supplemental signal $V_{SUP}$ to a first magnitude (e.g., the nominal peak-to-peak magnitude) when the sample $S_{NF}$ is less than the threshold $S_{TH-NF}$ and to a second magnitude (e.g., the reduced peak-to-peak magnitude) when the sample $S_{NF}$ is greater than (e.g., greater than or equal to) the threshold $S_{TH-NF}$. For example, the control circuit may be configured to drive the magnitude of the magnitude-adjustment control signal $V_{MAG-ADJ}$ low towards circuit common to adjust the peak-to-peak magnitude $V_{P-P}$ of the supplemental signal $V_{SUP}$ to the first magnitude (e.g., the nominal peak-to-peak magnitude) and drive the magnitude of the magnitude-adjustment control signal $V_{MAG-ADJ}$ high towards the first supply voltage $V_{CC1}$ to adjust the peak-to-peak magnitude $V_{P-P}$ of the supplemental signal $V_{SUP}$ to the second magnitude (e.g., the reduced peak-to-peak magnitude). In some examples, the control circuit may be configured to generate multiple magnitude-adjustment control signals at 920 for adjusting the peak-to-peak magnitude $V_{P-P}$ of the supplemental signal $V_{SUP}$ to respective magnitudes. Additionally or alternatively, the control circuit may be configured to adjust the peak-to-peak magnitude $V_{P-P}$ of the supplemental signal $V_{SUP}$ as a function of the sample $S_{NF}$ of the ultrasonic detection signal $V_{DET}$ at 920. For example, the control circuit may comprise a digital-to-analog converter (DAC) for generating the magnitude-adjustment control signal $V_{MAG-ADJ}$ and may be configured to adjust (e.g., continuously adjust) a magnitude (e.g., a DC magnitude) of the magnitude-adjustment control signal $V_{MAG-ADJ}$ between two magnitudes (e.g., between the nominal peak-to-peak magnitude and approximately zero volts). For example, the control circuit may be configured to adjust the magnitude of the magnitude-adjustment control signal $V_{MAG-ADJ}$ based on the sample $S_{NF}$ of the ultrasonic detection signal $V_{DET}$ according to a linear relationship between the magnitude of the magnitude-adjustment control signal $V_{MAG-ADJ}$ and the magnitude of the ultrasonic detection signal $V_{DET}$.

Figure 10:
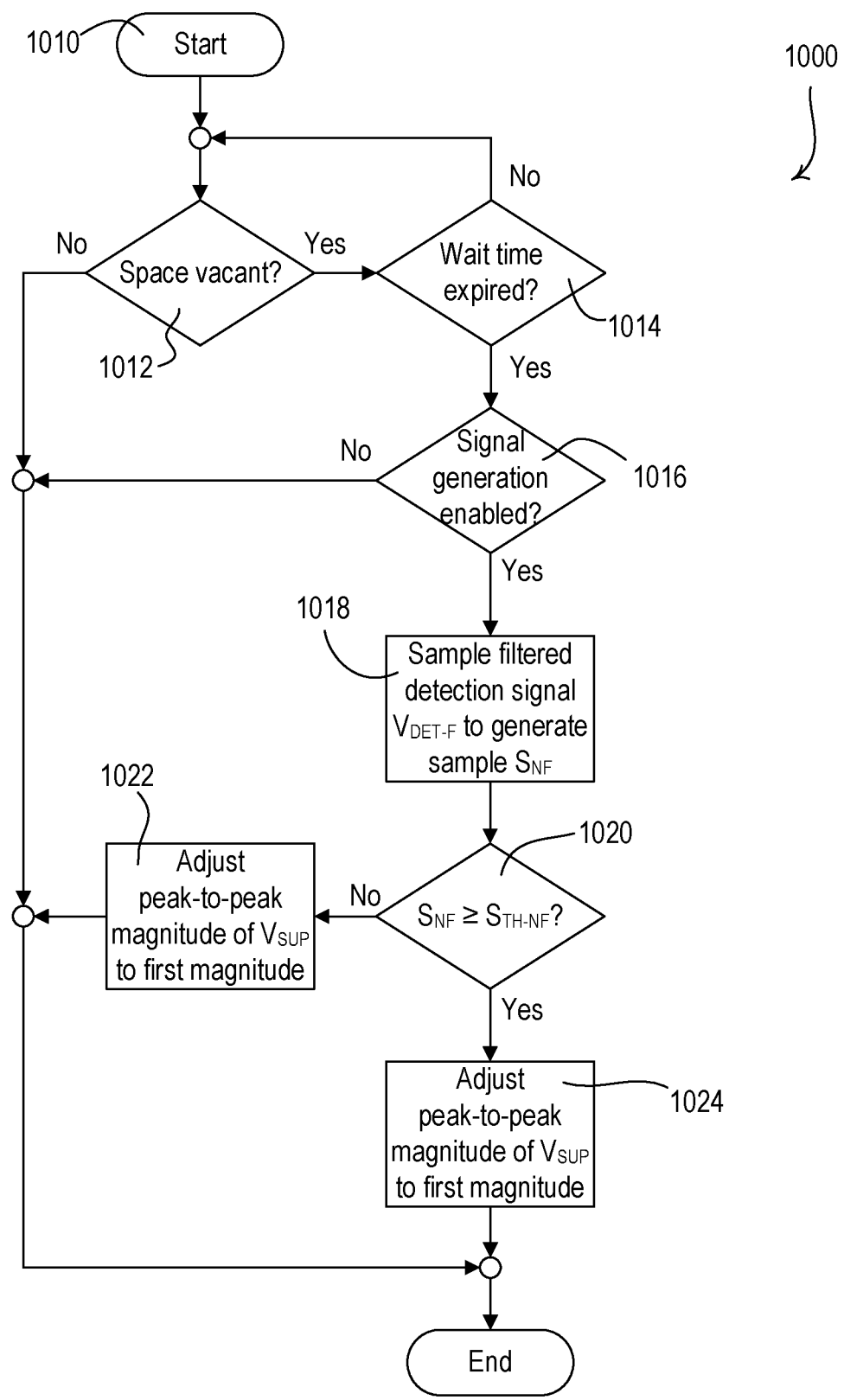

FIG. 10 is a flowchart of an example procedure 1000 for configuring a sensor device (e.g., the sensor devices 120, 120', 150, 200, 200', 300) to enable detection of an occupancy and/or vacancy condition in a space. For example, the procedure 1000 may be executed by a control circuit of the sensor device (e.g., the control circuits 210', 310). The control circuit may execute the procedure 1000 to calibrate the operation of the sensor device. The control circuit may be configured to cause the sensor device to transmit ultrasonic waves and detect the occupancy and/or vacancy condition in the space in response to ultrasonic waves that are reflected off objects in the space and received by the sensor device. The sensor device may control an ultrasonic transmitting circuit (e.g., the ultrasonic transmitting circuit 220, 320) for causing an ultrasonic transmitting element (e.g., the ultrasonic transmitting element 202, 302) to transmit the ultrasonic waves. The sensor device may comprise a signal generator circuit (e.g., the signal generator circuit 270, 370) that may be configured to generate a supplemental signal $V_{SUP}$ that is combined with (e.g., added to) an ultrasonic reception signal $V_{RX}$ generated by an ultrasonic receiving element (e.g., the ultrasonic receiving elements 204, 304) prior to be processed by an ultrasonic receiving circuit (e.g., the ultrasonic receiving circuits 230, 330). The control circuit may be configured to generate a magnitude-adjustment control signal $V_{MAG-ADJ}$, which may be received by the signal generator circuit for adjusting a peak-to-peak magnitude $V_{P-P}$ of the supplemental signal $V_{SUP}$. The control circuit may execute the procedure 1000 to adjust the peak-to-peak magnitude $V_{P-P}$ of the supplemental signal $V_{SUP}$ to a first magnitude (e.g., a nominal peak-to-peak magnitude) or a second magnitude (e.g., a reduced peak-to-peak magnitude).

The control circuit may be configured to execute the procedure 1000 during an initial configuration procedure of the sensor device and/or during one or more maintenance configuration procedures (e.g., after the initial configuration procedure). For example, the control procedure 1000 may be executed periodically (e.g., once a month), in response to detecting an actuation of an actuator, and/or in response to receiving a message (e.g., via RF signals) at 1010. For example, when the sensor device has two pairs of ultrasonic transmitting and receiving elements, the control circuit may individually execute the control procedure 1000 for each of the respective ultrasonic receiving circuits and respective signal generator circuits (e.g., for independently adjusting the peak-to-peak magnitudes $V_{P-P}$ of the supplemental signals $V_{SUP}$ of both ultrasonic receiving circuits). The control circuit may control the ultrasonic transmitting circuits to cause both of the ultrasonic transmitting elements to emit ultrasonic waves during each execution of the control procedure 1000 (e.g., for each of the ultrasonic receiving circuits).

The control circuit may be configured to calibrate the operation of the sensor device when the space is vacant. At 1012, the control circuit may be configured to determine if the space is vacant, for example, in response to the ultrasonic detection signal $V_{DET}$ generated by the ultrasonic receiving circuit 230, 330 and/or the PIR detect signal $V_{PIR}$ generated by the PIR detection circuit 290. If the space is not vacant (e.g., occupied), the procedure 1000 may simply exit. At 1014, the control circuit may determine if a wait time $T_{WAIT}$ (e.g., approximately 15 minutes) has expired. For example, the wait time $T_{WAIT}$ may begin when the procedure 1000 is executed at 1010. If the space is not vacant for the length of the wait time $T_{WAIT}$, the procedure 1000 may end. When the space is vacant for the length of the wait time $T_{WAIT}$, the control circuit may determine if generation of the supplemental signal $V_{SUP}$ is enabled at 1016. If generation of the supplemental signal $V_{SUP}$ is not enabled at 1016, the procedure 1000 may end. If generation of the supplemental signal $V_{SUP}$ is enabled at 1016, the control circuit may continue on to 1018 to configure the operation of the signal generator circuit.

At 1018, the control circuit may determine the magnitude of the noise floor of the ultrasonic detection signal $V_{DET}$ by sampling the ultrasonic detection signal $V_{DET}$ to generate a sample $S_{NF}$. For example, the magnitude of the ultrasonic detection signal $V_{DET}$ may indicate the magnitude of the noise floor of the ultrasonic detection signal $V_{DET}$ when the space is vacant (e.g., such the sample $S_{NF}$ may indicate the magnitude of the noise floor of the ultrasonic detection signal $V_{DET}$).

At 1020, the control circuit may determine if the sample $S_{NF}$ of the ultrasonic detection signal $V_{DET}$ is greater than or equal to a threshold $S_{TH-NF}$. For example, the control circuit may compare the sample $S_{NF}$ of the ultrasonic detection signal $V_{DET}$ to the threshold $S_{TH-NF}$ at 1020. When the sample $S_{NF}$ of the ultrasonic detection signal $V_{DET}$ is less than the threshold $S_{TH-NF}$ at 1020, the control circuit may set the peak-to-peak magnitude $V_{P-P}$ of the supplemental signal $V_{SUP}$ to a first magnitude (e.g., the nominal peak-to-peak magnitude) at 1022, before the procedure 1000 ends. For example, the control circuit may be configured to drive the magnitude of the magnitude-adjustment control signal $V_{MAG-ADJ}$ low towards circuit common to adjust the peak-to-peak magnitude $V_{P-P}$ of the supplemental signal $V_{SUP}$ to the first magnitude at 1022. When the sample $S_{NF}$ of the ultrasonic detection signal $V_{DET}$ is greater than or equal to the threshold $S_{TH-NF}$ at 1020, the control circuit may set the peak-to-peak magnitude $V_{P-P}$ of the supplemental signal $V_{SUP}$ to a second magnitude (e.g., the reduced peak-to-peak magnitude) at 1024, before the procedure 1000 ends. For example, the control circuit may be configured to drive the magnitude of the magnitude-adjustment control signal $V_{MAG-ADJ}$ high towards the first supply voltage $V_{CC1}$ to adjust the peak-to-peak magnitude $V_{P-P}$ of the supplemental signal $V_{SUP}$ to the second magnitude at 1024.

Figure 11:
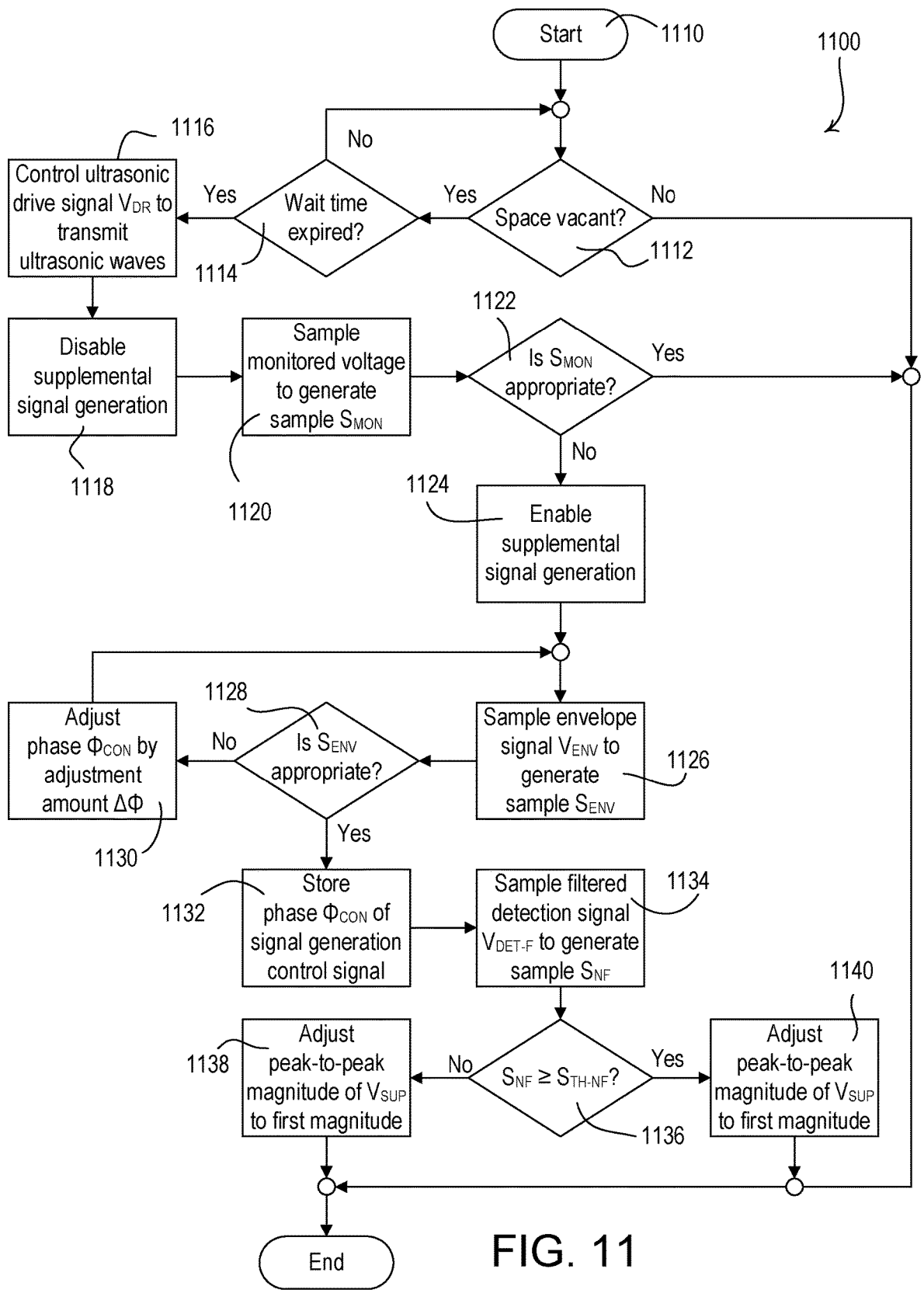

FIG. 11 is a flowchart of an example procedure 1100 for configuring a sensor device (e.g., the sensor devices 120, 120', 150, 200, 200', 300) to enable detection of an occupancy and/or vacancy condition in a space. For example, the procedure 1100 may be executed by a control circuit of the sensor device (e.g., the control circuits 210', 310). The control circuit may execute the procedure 800 to calibrate the operation of the sensor device. The control circuit may be configured to cause the sensor device to transmit ultrasonic waves and detect the occupancy and/or vacancy condition in the space in response to ultrasonic waves that are reflected off objects in the space and received by the sensor device. The sensor device may control an ultrasonic transmitting circuit (e.g., the ultrasonic transmitting circuit 220, 320) for causing an ultrasonic transmitting element (e.g., the ultrasonic transmitting element 202, 302) to transmit the ultrasonic waves. The sensor device may comprise a signal generator circuit (e.g., the signal generator circuit 270, 370) that may be configured to generate a supplemental signal $V_{SUP}$ that is combined with (e.g., added to) an ultrasonic reception signal $V_{RX}$ generated by an ultrasonic receiving element (e.g., the ultrasonic receiving elements 204, 304) prior to be processed by an ultrasonic receiving circuit (e.g., the ultrasonic receiving circuits 230, 330). The control circuit may be configured to generate (e.g., pulse-width modulate) a signal generation control signal $V_C$ON, which may be received by the signal generator circuit for controlling the generation of the supplemental signal $V_{SUP}$. For example, the supplemental signal $V_{SUP}$ may be generated (e.g., initially generated) in phase with the transmitted ultrasonic waves. The received ultrasonic waves may be characterized by a phase delay $\Phi_{RX}$ as compared to the transmitted ultrasonic waves. When the received ultrasonic waves are out of phase (e.g., approximately 180° out of phase) with the transmitted ultrasonic waves and the ultrasonic reception signal $V_{RX}$ and the supplemental signal $V_{SUP}$ have approximately the same magnitude, addition of the supplemental signal $V_{SUP}$ to the ultrasonic reception signal $V_{RX}$ may result in a signal having a small magnitude (e.g., approximately zero volts), which the ultrasonic receiving circuit may not be capable of processing. The control circuit may execute the procedure 1100 to enable and/or disable generation of the supplemental signal $V_{SUP}$ as well as to adjust a phase $\Phi_{SUP}$ of the supplemental signal $V_{SUP}$ to a value at which the ultrasonic receiving circuit is able to process the combination of the ultrasonic reception signal $V_{RX}$ and the supplemental signal $V_{SUP}$. The control circuit may be configured to generate a magnitude-adjustment control signal $V_{MAG-ADJ}$, which may be received by the signal generator circuit for adjusting a peak-to-peak magnitude $V_{P-P}$ of the supplemental signal $V_{SUP}$. The control circuit may also execute the procedure 1100 to adjust the peak-to-peak magnitude $V_{P-P}$ of the supplemental signal $V_{SUP}$ to a first magnitude (e.g., a nominal peak-to-peak magnitude) or a second magnitude (e.g., a reduced peak-to-peak magnitude).

The control circuit may be configured to execute the procedure 1100 during an initial configuration procedure of the sensor device and/or during one or more maintenance configuration procedures (e.g., after the initial configuration procedure). For example, the control procedure 1100 may be executed periodically (e.g., once a month), in response to detecting an actuation of an actuator, and/or in response to receiving a message (e.g., via RF signals) at 1110. For example, when the sensor device has two pairs of ultrasonic transmitting and receiving elements, the control circuit may individually execute the control procedure 1100 for each of the respective ultrasonic receiving circuits and respective signal generator circuits. The control circuit may control the ultrasonic transmitting circuits to cause both of the ultrasonic transmitting elements to emit ultrasonic waves during each execution of the control procedure 1100 (e.g., for each of the ultrasonic receiving circuits).

The control circuit may be configured to calibrate the operation of the sensor device when the space is vacant. At 1112, the control circuit may be configured to determine if the space is vacant, for example, in response to the ultrasonic detection signal $V_{DET}$ generated by the ultrasonic receiving circuit 230, 330 and/or the PIR detect signal $V_{PIR}$ generated by the PIR detection circuit 290. If the space is not vacant (e.g., occupied), the procedure 1100 may simply exit. At 1114, the control circuit may determine if a wait time $T_{WAIT}$ (e.g., approximately 15 minutes) has expired. For example, the wait time $T_{WAIT}$ may begin when the procedure 1100 is executed at 1110. If the space is not vacant for the length of the wait time $T_{WAIT}$, the procedure 800 may exit. When the space is vacant for the length of the wait time $T_{WAIT}$, the control circuit may continue on to 1116 to configure the operation of the signal generator circuit.

At 1116, the control circuit may generate an ultrasonic drive signal $V_{DR}$ to cause the sensor device to transmit ultrasonic waves. The ultrasonic drive signal $V_{DR}$ may be received by the ultrasonic transmitting circuit, which may generate an ultrasonic transmission voltage $V_{TX}$. The ultrasonic transmission voltage $V_{TX}$ may be received by the ultrasonic transmitting element, which may emit the ultrasonic waves. For example, the control circuit may be configured to pulse-width modulate the ultrasonic drive signal $V_{DR}$, such that the ultrasonic drive signal $V_{DR}$ is a PWM voltage characterized by the ultrasonic transmission frequency $f_{US}$ (e.g., approximately 40 kHz) and a duty cycle of approximately 50%. The control circuit may control a phase $\Phi_{DR}$ of the ultrasonic drive signal $V_{DR}$ to control a phase $\Phi_{TX}$ of the transmitted ultrasonic waves. For example, the control circuit may control the phase $\Phi_{TX}$ of the transmitted ultrasonic waves to be zero. If the sensor device does not comprise an ultrasonic transmitting element and an ultrasonic transmitting circuit (e.g., the sensor devices is used in a load control system having external ultrasonic transmitters), generation of the ultrasonic drive signal $V_{DR}$ at 1112 of the procedure 1100 may be omitted.

At 1118, the control circuit may be configured to disable generation of the supplemental signal $V_{SUP}$. For example, the control circuit may be configured to disable the generation of the supplemental signal $V_{SUP}$ at 118 by ceasing pulse-width modulation of the signal generation control signal $V_{CON}$ and/or driving the magnitude of the generation control signal $V_{CON}$ to otherwise disable the signal generator circuit. At 1120, the control circuit may be configured to sample the magnitude (e.g., the DC magnitude) of a voltage of the ultrasonic receiving circuit (e.g., a monitored voltage) that may indicate that one or more signals of the ultrasonic receiving circuit may be at appropriate magnitudes to be properly processed (e.g., to allow the ultrasonic receiving circuit to generate the ultrasonic detection signal $V_{DET}$). For example, the monitored voltage may be the envelope signal $V_{ENV}$ and/or the filtered version of the envelope signal $V_{ENV}$ (e.g., the filtered envelope signal $V_{ENV-F}$). The control circuit may be configured to sample and store the magnitude (e.g., the DC magnitude) of the monitored voltage (e.g., the envelope signal $V_{ENV}$ and/or the filtered version of the envelope signal $V_{ENV}$) at 1120 to generate a sample $S_{MON}$.

At 1122, the control circuit may be configured to determine if the magnitude of the monitored voltage (e.g., as indicated by the sample $S_{MON}$) indicates that the one or more signals of the ultrasonic receiving circuit are at appropriate magnitudes to be properly processed. For example, the control circuit may be configured to compare the sample $S_{MON}$ to a threshold $S_{TH-MON}$ and determine that the magnitude of the monitored voltage is at an appropriate level when the magnitude of the sample $S_{MON}$ exceeds the threshold $S_{TH-MON}$. When the control circuit determines that the magnitude of the monitored voltage is at an appropriate level at 1122, the procedure 1100 may exit (e.g., with the generation of the supplemental signal $V_{SUP}$ disabled).

When the control circuit determines that the magnitude of the monitored voltage is not at an appropriate level at 1122, the control circuit may be configured to enable the generation of the supplemental signal $V_{SUP}$ at 1124. For example, the control circuit may be configured to enable the generation of the supplemental signal $V_{SUP}$ at 1120 by pulse-width modulating the signal generation control signal $V_{CON}$ and/or driving the magnitude of the generation control signal $V_{CON}$ to enable the signal generator circuit. The control circuit may retrieve a value for a phase $\Phi_{CON}$ of the signal generation control signal $V_{CON}$ from, for example, memory (e.g., the memory 212) at 1124. When the procedure 1100 is executed for the first time (e.g., as part of the initial configuration procedure of the sensor device), the control circuit may be configured to initialize the phase $\Phi_{CON}$ of the signal generation control signal $V_{CON}$ to zero (e.g., such that the phase $\Phi_{CON}$ of the signal generation control signal $V_{CON}$ is equal to the phase $\Phi_{DR}$ of the ultrasonic drive signal $V_{DR}$). When the procedure 1100 is subsequently executed (e.g., after the initial configuration procedure of the sensor device), the control circuit may be configured to determine the phase $\Phi_{CON}$ of the signal generation control signal $V_{CON}$ to be the zero if the phase $\Phi_{CON}$ was not modified during a previous execution of the procedure 800 or another value if the phase $\Phi_{CON}$ was modified during a previous execution of the procedure 800. When the phase $\Phi_{CON}$ of the signal generation control signal $V_{CON}$ is zero (e.g., the signal generation control signal $V_{CON}$ is in phase with the ultrasonic drive signal $V_{DR}$), the control circuit may generate the rising and falling edges of the signal generation control signal $V_{CON}$ at the same times as the rising and falling edges of the ultrasonic drive signal $V_{DR}$, respectively.

At 1126, the control circuit may be configured to sample the magnitude of the voltage of the ultrasonic receiving circuit (e.g., the magnitude of the monitored voltage that indicates that one or more signals of the ultrasonic receiving circuit may be at magnitudes to be properly processed) to generate a sample $S_{MON}$ with the generation of the supplemental signal $V_{SUP}$ enabled. At 1128, the control circuit may be configured to determine if the magnitude of the monitored voltage (e.g., as indicated by the sample $S_{MON}$) indicates that one or more signals of the ultrasonic receiving circuit are at appropriate magnitudes to be properly processed when the generation of the supplemental signal $V_{SUP}$ is enabled. For example, the control circuit may be configured to compare the sample $S_{MON}$ to the threshold $S_{TH-MON}$ and determine that the magnitude of the monitored voltage is at an appropriate level when the magnitude of the sample $S_{MON}$ exceeds the threshold $S_{TH-MON}$. When the addition of the supplemental signal $V_{SUP}$ to the ultrasonic reception signal $V_{RX}$ is not causing the input signal $V_{IN}$ to have a smaller magnitude (e.g., the sample $S_{MON}$ of the envelope signal $S_{MON}$ exceeds the threshold $S_{TH-MON}$) at 1128, the control circuit may determine that the magnitude of the monitored voltage is at an appropriate level while the supplemental signal $V_{SUP}$ is being generated, and may store the phase $\Phi_{CON}$ of the signal generation control signal $V_{CON}$ at 1130, before the procedure 1100 ends. For example, the control circuit may store the phase $\Phi_{CON}$ of the signal generation control signal $V_{CON}$ as the initial phase when the sample $S_{MON}$ is at an appropriate level at 1128 the first time that the procedure is executed.

When the received ultrasonic waves are out of phase with the transmitted ultrasonic waves and the addition of the supplemental signal $V_{SUP}$ to the ultrasonic reception signal $V_{RX}$ is causing the input signal $V_{IN}$ to have a smaller magnitude (e.g., the sample $S_{MON}$ is less than the threshold $S_{TH-MON}$) at 828, the control circuit may determine that the magnitude of the monitored voltage is not at an appropriate level, and may adjust (e.g., increase and/or decrease) the phase $\Phi_{CON}$ of the signal generation control signal $V_{CON}$ by an adjustment amount $\Delta\Phi$ at 1130, sample the magnitude of the monitored voltage at 1126 to generate another sample $S_{MON}$, and determine if the sample $S_{MON}$ at an appropriate level at 1128. For example, the adjustment amount $\Delta\Phi$ may be a fixed amount, such that the control circuit adjusts the phase $\Phi_{CON}$ of the signal generation control signal $V_{CON}$ by the same amount each time that the control circuit adjusts the phase $\Phi_{CON}$ of the signal generation control signal $V_{CON}$ at 1130. In addition, the adjustment amount $\Delta\Phi$ may be a variable amount that varies each time that the control circuit adjusts the phase $\Phi_{CON}$ of the signal generation control signal $V_{CON}$ at 1130. For example, the control circuit may adjust the phase $\Phi_{CON}$ of the signal generation control signal $V_{CON}$ using an interval-halving method (e.g., a binary search method). For example, the control circuit may adjust the phase $\Phi_{CON}$ of the signal generation control signal $V_{CON}$ to approximately 180° (e.g., as compared to the phase $\Phi_{DR}$ of the ultrasonic drive signal $V_{DR}$) the first time that the phase $\Phi_{CON}$ of the signal generation control signal $V_{CON}$ is adjusted at 1130, and then adjust the phase $\Phi_{CON}$ of the signal generation control signal $V_{CON}$ to a value that is approximately equal to half of the previous value of the phase $\Phi_{CON}$ each time that the phase $\Phi_{CON}$ of the signal generation control signal $V_{CON}$ is subsequently adjusted at 1130 (e.g., approximately 90°, 45°, 22.5°, and so on). The control circuit may continue to adjust the phase $\Phi_{CON}$ of the signal generation control signal $V_{CON}$ by the adjustment amount $\Delta\Phi$ at 1130 and sample the magnitude of the monitored voltage at 1126 until the sample $S_{MON}$ is at an appropriate level at 1128. At 1132, the control circuit may then store the phase $\Phi_{CON}$ of the signal generation control signal $V_{CON}$ as the phase last set at 1130, before the procedure 1100 ends.

At 1134, the control circuit may determine the magnitude of the noise floor of the ultrasonic detection signal $V_{DET}$ by sampling the ultrasonic detection signal $V_{DET}$ to generate a sample $S_{NF}$. For example, the ultrasonic detection signal $V_{DET}$ may have a magnitude that indicates the magnitude of the noise floor of the ultrasonic detection signal $V_{DET}$ (e.g., such the sample $S_{NF}$ may indicate the magnitude of the noise floor of the ultrasonic detection signal $V_{DET}$) when the space is vacant. At 1136, the control circuit may determine if the sample $S_{NF}$ of the ultrasonic detection signal $V_{DET}$ is greater than or equal to a threshold $S_{TH-NF}$. For example, the control circuit may compare the sample $S_{NF}$ of the ultrasonic detection signal $V_{DET}$ to the threshold $S_{TH-NF}$ at 1136. When the sample $S_{NF}$ of the ultrasonic detection signal $V_{DET}$ is less than the threshold $S_{TH-NF}$ at 1136, the control circuit may set the peak-to-peak magnitude $V_{P-P}$ of the supplemental signal $V_{SUP}$ to a first magnitude (e.g., the nominal peak-to-peak magnitude) at 1138, before the procedure 1100 ends. For example, the control circuit may be configured to drive the magnitude of the magnitude-adjustment control signal $V_{MAG-ADJ}$ low towards circuit common to adjust the peak-to-peak magnitude $V_{P-P}$ of the supplemental signal $V_{SUP}$ to the first magnitude at 1138. When the sample $S_{NF}$ of the ultrasonic detection signal $V_{DET}$ is greater than or equal to the threshold $S_{TH-NF}$ at 1136, the control circuit may set the peak-to-peak magnitude $V_{P-P}$ of the supplemental signal $V_{SUP}$ to a second magnitude (e.g., the reduced peak-to-peak magnitude) at 1140, before the procedure 1100 ends. For example, the control circuit may be configured to drive the magnitude of the magnitude-adjustment control signal $V_{MAG-ADJ}$ high towards the first supply voltage $V_{CC1}$ to adjust the peak-to-peak magnitude $V_{P-P}$ of the supplemental signal $V_{SUP}$ to the second magnitude at 1140.

What is claimed is:

1. A sensor device configured to be installed in a space, the sensor device comprising:
   an ultrasonic receiving element configured to receive ultrasonic waves and generate an ultrasonic reception voltage signal, wherein the ultrasonic waves comprise non-Doppler-shifted ultrasonic waves when the space is vacant and a combination of non-Doppler-shifted ultrasonic waves and Doppler shifted waves when the space is occupied, the non-Doppler-shifted ultrasonic waves characterized by an ultrasonic frequency;
   a control circuit configured to control generation of a supplemental signal that is characterized by the ultrasonic frequency and is combined with the ultrasonic reception voltage signal;
   an ultrasonic receiving circuit configured to receive the combination of the ultrasonic reception voltage signal and the supplemental signal, the ultrasonic receiving circuit configured to generate a detection signal that indicates when the space is occupied; and
   a control circuit configured to receive the detection signal and detect an occupancy condition in the space in response to the detection signal.

2. The sensor device of claim 1, further comprising:
   a signal generator circuit configured to generate the supplemental signal;
   wherein the control circuit is configured to generate a signal generation control signal that is received by the signal generator circuit for controlling the generation of the supplemental signal.

3. The sensor device of claim 2, wherein the control circuit is configured to control the signal generation control signal to enable and disable the signal generator circuit.

4. The sensor device of claim 3, wherein the control circuit is configured to:
   pulse-width modulate the signal generation control signal at the ultrasonic frequency when the signal generator circuit is enabled; and
   receive a monitored voltage of the ultrasonic receiving circuit;
   wherein the monitored voltage has a magnitude that indicates that the combination of the ultrasonic reception voltage signal and the supplemental signal may be properly processed by the ultrasonic receiving circuit to generate the detection signal.

5. The sensor device of claim 4, wherein the control circuit is configured to measure a magnitude of the monitored voltage of the ultrasonic receiving circuit when the signal generation circuit is enabled, and determine to adjust a phase of the signal generation control signal when the magnitude of the monitored voltage is less than a threshold.

6. The sensor device of claim 5, wherein the control circuit is configured to adjust the phase of the supplemental signal until the magnitude of the monitored voltage is greater than the threshold.

7. The sensor device of claim 4, wherein the control circuit is configured to measure a magnitude of the monitored voltage of the ultrasonic receiving circuit when the signal generation circuit is disabled, the control circuit further configured to enable the signal generation circuit when the magnitude of the monitored voltage is less than a threshold, and disable the signal generation circuit when the magnitude of the monitored voltage is greater than the threshold.

8. The sensor device of claim 4, wherein the control circuit is configured to measure a magnitude of the monitored voltage of the ultrasonic receiving circuit when the signal generation circuit is disabled, and automatically configure the operation of the signal generation circuit in response to the monitored voltage when the space in vacant.

9. The sensor device of claim 4, wherein the ultrasonic receiving circuit comprises:
   an amplifier circuit configured to amplify the combination of the ultrasonic reception voltage signal and the supplemental signal to generate an amplified signal;
   an envelope detector circuit configured to receive the amplified signal and generate an envelope signal; and
   a filter circuit configured to filter the envelope signal to generate the detection signal;
   wherein the monitored voltage is a filtered version of the envelope signal.

10. The sensor device of claim 2, wherein the signal generator circuit is configured to generate the supplemental signal as a sinusoidal signal at the ultrasonic frequency in response to the signal generation control signal, and the control circuit is configured to adjust a peak to peak magnitude of the supplemental signal in response to a noise floor of the detection signal generated by the ultrasonic receiving circuit.

11. The sensor device of claim 10, wherein the control circuit is configured to adjust the peak to peak magnitude of the supplemental signal to a first magnitude when a magnitude of the noise floor of the detection signal is less than a threshold, and to a second magnitude when the magnitude of the noise floor of the detection signal is greater than the threshold, wherein the second magnitude is less than the first magnitude.

12. The sensor device of claim 10, wherein the control circuit is configured to adjust the peak to peak magnitude of the supplemental signal as a function of a magnitude of the noise floor of the detection signal.

13. The sensor device of claim 10, wherein the control circuit is configured to determine the noise floor of the detection signal in response to a magnitude of the detection signal.

14. The sensor device of claim 10, wherein the control circuit is configured to automatically adjust the peak-to-peak magnitude of the supplemental signal in response to the noise floor of the detection signal when the space in vacant.

15. The sensor device of claim 1, wherein the ultrasonic receiving element comprises a first ultrasonic receiving element configured to generate a first ultrasonic reception voltage signal, the signal generator circuit comprises a first signal generator circuit, and the ultrasonic receiving circuit comprises a first ultrasonic receiving circuit configured to generate a first detection signal; and wherein the sensor device further comprises:
  a second ultrasonic receiving element configured to receive ultrasonic waves characterized by the ultrasonic frequency and generate a second ultrasonic reception voltage signal;
  a second signal generator circuit configured to generate a second supplemental signal that is characterized by the ultrasonic frequency and is combined with the ultrasonic reception voltage signal; and
  a second ultrasonic receiving circuit configured to receive the combination of the second ultrasonic reception voltage signal and the second supplemental signal, the second ultrasonic receiving circuit configured to generate a second detection signal that indicates when the space is occupied;
wherein the control circuit is further configured to receive the second detection signal and detect an occupancy condition in the space in response to both the first and second detection signals, just the first detection signal, or just the second detection signal.

16. The sensor device of claim 15, wherein the control circuit is configured to determine to be responsive to both the first and second detection signals, just the first detection signal, or just the second detection signal in response to at least one of an actuation of an actuator of the sensor device or message received by the sensor device.

17. The sensor device of claim 1, wherein the control circuit is configured to automatically configure the operation of the signal generation circuit when the space in vacant.

18. The sensor device of claim 17, further comprising:
  a passive infrared detection circuit including a pyroelectric detector configured to receive infrared energy from an occupant in the space;
  wherein the control circuit is configured to automatically configure the operation of the signal generation circuit when the control circuit has determined that the space is vacant in response to the passive infrared detection circuit.

19. The sensor device of claim 1, further comprising:
  an enclosure for housing the ultrasonic receiving element, the signal generator circuit, the ultrasonic receiving circuit, and the control circuit;
  wherein the enclosure comprises an opening in a front surface of the enclosure, the ultrasonic receiving element configured to receive the ultrasonic waves through the opening, the opening having a diameter that is approximately equal to a wavelength of the ultrasonic waves and a depth between the front surface of the enclosure and the ultrasonic receiving element that is approximately equal to one-fourth of the wavelength of the ultrasonic waves.

20. The sensor device of claim 1, wherein the control circuit is configured to directly generate the supplemental signal.

* * * * *